(12) United States Patent  (10) Patent No.: US 6,721,648 B2
Masters et al.  (45) Date of Patent: *Apr. 13, 2004

(54) METHOD AND APPARATUS FOR CONTROLLING A MOTORCYCLE ENGINE

(75) Inventors: Stephen C. Masters, El Paso, TX (US); Douglas B. Waits, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 09/929,724

(22) Filed: Aug. 14, 2001

(65) Prior Publication Data

US 2002/0013654 A1 Jan. 31, 2002

Related U.S. Application Data

(63) Continuation-in-part of application No. 09/432,454, filed on Nov. 2, 1999, now Pat. No. 6,304,814.

(51) Int. Cl.$^7$ .......................... F02D 28/00; F02D 43/04
(52) U.S. Cl. .................. 701/110; 701/115; 701/54; 700/17
(58) Field of Search ............................... 701/110, 115, 701/53, 54; 700/17

(56) References Cited

U.S. PATENT DOCUMENTS

| 4,005,388 A | | 1/1977 | Morley et al. |
| 4,291,375 A | | 9/1981 | Wolf |
| 5,091,858 A | | 2/1992 | Paielli |
| 5,187,655 A | | 2/1993 | Post et al. |
| 5,803,043 A | | 9/1998 | Bayron et al. |
| 6,026,346 A | * | 2/2000 | Ohashi et al. ............... 701/210 |
| 6,304,814 B1 | * | 10/2001 | Masters et al. ............. 701/110 |
| 6,560,528 B1 | * | 5/2003 | Gitlin et al. ................ 701/115 |
| 2003/0150416 | * | 8/2003 | Flick ....................... 123/179.2 |

* cited by examiner

Primary Examiner—Hieu T. Vo
(74) Attorney, Agent, or Firm—Fitch, Even, Tabin & Flannery

(57) ABSTRACT

A programmable electronic ignition system is provided including a hand-held programmer, or in the alternative a computer, for controlling engine control parameters including revolutions per minutes limiters, ignition timing retards, gear shift controls, revolutions per minute switching, and fuel addition. The hand-held programmer or computer provides a menu driven interface which directs the user through the engine control parameters using easy to recognize terms. The programmable electronic ignition system can employ a cylinder location sensor to identify a predetermined cylinder for controlling individual cylinder ignition timing retards.

9 Claims, 28 Drawing Sheets

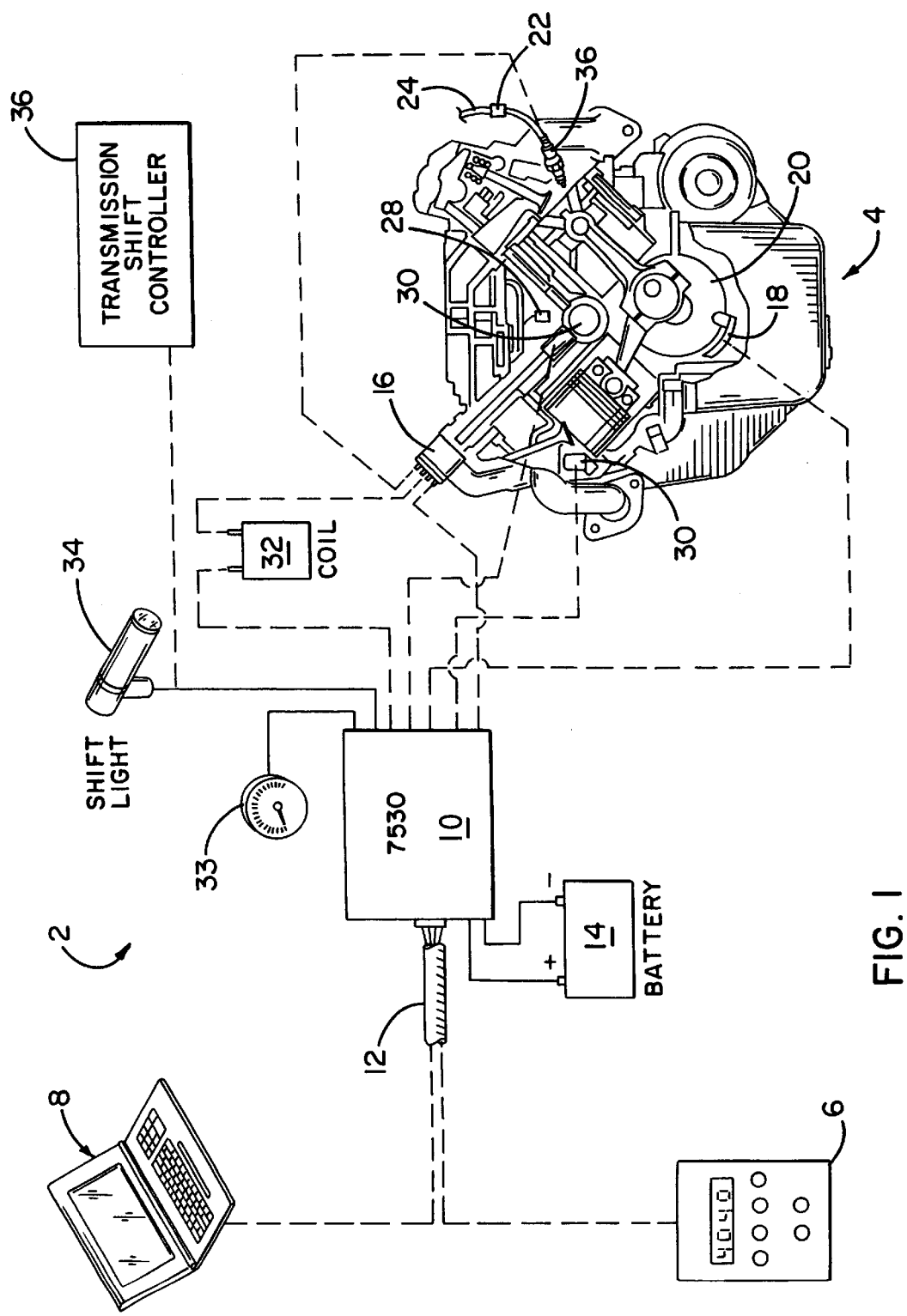
FIG. I

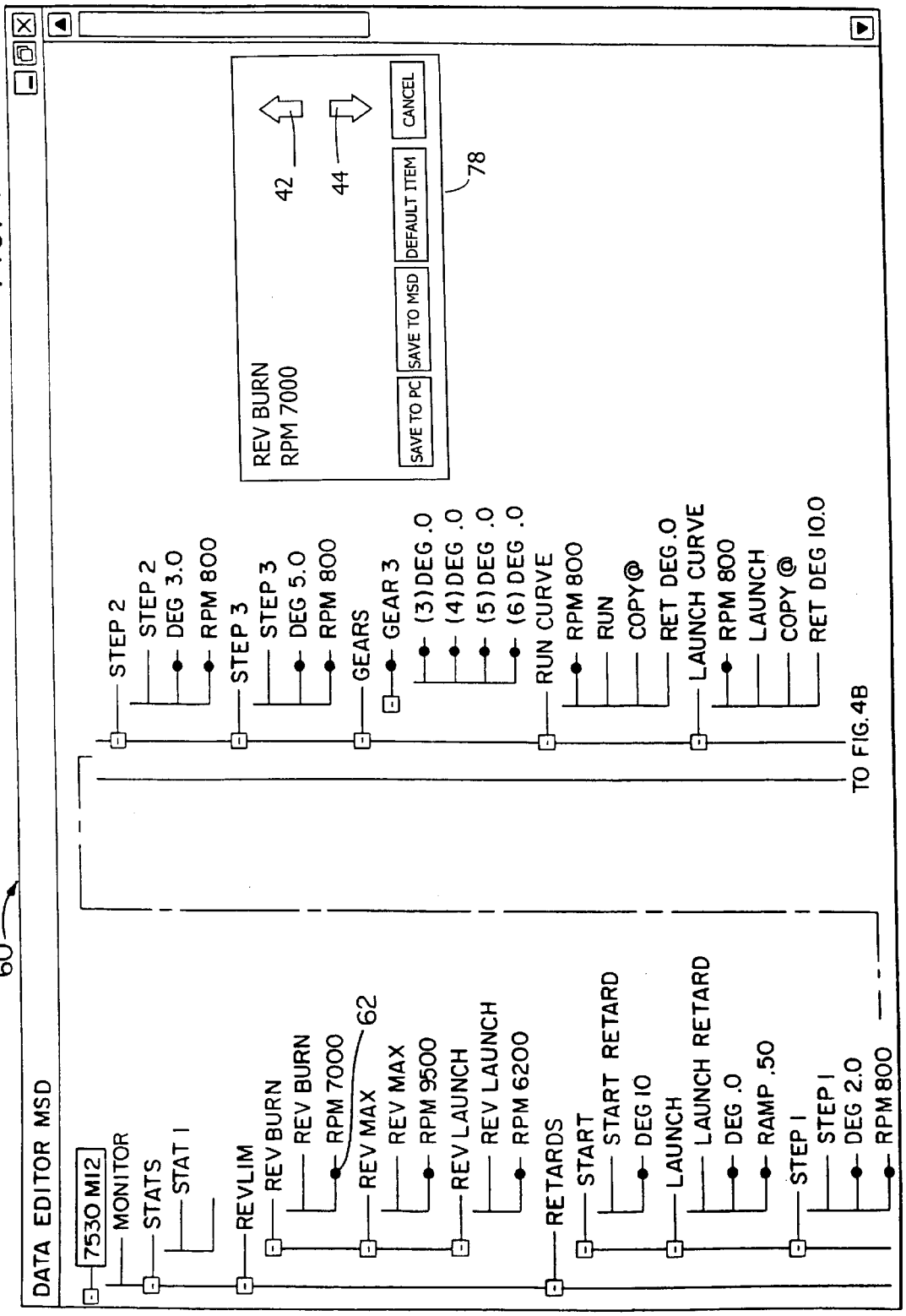

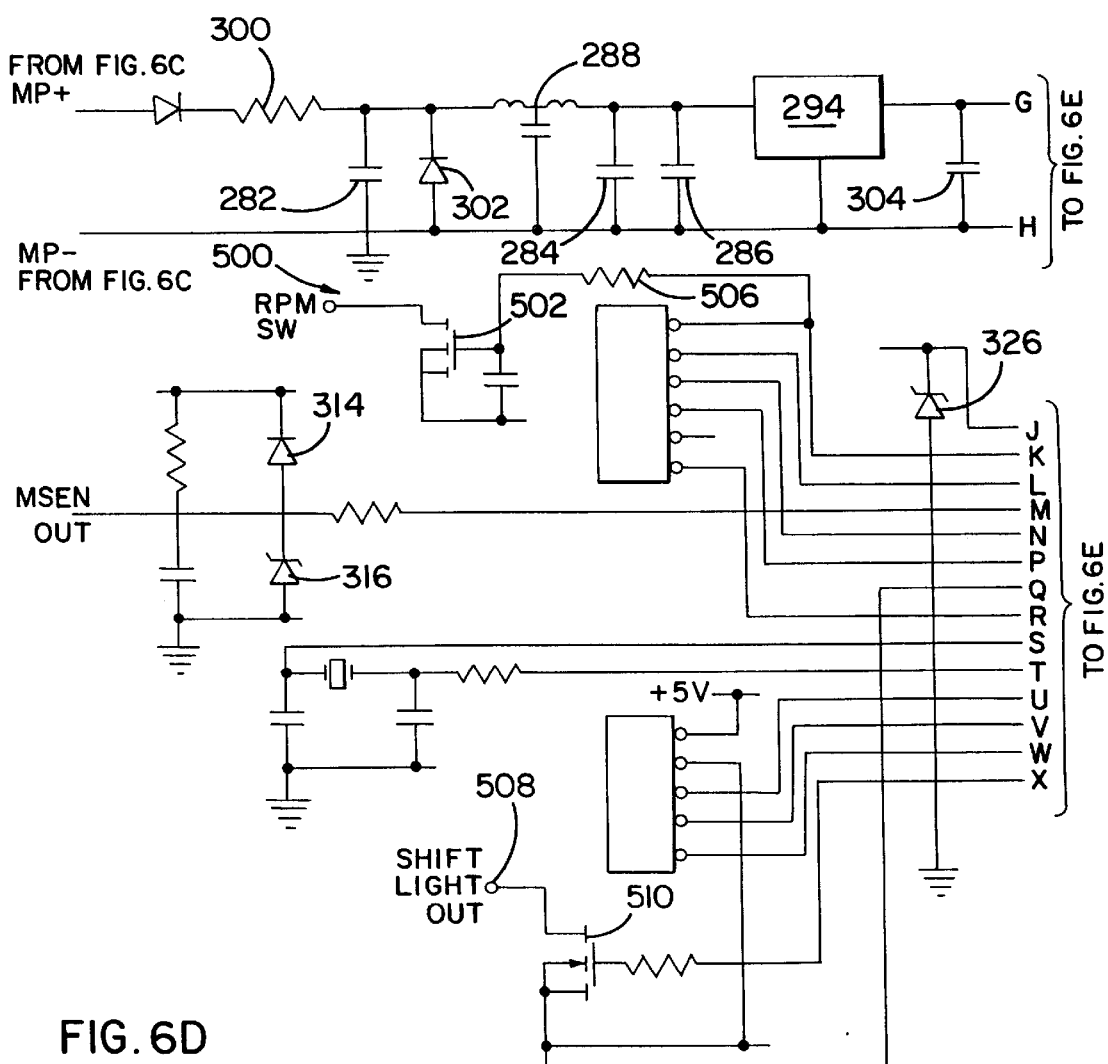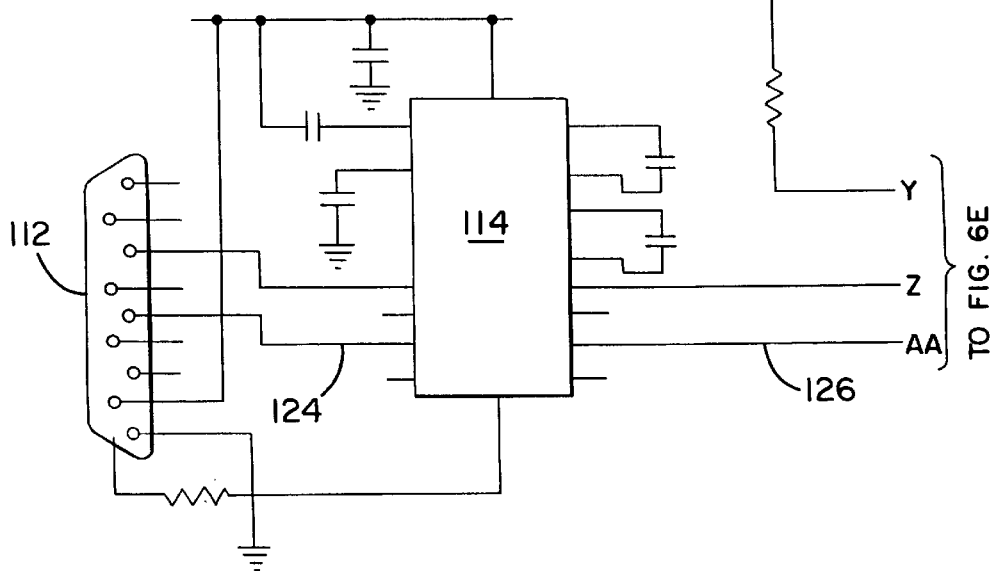
FIG. 6D

METHOD AND APPARATUS FOR CONTROLLING A MOTORCYCLE ENGINE

CROSS REFERENCE TO RELATED APPLICATION

This application is a continuation-in-part of prior application Ser. No. 09/432,454, filed Nov. 2, 1999, now U.S. Pat. No. 6,304,814 B1, issued on Oct. 16, 2001, which is hereby incorporated by reference in its entirety.

FIELD OF THE INVENTION

The invention relates to a method and system for electronically controlling various operational parameters such as revolutions per minute (RPM), ignition spark timing, cylinder timing, gear shifting, fuel addition and ignition interrupt of an internal combustion engine. Specifically, the present invention allows such control via an interface that has an easy to read, word-based menu system and method for easily changing related engine operational parameters.

BACKGROUND OF THE INVENTION

Conventional, mechanical methods of controlling engine parameters have been employed to govern the maximum revolutions per minute (RPM) the crankshaft of an engine rotates, set ignition spark timing and to control gear shifting.

In the past, revolutions per minute that the crankshaft rotates were limited by controlling the amount of fuel delivered for consumption. Modern, spark internal combustion engines typically utilize the ignition system to control RPM of the engine. Once the engine has reached the maximum RPM allowed, the ignition system will cut the electrical impulse to the spark plug, thereby preventing the spark plug from firing in the cylinder and consumption of fuel. Various methods have been employed to sequentially or randomly interrupt the firing order of the spark plugs. Adjustable RPM limiters typically utilize dial or resistor-type chips on the ignition box itself to set the maximum RPM allowed during operation. More complex RPM limiters allow for more than one RPM limit to be set for controlling RPM during various conditions or stages of operation. Once the maximum RPM of the first set dial or chip is reached, the engine is allowed to reach the next maximum RPM set by the next dial or chip and so on. One problem associate with these types of RPM limiters is that the adjustable dials are typically small and difficult to change in order to prevent the dial from rotating due to engine and chassis vibration. Furthermore, systems that utilize resistor chips are limited by what chips the user has and both systems are limited by the predetermined increments of the dials or the chips.

To increase performance and accuracy of timing in high revolutions per minute engines, electronic ignition systems were developed. As RPM increase, the timing cycles for delivering a spark to the cylinder becomes very compressed and further rotating parts, crank and camshaft, may bend under stress, thereby adding inaccuracies in conventional, mechanical timing systems. Electronic ignition systems overcome these mechanical inaccuracies by typically triggering the spark timing off of the flywheel or balancer on the crankshaft or the camshaft, thereby eliminating the need to mechanically adjust the timing at the camshaft and distributer.

For peak efficiency, the fuel must be ignited in the cylinder on the up stroke of the piston as the fuel mixture is under pressure to give the flame created by the spark time to travel across the cylinder and ignite the fuel mixture. For example, a spark timed to arrive at X degrees advance, before top dead center (TDC) of the piston, may actually spark many degrees before or after the set timing. Improper timing or inaccurate sparking may cause detonation in which the fuel ignites while the piston is at the early phase of the upward travel, pre-ignition, or later in the downward stroke which may damage the valve train assembly, piston, connect rod, or in the extreme, the crankshaft.

Typically electronic ignition systems ramp up to a set degree of ignition timing as RPM increase. For example, with ignition timing set at 30 degrees advance, the actual ignition timing may begin from start up (0 RPM) at 10 degrees advance and linearly increase until the timing reaches 30 degrees advance at thousands of RPM later. One problem associated with electronic ignition timing systems, is the inability to set degrees ignition timing as a function of RPM or the ignition system may only allow changing slope of the linear ramp up timing, thereby preventing the engine from operating at peak efficiency or maximum power. Furthermore, these systems do not allow the changing of the ignition timing as a function of an event such as a gear shift.

Sudden changes in cylinder pressure due to the boost of a turbo charger, the injection of nitrous oxide into the fuel mixture, gear shifts or the combination thereof, present another problem for ignition timing. As cylinder pressure changes, the optimum ignition timing point may also change. Electronic ignitions systems have been developed to monitor cylinder or inlet manifold pressure and compensate for these changes, but are limited by the sampling rates of the electronics used and typically do not let the user input timing adjustments. Furthermore, in high performance applications, the timing adjustments cannot be made quickly to compensate for the rapid changing conditions.

To achieve peak engine performance in a racing application, the racer or crew chief may alter engine components and settings to find the optimum combination. Ignition timing is one such setting that must be optimized for each engine combination. The racer often finds the optimum ignition timing setting by adjusting the timing and making a run with the racecar or racing motorcycle to determine its effect. This process cannot only be time consuming, but also tedious due the physical requirements of manually changing the ignition timing.

Furthermore, varying weather conditions will also affect the performance of these types of engines. Any change in temperature, barometric pressure, humidity or combination thereof will affect the performance characteristics of the engine. The weather conditions directly affect the amount of air inspired by the engine and is seen as pressure changes in the engine intake manifold. This pressure in the manifold is commonly referred to as manifold absolute pressure or "MAP." Ignition timing or the amount of fuel delivered are two parameters the racer may change to compensate for these changes in weather conditions.

Also, the racer may alter ignition timing to control the performance of the vehicle. For example, in some drag racing applications were the race is run on an ET (elapsed time) index, the racer may desire to slow the ET of the racecar or racebike using ignition timing. By retarding the ignition timing, the racer can, in effect, de-tune the engine and elongate the elapsed time of the run. Thus, it is desirable to have an ignition timing system capable of allowing the user to pre-select timing changes as a function of RPM, MAP, or events.

Another physical limitation of mechanical ignition systems is the inability to control individual cylinder timing. In a conventional mechanical ignition system, the timing is set in relation to TDC of one cylinder. Typically, the first cylinder that fires is used to physically set when the rotor of the distributor makes contact with the terminal which supplies the current to the spark plug when that piston is at TDC, or at a particular degree of timing before TDC, i.e., rotor phasing. Once the rotor is phased, all cylinders will then fire in relation to this pre-determined phasing. The timing can be further adjusted by rotating the entire distributor and shaft and with a timing light, monitoring the degrees of timing at the balancer.

In high RPM engines, it may be advantageous to have one or more cylinders firing before or after the pre-selected timing to optimize the efficiency for the conditions of each individual cylinder. For example, with the timing set at 30 degrees advance (before TDC), one cylinder which creates a higher pressure than the rest may burn more efficiently if fired at 25 degrees advance. Thus, for peak efficiency and maximum power applications, it is advantageous to be able to control individual cylinder timing. Although this may be achieved by some real-time using computer systems, these systems may be too slow for high RPM engines and may not be allowed by race sanctioning bodies and further, they do not allow the user to select and specify the individual cylinder timing.

In high performance engines, as well as all engines, there exists an optimum RPM to shift from one gear to the next. It is well known in the automotive industry to use a "shift light" to signal the driver to manually shift gears once the correct RPM has been reached for that particular gear shift. Such shift lights are typically controlled by an electronic system which monitors the tachometer and sends a signal to illuminate shift light once a particular RPM has been reached. Some systems provide for the user to define the RPM of each shift using the tachometer signal and a controller. In an automatic transmission, this signal can also be used to activate an automatic shifter. Typically, these gear shift systems are separate and independent of the electronic ignition timing systems and, thus, two electronic "boxes" must be placed on the vehicle.

For motorcycle transmission it is common to "kill" the engine during each shift in other words, to momentarily cut the ignition to the engine, thereby preventing firing of the spark plugs. This prevents the engine from over-revving and allows the transmission to full shift before engine and transmission engages. Engine kill control boxes are separate from the ignition and transmission and typically use dial type switches for the user to select and must be mounted to the racebike.

The above mentioned electronic boxes typically control one or two functions, and thus the racer often must be mounted to multiple boxes in the race vehicle. Besides adding weight, these boxes also take away limited space in the race cockpit and may only control one engine parameter.

During operation, each of these boxes is monitoring an engine parameter. Due to restrictions placed by some race sanctioning bodies, most boxes are not allowed to display, in real-time, the instantaneous reading of the engine parameter while the engine is running on the track. However, most race sanctioning bodies allow these readings to be stored so such that they may be analyzed after the run on a computer. Most racing computer systems which monitor and store engine parameter values during a run, do not control, nor allow the user to control the engine parameters monitored. Further, these systems are typically expensive and not cost effective to some racers because data is merely recorded and additional electronics are needed to control engine functions. During tune-up or preparations before the race, it is often advantageous to view the engine parameter values as the engine is running and to monitor the effects of changes to the engine parameter values.

Those systems currently available which provide the capability to monitor and change engine parameters while an engine is running are computer based. Thus, the racer must connect the engine control system via an electrical cable to either a lap top or full size computer. Not only does the need for a computer increase the cost to the racer, but these systems control multiple engine functions requiring many engine parameter sensors which are not utilized by all racers. Also, particular race classes such as NHRA stock, super stock and competition eliminators do not allow all of these engine functions to be electronically controlled for particular sub-classes. For example, one super stock eliminator class may only allow carbureted engines while another allows both carbureted and electronic fuel injection systems. Thus, the carbureted-only class racer may desire an electronic engine controller to control gear shifting revlimiting and individual cylinder timing, but not fuel injection controlling. Conversely, the racer which can use either electronic fuel injection or carburetion may desire to have both of these engine control functions available for the flexibility to switch fuel delivery systems to find the optimum fuel system for a particular engine combination. Further, the carburetor-only class may not allow the use of an engine control system which has the capability to control electronic fuel injection due to the possibility of using the controller to control the throttle body, of a carburetor, and thus, fuel delivery to the engine as a function of manifold absolute pressure (MAP). Therefore, one engine control system which controls all possible engine functions cannot satisfy the needs of all racers.

One attempt to combine both an ignition timing and gear shift controller is the QUICKSHOT™ Programmer and ProStrip Annihilator ignition system developed by Holley Performance Products. Due to the small physical size, the programmer uses a two digit or letter code to identify the parameter and then removes the code and displays the first two digits of value for that particular parameter. Thus, the user must either memorize or use reference aids to identify the code for the parameter. However, this may become very inconvenient for the racer in the field where the level of surrounding activity can be extremely disruptive due to the limited time between runs to refer to a reference manual or code sheets while attempting to make adjustments. Moreover, if the codes are confused and the wrong engine control parameter is inadvertently changed, misfiring or incorrect shifting may result which, in turn, can cause significant engine damage. Furthermore, due to the limited display on the programmer, approximately 1.25 inches by 1 inch, only one individual parameter code can be viewed and selected at a time. This requires the user to remember the parameter while changing its value or when program parameters dependent on two variables, the first entered related variable. Also, this system does not provide an efficient, user-friendly method for controlling individual cylinder ignition timing.

Accordingly, an interface that allows a wide variety of engine operational parameters to be adjusted via an easy to recognize engine parameter terms on its display is desired. In this regard, a system is needed which allows engine parameter changes to be made quickly without the need of reference materials and provide safeguards to prevent for inadvertent changes in one engine control parameter which may dampen performance or result in engine damage. It would be desirable to provide a programmable engine control system capable of controlling multiple functions such as gear shifting, individual and multiple cylinder timing, RPM, and fuel controls in one box thereby reducing the number of electronic units needed in the race vehicle. A system which allows the user to view real-time engine parameter values during engine tuning operations is also desired. Furthermore, a cost effective engine control system for both the racer and to manufacture, is desired which is adaptable to multiple forms and types of race vehicles.

SUMMARY OF THE INVENTION

The present invention provides a unique approach to controlling engine control parameters by providing a menu-driven system which limits which engine parameters the user may change at one time. The present system and method utilizes a menu driven hand-held programmer, or in the alternative a computer, which directs the user through various engine control parameters using easy to recognize terms.

In racing application such as drag racing, racers are won and lost by thousandths of a second. Therefore, optimum performance must be achieved during each run to increase efficiency and gain consistency while preventing damage to the engine. One method of increasing consistency and protecting the engine is to limit the RPMs ("revlimit") the engine speed during specific events of the drag race. For example, the racer may desire to control the maximum RPM the engine can reach during the burn-out portion of the race. A burn-out is a procedure which involves either rolling through water and spinning the tires at high RPM once on dry pavement or spinning the tires in the water while using the front brakes to hold the car. This spinning warms the surface temperature of the tire which increases the stickiness of the rubber for a greater grip at the starting line. However, during the burn-out, the engine RPM may rise significantly because the tires are spinning instead of moving the racecar or racebike under a load. Therefore, in high RPM engines, it is advantageous to limit the RPMs the engine may turn to prevent the engine from reaching these high RPM; thereby preventing catastrophic failure of the engine.

Another portion of a drag race the racer may desire to control RPMs is during the launch stage. After the driver has completed the burn-out, the driver will roll the front tires into a set of light beams, thereby "staging" the car. Once staged, the racer will either activate a transbrake which holds the transmission in first and reverse or engage the clutch of a manual transmission such as a racebike, and hold the vehicle using a hand brake or foot brake. The driver will then "mat" the accelerator pedal or hand throttle to increase the engine RPMs to allow the engine to be at high RPMs when the vehicle is launched. Again, without controlling the maximum RPMs the engine may reach, the engine may reach extremely high RPMs which may in turn result in engine component failure. Thus, it is desirable to have a revlimiter for the launch portion of the race. Similarly, the driver may desire to control the maximum RPMs the engine may reach over the entire run of the race to prevent "red-lining" and engine damage.

The racer will typically make these types of revlimit adjustments, as well as gear shift settings and others, before and after a run at the track to achieve the desired performance. However, the racer must be able to quickly input the adjustments due to the short time available between runs. Accordingly, it can be extremely confusing and inconvenient for the racer to refer to reference manuals or code-key sheets to input adjustments to engine control parameters such as required by the previously described system. Furthermore, a light-weight programmer which may be easily held and quickly viewed is required so that the racer can make adjustments without having to carry a computer to the vehicle or walking back and forth between the computer and the racecar or racebike.

The present invention provides easy-to-read indicia which are word-based allowing the racer to make the desired adjustments by scrolling through menus and switching screens depending on the words read on the screen. This eliminates the needs for referring back and forth between the screen and a code book. The interface displays the indicia in English or other foreign languages may be used tailored to the preferred language of the user. Furthermore, many racers collect data from the run using computer-based electronics. These systems provide for down-loading the data after the run and viewing the data on a computer to determine what adjustments are needed. In one form, the invention provides the racer the option to view engine control parameters such as individual cylinder timing and an ignition timing run curve that represents timing changes over the entire run on a computer display in graphical representations. This allows the racer to quickly view the information without scrolling through excess data and allows the racer to make quick decisions and changes based on the data displayed. Also, the user may program a single value for controlling the revolutions per minute at the launch of the race by using another interface, a small module with rotary dials which can be mounted in the cockpit of the racecar on the instrument panel of the motorcycle or a body faring for control by the driver or a racing crew member who helps position the motorcycle or car on the starting line.

The present invention allows for maximum RPM controls to be set by selecting one menu screen which displays selection choices of maximum RPM controls as used in drag racing applications. For example, the user may select and input the maximum RPM setting during the burn-out, thereby eliminating the need for tedious resistor-chips or dials. Instead, the present invention allows inputting the actual RPM number in one hundred degree increments using a keyboard on the small, approximately 3.5 inches by 3 inches, hand-held programmer and the value can be easily viewed on the 1 inch by 2 inches screen. Furthermore, these RPM controls may only be changed while in the RPM menu which is distinctly identified on the screen as the RPM values are inputted which thereby help to prevent inadvertent changes.

Ignition timing can also be controlled at various stages of the drag race. For example, the racer can retard the ignition timing during the launch of the race car from the starting line and select a ramp of the ignition timing curve as the RPM increase. Furthermore, the menu system also allows for retarding the ignition timing as a function of RPM by numerically inputting the RPM and degree of retard timing necessary for that RPM. This is especially helpful for race vehicles which utilize a turbo charger or those which inject nitrous oxide into the air/fuel mixture. In the alternative, the user may select a launch or run curve which allows the user to specify the ramp-up of the ignition timing during the launch of the race vehicle from the starting line or during the entire run. Again, the user simply inputs the RPM value and the corresponding desired degree of timing retard and continues to input those values over the duration of the run or the launch. In addition, the race may retard ignition timing as a function of MAP pressure. The user inputs the value of MAP and the corresponding timing retard value.

The present invention can also provide independent timing retard of individual cylinders. While in the cylinder degree menu, the user may input the degrees of timing retard for each individual cylinder by selecting the cylinder and numerically inputting the degrees of timing retard from 0 to 5 degrees in 0.1 degree increments. This allows the user to optimize the performance of each individual cylinder. For example, if a cylinder, or more if needed, is creating a higher internal pressure than the rest, that cylinder will burn more efficiently if fired earlier. Thus, the present invention allows the user to set ignition timing for all cylinders and, at the same time, change the timing of one cylinder.

The engine function, gear shifting parameters, can be used to illuminate a gear shift-light or to automatically control a shifter for an automatic transmission. The user may select up to five gear shift parameters by numerically inputting the RPM per shift-light indicator, or shift. Further, ignition timing can also be retarded in response to a change in gear. Also, an ignition interrupt can be programmed for each gear shift which is often used by motorcycle racers. Thus, the need for a separate gear shift controller is eliminated by combining a revolution limiter, ignition timing, and gear shift controller in one system.

An alternative embodiment of the present invention provides for the control of electronic fuel injection. With the electronic engine controller, the user may control the percentage of fuel delivered to the combustion chambers as a function of engine RPM. The user may utilize multiple parameters in selecting the specific RPM and corresponding percentage of fuel added. The present invention allows the user to view and consider ignition timing and RPM values which trigger gear shifting before selecting the fuel addition values.

Another form of the electronic controller provides for controlling fuel injection which may be used as an alternative to carbureted systems and provide for more precise delivery of fuel to the combustion chambers or cylinders of the engine. The electronic engine controller allows the user to specify the amount of fuel delivered as a function of RPM. More particularly, the amount of fuel is controlled by the length of time the injector is open. The electronic engine controller expresses this time as a percentage of the time between firing of the spark plugs. The corresponding indicia for the fuel injection control function is "FuelAdd" and is programmable from 0 to 100% on an 0.5% increment as a function of RPM from 800 to 12,500 RPM in 100 RPM steps.

The programmable electronic engine controller utilizes a non-volatile memory to store the inputted parameters and the corresponding indicia of the engine functions. Thus, once the hand-held programmer or a computer connection of a computer is removed, the engine control parameters are stored in the non-volatile memory in the electronic controller. These values may only be changed when the programmer or a computer is interfaced with the controller. The electronics of the engine controller is configured such that certain components may or may not be used depending upon the race application. For example, the super stock racer who cannot use electronic fuel injection can use, the electronic engine controller which does not provide the injector outputs a MAP sensor inputs. However, the motherboard provides the space for the electrical components to provide these input and outputs. This also provides the flexibility for the racer to "upgrade" the electronic engine controller at a later time.

The details of the invention, together with further objects and advantages of the invention, are set forth in the detailed description which follows. The precise scope of the invention is defined by the claims annexed to and forming a part of this specification.

BRIEF DESCRIPTION OF THE DRAWINGS

A better understanding of the present invention is obtained when the following detailed description is considered in conjunction with the following drawings in which:

FIG. 1 is an diagrammatic view of an internal combustion engine, programmable electronic controller and related components according to the invention;

FIGS. 4A and 4B are displays of data menu trees, depicting the engine control groups and engine control value change window;

FIGS. 6A–6G are schematic diagrams of the electronic controller;

DETAILED DESCRIPTION OF THE PREFERRED EMBODIMENTS

Figure 2A:
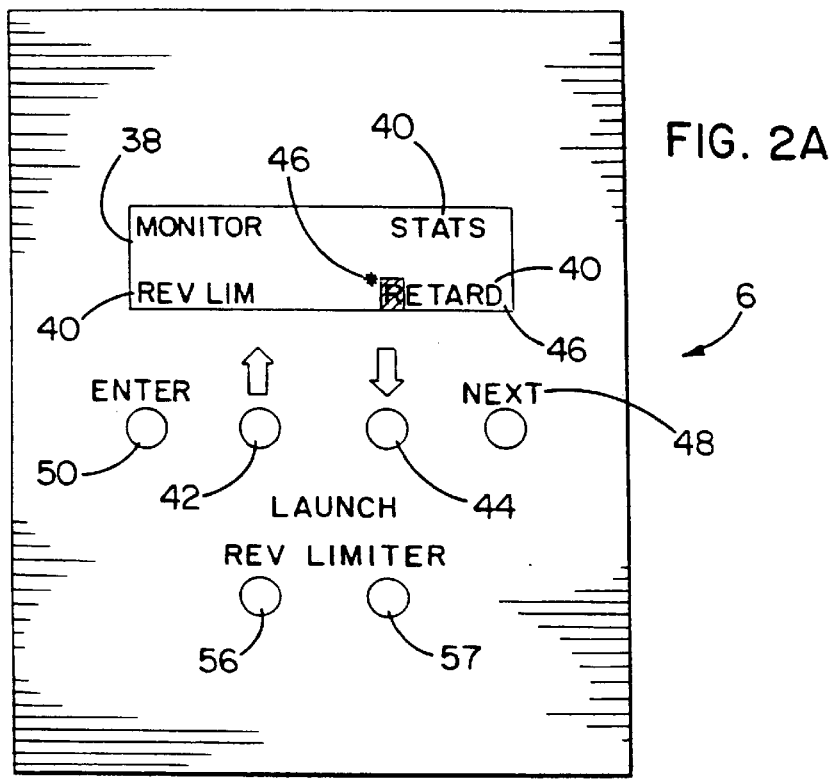
FIGS. 2A and 2B are plan views of a hand-held programmer.

FIG. 1 illustrates a preferred form of a programmable electronic control system 2 as used with an internal combustion engine 4. A programmable electronic ignition controller 10 is provided which allows a racer to use an interface in the form of a hand-held programmer 6 or alternatively, a personal computer 8, such as a lap-top computer to readily make adjustments to the engine operational parameters via the electronic controller 10. Both the hand-held programmer 6 and the computer 8 communicate with an electronic controller 10 via a data connection 12. A conventional lead-acid, twelve volt battery 14 can supply the electrical current to the electronic controller 10.

The programmable electronic control system 2 functions as a digital, multispark, capacitive discharge ignition system with user programmable features, such as an RPM switch, gear shift controller and revlimiter controller. The user, typically a racer, may program the ignition system using the hand-held programmer 6 or a computer 8 to control various engine control parameters during various stages or conditions of a drag race. The hand-held programmer 6 uses a menu based system to displays indicia of engine functions on an LCD screen 38 as depicted in FIG. 2A. The indicia are words or abbreviated words, e.g. racing jargon, to allow the indicia to fit on the limited size screen. By using a word based system, the racer does not have to inconveniently refer to separate materials such as code or reference books or the like to interpret the indicia displayed on the screen 38. One engine function that may be programmed is the maximum revolutions the engine can turn during various stage of the drag race. Most engine functions have multiple parameters, such as controlling the RPMs at different stages of the race. Specifically, these engine control parameters include the burn-out revlimit, launch revlimit and maximum revlimit to prevent over-revving of the engine.

The programmable electronic controller 10 also allows the racer to control ignition timing engine control functions such as programming multiple ignition timing retards, multiple engine control parameters, from the start of the race to over the entire run. The retard start engine control parameter, or the indicia "RetStart" as displayed on the hand-held programmer 6, retards the ignition timing at the start of the engine, 0 RPM, through 800 RPM to the value programmed by the racer on the hand-held programmer 6 or computer 8. Further, the racer may delay the step retard by using the step retard deactivation delay parameter, or the "StepOffDelay" indicia, which provides for delaying the retard step from 0 to 2.50 seconds. Similarly, the launch retard, or "RetLaunch" indicia, allows the racer to program an ignition timing retard value to be activated at the launch of the drag race and the electronic controller 10 gradually removes, or ramps up, the programmed ignition timing retard over the number of seconds the racer has programmed.

The multi-stage retard feature of the programmable electronic controller 10 provides the racer the capability of programming three step retards at three user programmed RPM values. The hand-held programmer 6 indicia of "Step 1," "Step 2," and "Step 3" of the Retard values prompts the racer to enter the degrees Retard and the enable RPM value and corresponding ignition timing retard value in degrees of crankshaft rotation. Also, the user can program the step Retards to become actual at a programmed RPM or to become actual as soon as a respective step-input select wire is active by applying 12 volts to the select line. Furthermore, the racer may also retard the ignition timing over the entire run of the race (from start, 0 RPM, to maximum, 12,500 RPM) or just over the launch. The corresponding indicia as displayed by the hand-held programmer 6 or computer 8 are "RunCurve" and "LaunchCurve". Furthermore the racer may program ignition retards as a function of engine manifold absolute pressure (MAP) often referred to as "boost" and measured in pounds per square inch. (PSI) The indicia "BoostCurve" corresponds to this function which allows the user to program an ignition retard curve of degrees retard timing from 0 to 25 degrees in 0.1 degree increments as a function of "boost" over user selectable ranges from 2 PSI to 30 PSI or 2 PSI to 45 PSI absolute increments.

Another engine control parameter of the programmable electronic controller 10 is the gear shift parameter or "ShiftLight" indicia as displayed by the hand-held programmer 6 or computer 8. The gear shift-light allows the racer to program at what RPM a gear shift light 34 or alternatively, automatic shift controller 37 shifts. Furthermore, the racer may also program ignition timing retards as a function of these gear shifts using the gear retards or "Gear#" indicia as seen on the hand-held programmer 6 or computer 8. These gear retards activate when the corresponding gear has shifted and retard the timing to the racer programmed value. For motorcycle transmissions the programmable electronic controller 10 also allows the user to program an ignition interrupt for a specified duration. This interrupt prevents the spark plug 36 from firing by delaying the discharge of ignition coil 32. This interrupt is commonly referred by racers as "killing" the engine. Interrupting the firing of spark plug 36 for a sufficient amount of time helps ensure that the transmission has fully completed its shift before firing the spark plug 36 and increasing engine PMS. Thus, electronic engine controller 10 uses the indicia of "kill" for this engine.

Another engine control parameter electronic controller 10 commands is individual cylinder timing. The racer may program a retard for one or more cylinders of different degrees by first entering the number of cylinders the engine has by selecting the "CylCnt" indicia (representing "cylinder count"), and following with the corresponding retard amount for each cylinder as identified by the cylinder firing order as "SparkSeq1," "SparkSeq2," "SparkSeq3," and so forth.

Turning to a representative programmable electronic control system 2 shown in FIG. 1, electronic controller 10 can receive an input signal from a distributor 16 or alternatively a magnetic crank trigger 18 may supply the input signal to the electronic controller 10 when distributor 16 is present or not in the case of a distributor-less ignition system commonly referred to as direct ignition systems (DIS). A magnetic crank trigger 18 senses the position of the balancer or dampener 20 mounted on the crank of the engine 4 or alternatively the flywheel (not shown). The electronic controller 10 also may receive an input signal from either a spark plug firing sensor 22 mounted on spark plug wire 24 connected to the spark plug 36, or in an alternative form, a cam position sensor 28 which detects position of the camshaft 30. Another form of the electronic controller may receive an input signal from a pressure transducer (not shown) mounted in the intake manifold (not shown) which senses manifold absolute pressure (MAP).

The electronic controller 10 provides a signal to an ignition coil 32 which in turn, provides the high voltage, high current signal to the distributor 16 or in the case of a distributor-less ignition, to an electronic control unit (ECU) (not shown). The distributor 16 or ECU distributes the high voltage, high current signal to the spark plug 36 partially located in the cylinder of the engine 4. A tachometer 33 may be connected to the electronic controller 10 for displaying real-time engine revolutions per minute (RPM). The electronic controller 10 may also provide a signal to a gear shift light 34 or alternatively, an automatic transmission shift controller 37. This signal may also be used by the electronic controller 10 to interrupt the signal sent from coil 32 to the spark plugs 36 to "kill" the engine for a user specified duration of time to ensure the transmission has completed the shift before firing a spark. Alternatively, the gear shift signal can also be used to add a delay (in seconds) before triggering the engine kill. Furthermore, the electronic controller 10 may also act as an RPM on-off switch which is activated when the electronic controller 10 senses the engine has reached a predetermined user inputted RPM value.

Figure 2B:
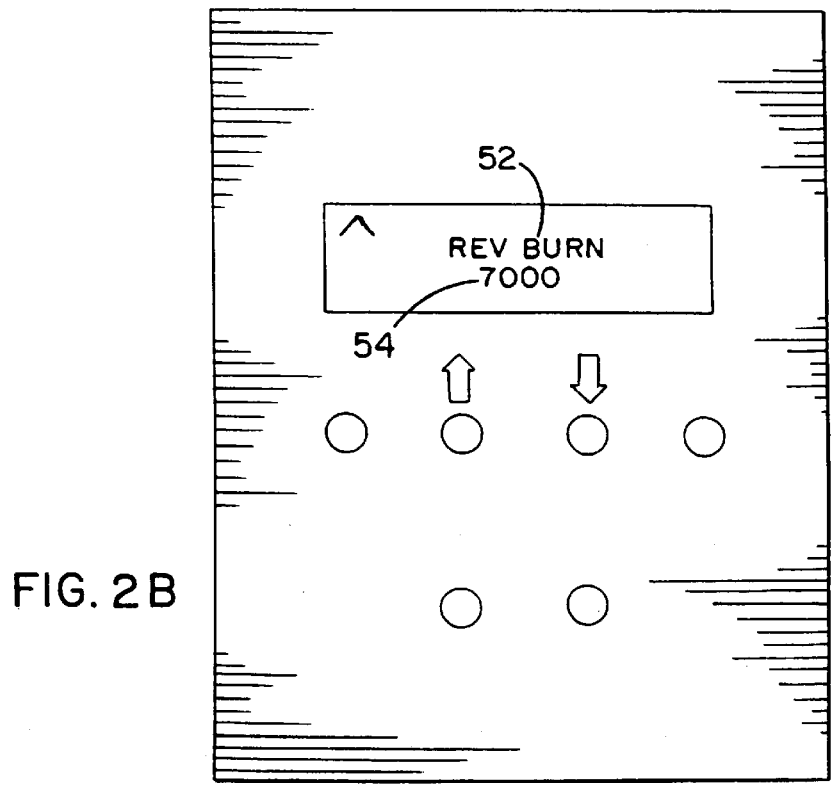

FIG. 2 depicts the hand-held programmer 6 as used in one form of the programmable electronic control system 2. So that the programmer 6 can be hand-held, it has relatively small predetermined dimensions such as on the order of approximately 3.7"×4.7"×1.3". A liquid crystal display (LCD) 38 is used to display engine control groups 40, selection choices, and the stored or default engine control values. In the illustrated form, the LCD screen 38 has dimensions of 2.25"×0.55" for displaying two lines and broken down into four fields; however, other arrangements for producing output of readable form on the LCD screen can also be employed. The values of the engine control parameters of the electronic controller 10 are accessed through a menu structure and do not have to be separately accessed or looked up in reference materials apart from the output displayed on the screen 38. The hand-held programmer 6 first displays engine control groups 40 on the display screen 38 using indicia easily recognized by the drag racer. The remainder of the engine control groups are displayed by scrolling up and down using UP key 42 and the DOWN key 44 on the face of the hand-held programmer 6. The NEXT key 48 moves the cursor between fields (see FIG. 2C) from the top to the bottom. The UP and DOWN keys, 42 and 44 respectfully, can move the selection cursor 46 indicated by the first character blinking in the field to the top left hand corner or at the bottom right hand corner of the display screen 38 to indicate that the hand-held programmer 6 will display the previous or the following engine control groups 40 as selected by UP key 42 and DOWN key 44.

The NEXT key 48 is used to move from one field, engine control (function) group 40, to the next on the LCD screen 38. The first letter of the field or displaying the engine control group 40 will blink to indicate it has been selected. Once the field is activated, as indicated by the blinking of the first character of the word displayed, it may be selected by pressing the ENTER key 50. Once selected, the individual engine control parameters 52 of the engine control group 40 are displayed on the LCD screen 38. To view or edit the values of an engine control parameter 52, press the NEXT key 48 until the first character of the desired engine control group 52 blinks. Pressing the ENTER key 50 will display the last stored or default value for the selected engine control parameter 52. The displayed engine control parameter value 54 may be increased or decreased by using the UP key 42 and DOWN key 44 respectively. Once the desired parameter value 54 is displayed, the engine control parameter value 54 is saved by pressing the NEXT key 48. After the NEXT key 48 is pressed, the hand-held programmer 6 will display three fields: save, cancel, and default item. Any of these fields may be selected by pressing the NEXT key 48 or the ENTER key until the first character of the desired feature blinks. When the "S" of SAVE is blinking, pressing the ENTER key 50, will save the engine control parameter value 54 in memory of electronic controller 10. The engine control value 54 may be ignored (not saved) by selecting CANCEL using the NEXT key 48. The default factory values can also be restored by pressing the NEXT key 48 until the "D" of DEFAULT blinks, and pressing the ENTER key 50. The hand-held programmer 6 also contains two launch revlimiter keys 56 and 57 on the face of the unit to provide quick access to this often adjusted engine control parameter 52. At any menu screen, the engine control parameter value 54 for the launch revlimiter engine control parameter 52 may be displayed by pressing one of the launch revlimiter keys 56 or 57. This engine control parameter value 54 may then be changed using the UP key 42 and the DOWN key 44. The asterisk (*) indicates nested menus (** indicating menus above) and the carrot ^ provides a return to the above menu item, which are selectable with the NEXT key 48.

Figure 3:
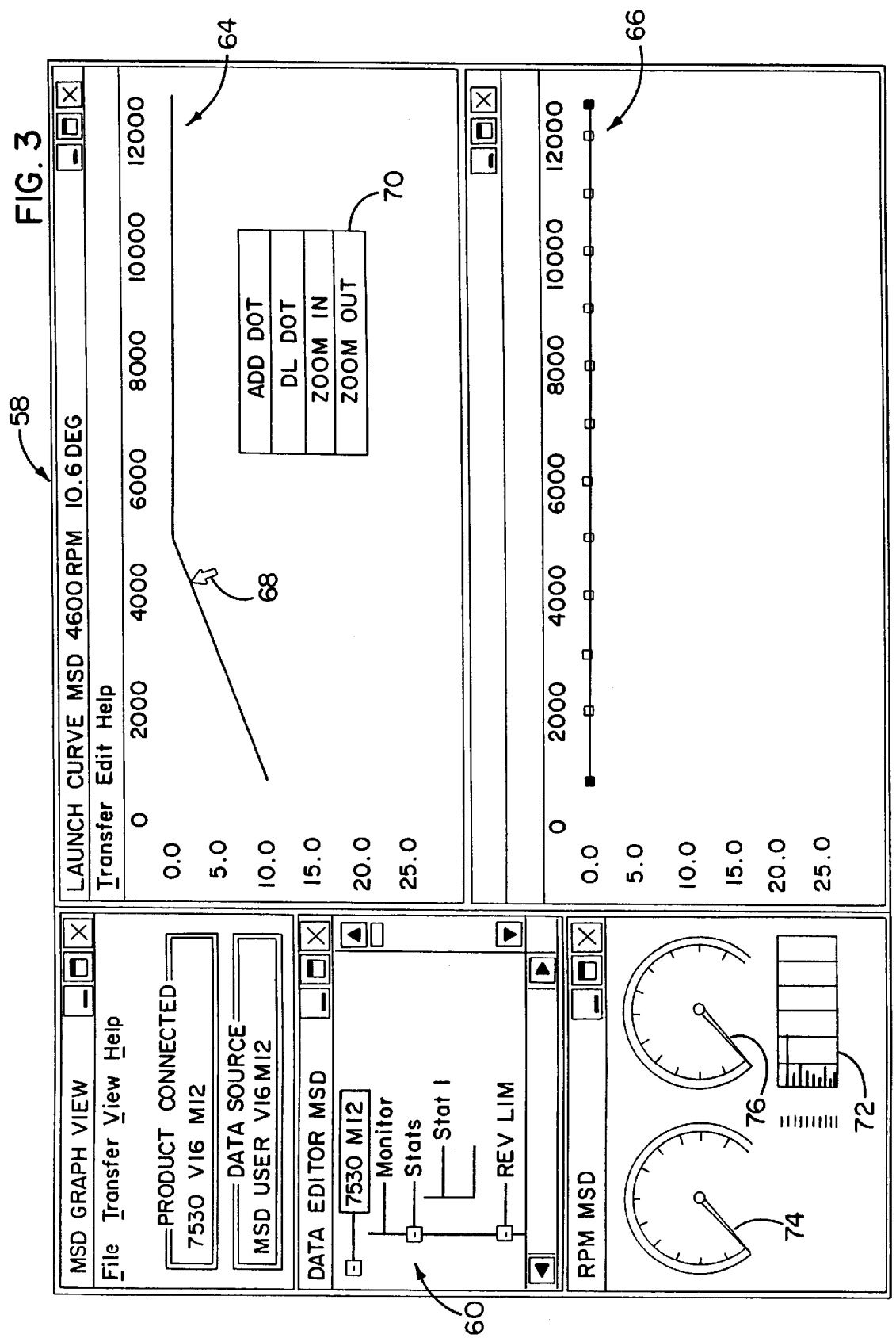
FIG. 3 is display of a screen of a personal computer that can be used in conjunction with the electronic controller.
Figure 4B:
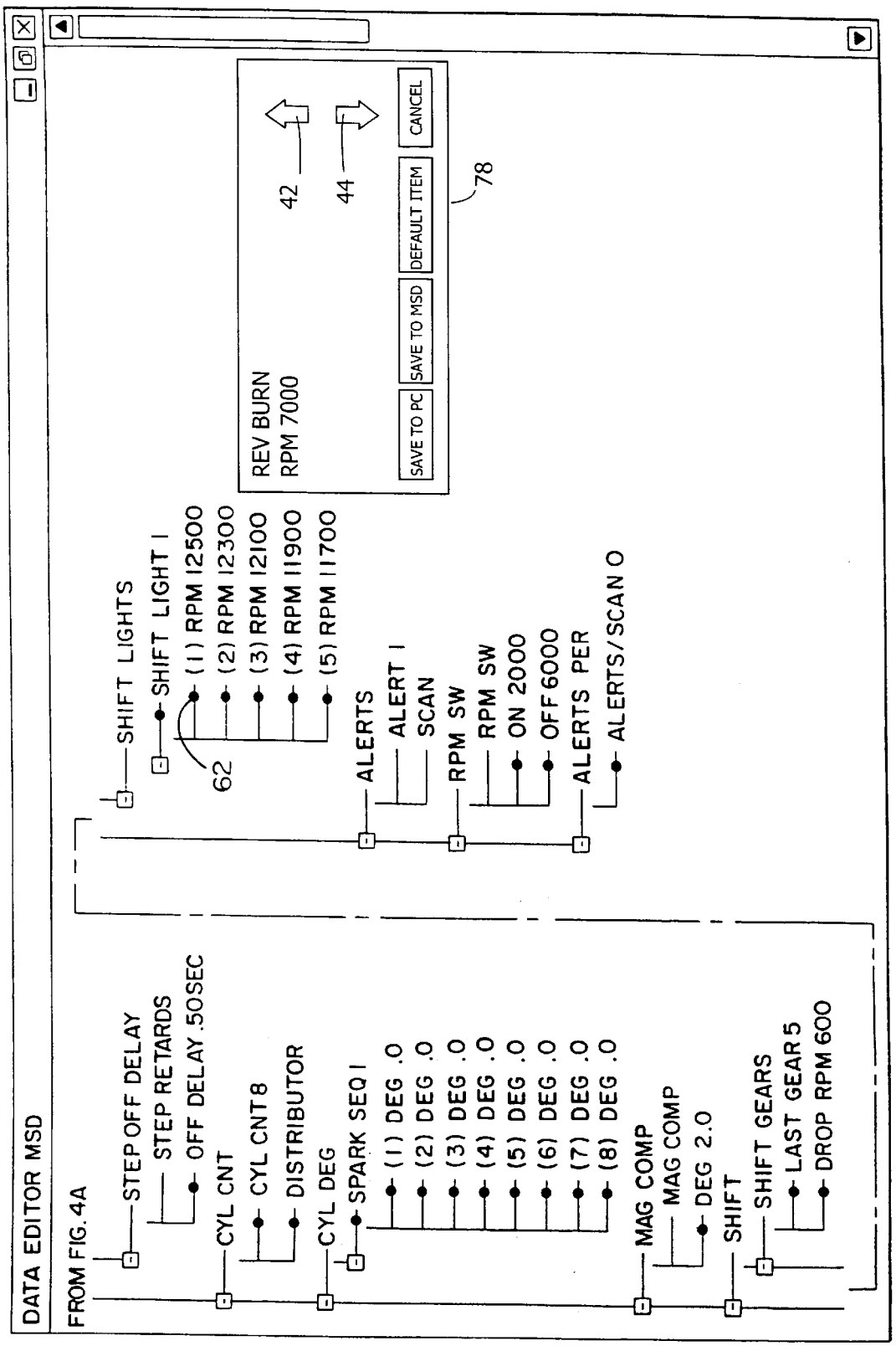

FIG. 3 illustrates a typical screen 58 produced when one form of the electronic controller 10 is connected to a computer 8. The engine control parameter groups 40 are presented to the user in a data tree structure 60 on the computer screen 58. Individual engine control parameters 52 are listed below each engine control group 40 as a lower branch of the data tree 60 as shown in FIGS. 4A–B. Branching from the engine control parameter 52 is the last stored or default engine control parameter value 54. An edit indicator dot 62 is located next to each engine control parameter value 54 and changes color from black (saved) to red (pending), when the user has edited the engine control parameter value 54. The engine control parameter value 54 may be selected by placing the mouse pointing cursor on any portion of the line or text identifying the engine control value 54.

The computer screen 58 also displays two ignition timing curves, the run timing retard curve 64 and the launch timing retard curve 66 however, alternative forms of the present invention may display other curves by FIG. 3. The x-axis represents engine RPM while the y-axis represents degrees of timing retard. Points may be added to the ignition run timing retard curve 64 and the launch ignition curve 66 by placing the computer mouse pointing cursor 68 on the desired location of the curve of graph 64 and clicking the right mouse button. Once the right mouse button is clicked, a drop-down point-data window 70 appears which asks the user if a new point is desired. Once a point is added to a graph, the point may be "grabbed" by placing the pointing cursor 68 on the point, and while holding down the left mouse button, dragging the point to the desired position. Points may be added to these curves 64 or 66 at 100 RPM intervals and moved up and down in 0.1 degree intervals.

Also depicted on computer screen 58 shown in FIG. 3 is a graphical representation of the individual cylinder timing retard 72. The y-axis of the bar graph represents the individual cylinders (8, 6 or 4 as displayed by the depicted form of the electronic controller) and the x-axis depicts degrees of retard timing. The computer screen 58 also includes a graphical tachometer 74 and an ignition timing retard degree dial 76 which during operation of the engine 4 displays a real-time presentation of RPM's and corresponding ignition timing retard.

The complete engine control data tree 60 this form of the electronic controller 10 is shown in FIGS. 4A and 4B. Engine controls parameters 52 are changed by placing the mouse pointing cursor 68 on any portion of the line with an edit indicator dot 62 located next to the engine control parameter value 54. When the line is clicked with the left hand button of the computer mouse, a value change window 78 appears on the computer screen 58. The value change window 78 displays the engine control parameter 52 and the default or last stored engine control parameter value 54. In the same manner as utilized by the hand-held programmer 6, the engine control parameter values 54 may be increased or decreased by placing the mouse pointing cursor 68 on the graphical UP key 42 or the DOWN key 44 and clicking the mouse. One click of the mouse 42 increases or decreases the engine control parameter value 54 by the smallest increment for that particular engine control parameter 52, i.e., 1 degree, 0.1 degree, 100 RPM, etc. Once the value has been edited, the color of the edit indicator dot 62 changes to red to signify that the racer has changed that particular engine control parameter value 54. Unlike the hand-held programmer 6, the engine control parameter value 54 could also be changed by typing the value directly using a computer keyboard. The default factory engine control values 54, the value range and the minimum increment of each engine control value 54 for one form of the programmable electronic controller is listed below:

| Engine Control | Default Value | Value Range | Increment |
|---|---|---|---|
| ShiftLight1 | 12,500 | 2,000–12,500 | 100 RPM |
| ShiftLight2 | 12,300 | 2,000–12,500 | 100 RPM |
| ShiftLight3 | 12,100 | 2,000–12,500 | 100 RPM |
| ShiftLight4 | 11,900 | 2,000–12,500 | 100 RPM |
| ShiftLight5 | 11,700 | 2,000–12,500 | 100 RPM |
| Gears | 5 | 1–6 | 1 |
| Gear 3 (Retard) | 0 | 0–5.0 | 0.1 deg. |
| Gear 4 | 0 | 0–5.0 | 0.1 deg. |
| Gear 5 | 0 | 0–5.0 | 0.1 deg. |
| Gear 6 | 0 | 0–5.0 | 0.1 deg. |
| MagComp | 2.0 | 0–3 | 0.5 deg. |
| RevBurn | 7,000 | 2,000–12,500 | 100 RPM |
| RevLaunch | 6,200 | 2,000–12,500 | 100 RPM |
| RevMax | 9,500 | 2,000–12,500 | 100 RPM |
| RetStart | 10 | 0–25 | 0.1 deg. |
| RetardDeg1 | 2.0 | 0–15.0 | 0.1 deg. |
| RetardDeg2 | 3.0 | 0–15.0 | 0.1 deg. |
| RetardDeg3 | 5.0 | 0–15.0 | 0.1 deg. |
| RetardRPM1 | 800 | 800–12,500 | 100 RPM |
| RetardRPM2 | 800 | 800–12,500 | 100 RPM |
| RetardRPM3 | 800 | 800–12,500 | 100 RPM |
| RetLaunch | 0.0 | 0–15.0 | 0.5 deg. |
| RampTiming | 0.50 | 0–2.50 | 0.01 sec. |
| Spark1 | 0 | 0–5.0 | 0.1 deg. |
| Spark2 | 0 | 0–5.0 | 0.1 deg. |
| Spark3 | 0 | 0–5.0 | 0.1 deg. |
| Spark4 | 0 | 0–5.0 | 0.1 deg. |
| Spark5 | 0 | 0–5.0 | 0.1 deg. |
| Spark6 | 0 | 0–5.0 | 0.1 deg. |
| Spark7 | 0 | 0–5.0 | 0.1 deg. |
| Spark8 | 0 | 0–5.0 | 0.1 deg. |
| CylCnt | 8 | 4/6/8 | |
| Distributor | Distributor | Distributor or Crank Trigger | |
| DropRpm | 600 | 500–1500 | 100 RPM |
| RunCurve | 800 | 800–12500 | 100 RPM |
| RunCurve | 0 | 0.0–25.0 | 0.1 deg. |
| LaunchCurve | 800 | 800–12500 | 100 RPM |
| LaunchCurve | 0 | 0.0–25.0 | 0.1 deg. |
| StepOffDelay | 0.50 | 0–2.50 | 0.01 sec. |
| RpmSw On | 2,000 | 2,000–12,500 | 100 RPM |
| RpmSw Off | 6,000 | 2,000–12,500 | 100 RPM |

Figure 5A:
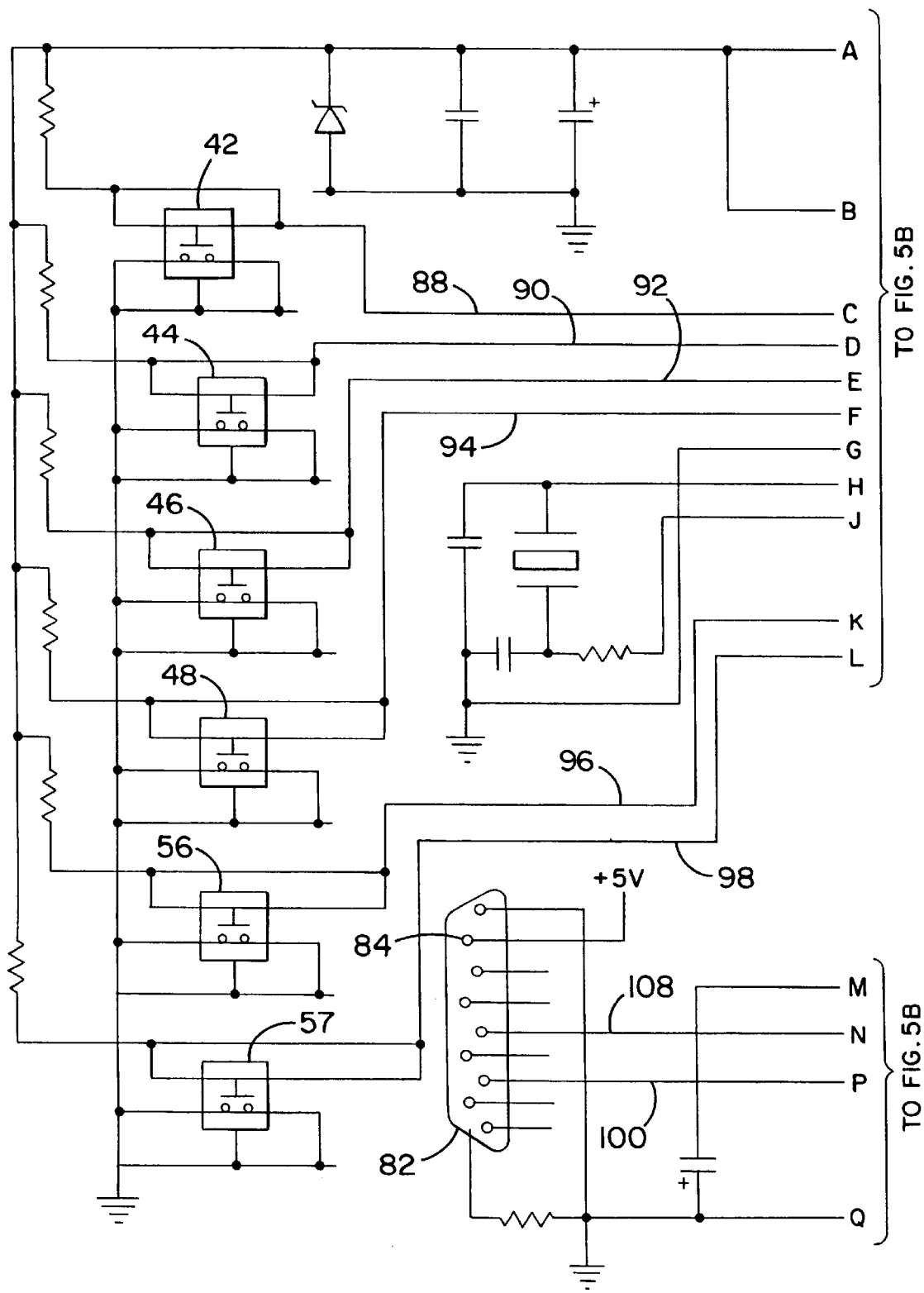
FIGS. 5A–5B are schematic diagrams for circuitry of the hand-held programmer in accordance with the invention.
Figure 5B:
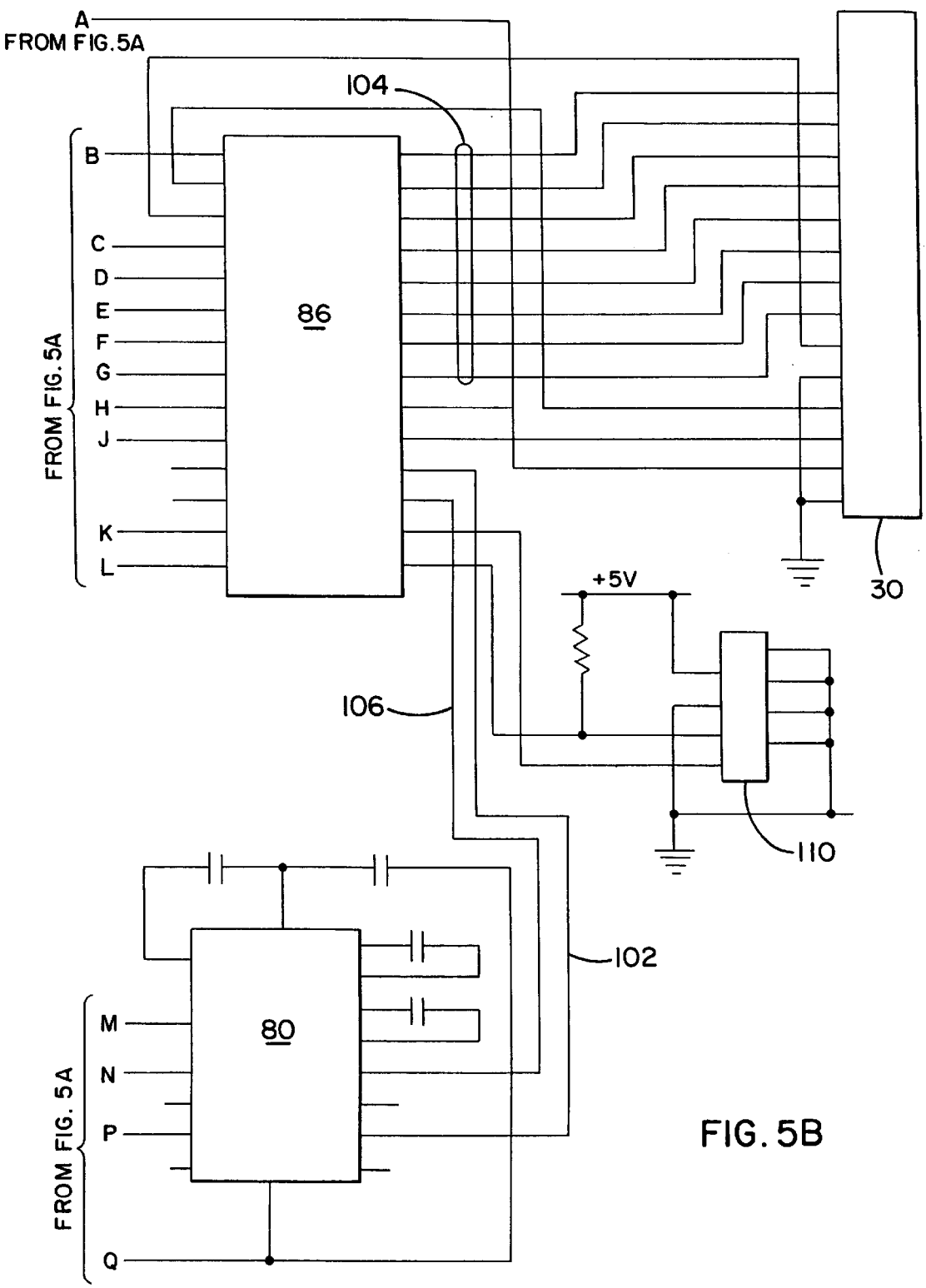

FIGS. 5A and 5B are schematic diagrams for the circuitry of the hand-held programmer 6 which communicates with the electronic controller 10 and interfaces with the user via the LCD display 38. The hand-held programmer 6 communicates with the electronic controller 10 via data connection 12 using a standard RS232 driver and receiver 80 and interfaces with the electronic controller 10 using a nine pin serial (DB-9) connection 82. The electronic controller 10 provides a +5 volt signal via the serial connection 82 at input terminal 84 to power the RS232 driver and receiver 80. As is well known, the RS232 driver and receiver 80 generates the proper voltage levels for a microcontroller 86, switches 42–56 and the LCD display 38. In one form, a MicroChip PIC 16C63A 8-bit CMOS microcontroller was utilized.

Various receive and control paths are used by microcontroller 86 to receive user inputs, electronic controller 10 inputs, to control LCD screen 38, and send data to electronic controller 10. A switch input path 88 provides a user input from UP key 42, switch input path 90 provides a user input from DOWN key 44, switch input path 92 provides a user input from NEXT key 48, switch input path 94 provides a user input from ENTER key 50, switch input path 96 provides a user input from LAUNCH REV LIMITER key 56 and switch input path 98 provides a user input from LAUNCH REV LIMITER key 57. The electronic controller 10 communicates via the data connection 12 and input path 100 provides input to the RS232 driver and receiver 80. In return, the RS232 driver and receiver 80 sends the data to the microcontroller 86 via input path 102. Control path 104 allows microcontroller 86 to control the display of LCD display 38 and produce words for the user to read. Microcontroller 86 sends outputs via send path 106 to the RS232 driver and receiver 80 which, in return, is sent via send path 108 to the electronic controller 10.

The hand-held programmer 6 (illustrated in FIG. 1) is an in-house unit used for development purposes. This unit contains non-volatile memory 110, MicroChip 24LC65, CMOS Smart Serial™ EEPROM, which is used as an on-board EEPROM loader for in-house programming of ignition controllers. Hand-held programmer 6 does not store engine control parameters 52 or values 54; hand-held programmer 6 merely displays engine control parameters 52 and values 54 received from electronic engine controller 10.

FIGS. 6A–G are schematic diagrams of the circuitry for one form of the electronic controller 10 used to control RPMs, ignition sparking, ignition timing spark retard, and switches of the internal combustion engine 4 during various stages of a drag race. Data is transferred from either the hand-held programmer 6 or computer 8, and via the data connection 12 through a 9-pin serial connector 112. A RS232 driver and receiver 114 provides the proper voltages to a microcontroller 116 used to control the functions of the electronic controller 10. One form of the electronic controller 10 utilized MicroChip PIC 16C76 8-bit CMOS microcontroller with analog-to-digital converter. Microcontroller 116 contains 368 bytes of RAM and utilizes electrically erasable programmable read-only memory (EEPROM) to store and execute the program used to control the engine 4. Engine control parameter values 54 are stored in a non-volatile memory 118. One form of the electronic controller 10 used a MicroChip 64K 2.5V CMOS Smart Serial™ EEPROM. Microcontroller 116 controls the data transmissions to non-volatile memory 118 by generating a serial clock signal. Data connection 120 provides the serial clock signal to non-volatile memory 118. When data connection 120 is high, non-volatile memory 118 will receive data via data connection 122.

As described earlier, the engine control parameter groups, representing the engine functions are organized in the menu tree 60 and parameter values 54 are stored in non-volatile memory 118 of the electronic controller 10 which communicates these values to computer 8 or hand-held programmer 6. The non-volatile memory 118 of the electronic controller 10 is divided into memory locations called "pages" and the preferred form contains thirty-two pages of 256 bytes each with the following reserved locations:

| Page | Address | Contents |
|---|---|---|
| Page 0 | 00–15 | EEPROM Page Directory |
| Page 0 | 16 | Alerts per scan |
| Page 0 | 17–24 | Alert select list |
| Page 0 | 25–29 | Spare |
| Page 0 | 30–31 | Monitor hold select |
| Page 0 | 32–47 | Monitor select list |
| Page 0 | 48 | Stat select |

| Page | Address | Contents |
| --- | --- | --- |
| Page 0 | 50–255 | Product Data Values |
| Page 1 | 00–15 | Text name of menu part number and version |
| Page 1 | 16–255 | Default values for Page 0 |

To allow future changes, upgrades and multiple versions of electronic engine controller 10, the directory accommodates changes in menu tree 60 sizes without requiring changes to the hand-held programmer 6 or the software used by the computer 8. The EEPROM directory is stored in Page 0 and below.

| | Address |
| --- | --- |
| 0 | Not in use |
| 1 | eeProm page number of product data values |
| 2 | eeProm page number of product default values |
| 3 | eeProm page number of product undo mirror |
| 4 | eeProm page number of "menu fields" |
| 5 | eeProm page number of "format selects" |
| 6 | eeProm page number of "data selects" |
| 7 | eeProm page number of "table indexes" |
| 8 | eeProm page number of "action tables" |
| 9 | eeProm page number of storage area for computer 8 |

Electronic controller 10 stores the menu field or names of the engine control parameter groups 52 in non-volatile memory 118. The directory for the menu fields is stored in page 0 at address location 4. One form of electronic controller 10 utilized two pages of non-volatile memory 118. however, more pages may be used for additional engine control parameter groups 52 and only one page may be needed when accommodating fewer engine control parameter groups 52 than used in the illustrated form. Each menu field is associated with four fields which refer to other memory pages for storing and recalling descriptive text of the engine control parameter 52, user data and the next menu fields for displaying on hand-held programmer 6. As viewed on the display 38 of hand-held programmer 6, each menu displays the four associated menu fields with that particular menu. Menu 1, Fields 1 through 4 are displayed at each corner of display 38 as follows:

| Field 1 | Field 2 |
| --- | --- |
| Field 3 | Field 4. |

For example, information is stored and recalled for the user to view on hand-held programmer 6 for one engine control parameter 52, or in other worlds, one menu, in the following locations:

| Address | Contents |
| --- | --- |
| 000–015 | Menu 1 |
| 00–03 | Menu 1, Field 1 |
| 0 | Format Select Number 1 from Format Select Page |
| 1 | Data Select Number 1 from Data Select Page |
| 2 | Index Select Number 1 from Index Select Page |
| 3 | Next Menu select Number 1 from Menu Fields Page |
| 04–07 | Menu 1, Field 1 |
| 4 | Format Select Number 2 from Format Select Page |
| 5 | Data Select Number 2 form Data Select Page |
| 6 | Index Select Number 2 from Index Select Page |
| 7 | Next menu Select Number 2 from Menu Fields page |
| 08–11 | Menu 1, Field 3 |
| 12–15 | Menu 1, Field 4 |
| 016–031 | Menu 2 |
| 032–047 | Menu 3 and so forth. |

The directory for the Format Select Page is located at page 0, address 5. One form of electronic controller 10 stored the Format Select Page at pages 9 and 10 of non-volatile memory 118. Each format select occupies sixteen address locations and contains ASCII text. For example, address locations 000 through 015 contains the ASCII text for Format Select 1, 016 through 031 contains the ASCII text for Format Select 2 and so forth. The contents of the form selects may be any ASCII character and is tailored to the specific form and application of electronic controller 10. Further, the format select may utilize special characters such as "#", "$" or "@" to refer to a user edited or stored value in non-volatile memory 118. For example, "RPM###00*" is a format select which signals electronic controller 10 to replace the characters "###" with the edited data value inputted by the user. Also the "*" character near cursor 46 on display 38 enables the user to scroll up to the previous menu when the "*" character is at the end of Field 2, or to scroll down, if at the end of Field 4. When the "$" character is substituted for the "#" character, electronic controller 10 recalls from non-volatile memory 118 the value from the corresponding Data Select Page. The "@" character is used to set the Copy Flag and is not shown on display 38. One form of electronic controller 10 contained the following reserved format selects:

| Reserved Format Selects | Contents | Function |
| --- | --- | --- |
| 1 | $$$$ | Monitor Scan ("OFF" or "SCAN") |
| 2 | Stat## | Stat Select |
| 3 | Hold | Monitor Hold |
| 4 | Alert Select | |
| 5 | Alert Scan | Alerts per scan |
| 6 | Spare | |
| 7 | Spare | |
| 8 | Spare | |
| 9 | Scan Time # | Monitor Scan time for 1 to 9 seconds |
| 16 | Second Monitor Item | |
| N | Last monitor Item | |
| N + 1 | Text for menu field. | |

The Data Select Page contains information about a specific Data Select and is referenced by a particular number, i.e., 1, 2, 3 and so forth, and the directory for the Data Select Page is located at page 0, address 6. A Data Select refers to a particular engine control parameter 52 and the corresponding engine control value or "data value." Each Data Select Page contains the values for sixteen Data Selects and multiple Data Select Pages may be required to accommodate the number of Data Selects for a particular form of electronic controller 10.

| Address | Value |
|---|---|
| 000–015 | Data Select 1 |
| 00–01 | RAM Address of Data Value |
| 02–03 | EeProm Address of Data Value |
| 04–05 | Low Limit for Data Value |
| 06–07 | High Limit for Data Value |
| 08 | Action 1 for Data Value |
| 09 | Action 2 for Data Value |
| 10 | Action 3 for Data Value |
| 11 | Action 4 for Data Value |
| 12 | Action 5 for Data Value |
| 13 | Action 6 for Data Value |
| 14 | Action 7 for Data Value |
| 15 | Action 8 for Data Value |
| 016–031 | Data Select 2 |
| 032–047 | Data Select 3 |
| 048–063 | Data Select 4 |
| 064–079 | Data Select 5 |
| . . . | |
| 224–239 | Data Select 15 |
| 240–255 | Data Select 16 |
| Data Select Page + 1 | |
| 000–015 | Data Select 17 and so forth. |

The value for a Data Select is stored in non-volatile memory 118 and is read by electronic controller 10. A specific data value must be contained between the high and low limits which are stored in non-volatile memory 118 as seen in the above table. Storing the high and low limits also allows electronic controller 10 to scroll from the high limit to the low limit and vice versa on the display 38 of hand-held programmer 6 or the drop down value change window 78 displayed on computer screen 58.

Returning to FIGS. 6A–G, battery 14 provides the DC current of sufficient power to power the internal circuitry of the electronic controller 10 including the ignition power and convertor circuitry and coil driver circuit which function as a programmable electronic ignition. The present ignition power, converter and coil driver circuitry is substantially similar to that disclosed in U.S. Pat. No. 6,196,208 B1, and assigned to the assignee of the present invention, which disclosure is incorporated as if reproduced in its entirety herein. The electronic controller 10 also contains the necessary circuitry to provide input signals to shift light 34 or automatic transmission shift controller 37, a tachometer 33, and an RPM switch.

The power circuit of the electronic controller 10 includes a current mode control integrated circuit (IC) 128 which may be a UCC 3803 or 3805 BiCMOS available from Unitrode. The ignition input 130 is supplied by battery 14 which is a typical 12.6 volt lead-acid automotive battery. Current is supplied to the electronic controller 10 from battery 14 at battery positive input 132 and battery ground 134. This ignition input 130 voltage ranges from a low of about 6 volts during cold cranking to as high as 16 volts during overcharge at cold temperatures. The ignition input 130 is also subject to "load dump" and transient voltages as high as +/−200 volts for microseconds duration. The load dump condition may increase the battery level to as high as +150 volts for up to 50 milliseconds. The ignition input 130 is also subject to being connected with reverse polarity of the battery input wires and battery charging terminals. Accordingly, a variety of input protection circuitry is provided.

The power circuit is first protected from battery polarity reversal by using a high current power MOSFET 136 that is reverse-biased when the battery is connected backwards. The diode of the power MOSFET 136 blocks the reverse potential and provides protection for all the circuitry of the electronic controller 10. A Zener diode 138 clamps the gate of MOSFET 136 to a maximum of 14 volts for gate protection and resistor 140 limits the current through diode 138 thereby fully protecting the power transistor of MOSFET 136 from voltage spikes present on the ignition input 130 wire.

Zener diode 142 acts as a second input protection device, functioning as a transient surge absorber. Diode 142 is capable of absorbing and clamping an alternator's (not shown) "load dump" output. Diode 142 is, for example, a 6KA24, available from General Instrument, Inc., and is rated at 6000 watt clamping power for 50 milliseconds at 45 volts maximum clamp voltage. Zener diode 142 begins clamping above 26 volts input. Therefore, the ignition must be capable of operation up to this input voltage for limited duty cycle. Also, Zener diode 142 protects the circuit from negative voltages greater than the avalanche breakdown voltage of the transistor of MOSFET 136. Resistor 144 may also be used to provide an RC time constant or filter effect at the gate of MOSFET 136. This ensures that the battery input 132 noise will not discharge the gate voltage of MOSFET 136 under normal operation. This ensures that MOSFET 136 stays fully enhanced (on).

The convertor section of the ignition circuit of electronic controller 10 is a high frequency flyback step-up convertor. It includes the current mode control IC 128 and input power conditioning, clamping components, temperature feedback sensing, $R_{dson}$ current feedback sensing, over-voltage shutdown and under-voltage fold-back circuits. Also included are a powdered metal-power toroid transformer 146, power MOSFET switching transistor 148 (a 75 volt, 71 ampere rated transistor), output snubber circuitry 150, power diode 152, and output capacitors 154 and 156. As mentioned above, the control IC 128 is a Unitrode UCC3803 or UCC3805 current mode control BiCMOS device. This control IC 128 controls the operation of the convertor to convert the battery input 132 voltage to a potential of 525–540 volts DC, which is stored in the output capacitors 154 and 156. These capacitors are 630 volt, 0.47 microfarad, pulse rated MKP type.

The convertor is a "flyback type" which stores energy in transformer 146 primary winding when MOSFET transistor 148 is on and transfers the energy to the secondary winding when MOSFET transistor 148 turns off, which in return, charges capacitors 154 and 156. This occurs at a frequency between 40 kHz and 110 kHz. The charge time from zero volts to 535 volts is typically less than 750 microseconds with the battery input 132 at 14 volts DC. This gives an energy stored in 154 and 156 of Capacitance×(Voltage)$^2$= Joules. At 535 volts and 1.36 microfarad, 194 millijoules of energy are stored that can be switched to the ignition coil 32 primary connected to the ignition output wires 158 and 159. The control IC 128 operates in fixed off-time-variable frequency current mode for providing stable operation from the minimum start-up voltage of 4.5 volts to over 24 volts input. As the voltage begins to ramp up at capacitors 154 and 156, the convertor frequency starts at a high frequency of about 100 kHz with a very narrow duty cycle, or on time, of a few microseconds. As the voltage ramps up, the frequency gradually lowers to about 40 kHz at cut off when capacitors 154 and 156 reach full charge of 525–535 volts. The fixed off-time is set at about 9 microseconds, giving enough time for the transfer of primary energy to the secondary of transformer 146 before the primary current is turned back on.

The converter operates by turning on the output at pin 6 of the control IC 128 to bias the gate of MOSFET 148 on, allowing primary current to flow in transformer 146. The output pin 6 also biases the base of the transistor 162 on which clamps the oscillator input pin 4 of control IC 128 in the reset state. Pin 6 biases the base of the transistor 164 on which clamps the base of transistor 166 off thereby allowing the voltage at the anode of diode 168 to rise to the on state. This forms a voltage drop across MOSFET 148 plus a 0.6 volt forward drop of diode 168. The voltage at diode 168 is representative of the current flowing through the transistor MOSFET 148 (i.e., $I=V/R_{dson}$). This voltage is used for current feedback at pin 3 of the control IC 128. Resistors 172 and 174 form a voltage divider at input pin 3 of control IC 128. As MOSFET 148 current ramps up, the voltage across the drain-source terminals rises until control IC 128 pin 3 voltage is equal to the internal comparator voltage which is seen, in part, at pin 1 (comp) of control IC 128. The voltage level at pin 1 is compared internally to pin 3 voltage and when pin 3 voltage exceeds pin 1 internal voltage, the comparator resets the output latch. This turns off output pin 6 of control IC 128 and MOSFET transistor 148. This action attempts to maintain a constant current flowing through MOSFET transistor 148 and the winding of transformer 146.

When pin 6 of control IC 128 goes low, the gate of MOSFET transistor 162 is biased off and the oscillator begins to ramp up the voltage at pin 4 of control IC 128. This time period is the fixed off-time because it now takes approximately 9 microseconds until the voltage level on pin 4 triggers the internal comparator again to set the output latch on. This off-time is controlled by MOSFET transistor 162 turning off and resistor 176 charging up capacitor 178 until the internal oscillator threshold is reached to set the output latch on. When control IC 128 output pin 6 goes low, the base of the transistor 164 is quickly biased off and allows the base of the transistor 166 to bias on; transistor 168 then clamps the voltage at the anode of diode 168, bringing the voltage at pin 3, the current sense input pin of control IC 128, to near ground potential (i.e., about 0.6 to 0.8 volts clamped). The purpose of capacitor 180, resistor 182 and diode 184 is to allow quick turn off of transistor 164 while providing a small delay during the turn on of MOSFET 148. Also, capacitor 180 must charge to 0.6 volt through resistor 182 before transistor 164 is biased on. The time delay from control IC 128 pin 6 going high to transistor 166 turning off is about 250 nanoseconds. This allows MOSFET 148 to fully turn on before transistor 166 unclamps the current sense input at the anode of diode 168. Resistors 186, 182, 188, transistors 164, 166, diodes 168, 184 and capacitor 180 form a current sense feedback circuitry that enable the use of the resistance of the Drain-to-Source terminals of MOSFET 148 in the ON state ($R_{dson}$) for lossless current sensing (without the need for shunt current sense resistors or other current sensing circuitry). Temperature compensation circuitry 200 nulls the increase in resistance of MOSFET 148 $R_{dson}$ as temperature rises.

The control IC 128 pin 1 voltage is also compensated by the battery input 132 voltage. When the battery input 132 voltage falls below 10 volts, pin 1 voltage is lowered to track the battery input 132 voltage to prevent the convertor from demanding more current than is possible. Since the convertor must ramp the current up to a constant level each cycle, the convertor must be able to reach this level for any battery voltage input 132 within the operating range (typically 6 to 24 volts). At above 10 volts, power MOSFET 148 is fully turned on with a gate drive over 10 Vgs. But as battery input 132 falls below 10 volts, MOSFET transistor 148 cannot be fully enhanced and thus, the current level must be derated to keep power MOSFET 148 in a safe area operation mode. This is accomplished by low voltage protection circuit 202. At approximately 6.5 volts, the convertor current is lowered to a level of about half of the 14 volt level which requires the charge time to double to charge capacitors 154 and 156 to the 535 volt output value. Also, at this low battery input 132 condition, power MOSFET 148 is approximately 75% enhanced, but is still able to reach the current trip level to reset the internal current comparator of control IC 128 and operate in the current mode with reduced current to drive transformer 146. This provides safe operation of power MOSFET 148 below 10 volts input thereby preventing current runaway. Power MOSFET 148 also provides protection from current runaway conditions when power MOSFET 148 is not fully enhanced at low gate drive levels when the voltage across the Drain-to-Source terminals of MOSFET 148 in the ON state, drives ($V_{dson}$) higher which, in turn, feeds the current sense circuit and turns the output off at lower current levels. Thus, the circuit is self-protecting using $R_{dson}$ as a current sensing mechanism.

The voltage of capacitors 154 and 156 is regulated to the 525–535 volt level by voltage feedback circuitry 204. When the capacitor voltage rises to just over the reverse breakdown voltage of the Zener string in feedback circuit 204 approximately 20 volts, the base of transistor 206 is biased on and the collector of transistor 206 clamps pin 1 of control IC 128 to near ground. When pin 1 falls below 1 volt, the convertor is shut down and stops charging capacitor 154 and 156. Also, capacitor 208 on pin 1 provides a small delay of about 20 microseconds with a rise time to pin 1 voltage of about 50 microseconds that provides a soft start of the convertor when it turns back on to recharge capacitors 154 and 156.

Since operation with high battery input voltages is undesirable, the ignition circuit of the electronic controller 10 is designed to shut down the convertor section at about 27–29 volts, thereby keeping the voltage levels at the drain-source of power MOSFET 148 under its maximum rated voltage. When the transistor of power MOSFET 148 turns off after conducting current through the primary winding of transformer 146, the voltage quickly rises to a level that is clamped by the action of the mutual inductance of the secondary of transformer 146 which is increasing up to 535–540 volts output. The turns ratio of the transformer 146 limits the maximum voltage that is generated across the primary winding when the transistor of power MOSFET 18 turns off. In particular, the turns ratio of transformer 146 may be, for example, 18.75:1. Thus at the maximum secondary output of 540 volts, the primary voltage rises to (secondary volts/turns ratio=volts primary)=28.8 volts. The drain voltage transistor of power MOSFET 148 rises to primary volts+(high) battery volts=28.8+29 volts=57.8 volts, well below the maximum rated 75 volt device breakdown.

The convertor is shut down above 29 volt input level by the circuit of resistors 210 and 212, diode 214, capacitor 216 and transistor 206 by clamping pin 1, the comp pin, of converter power control IC 128. When the battery voltage rises above the reverse breakdown voltage of Zener diode 214, the base of the transistor 206 is forward biased which clamps pin 1 of the convertor control IC 128. When the voltage at pin 1 of converter control IC 128 drops below about 1.2 volts, the gate drive from pin 6 of the convertor control IC 128 stops and power MOSFET 148 turns off, halting operation and current flow of the transformer 146 primary. As long as the battery input 132 remains above this voltage level, convertor control IC 128 will be shut down and the ignition cannot provide any ignition coil output. In this condition, the transistor of power MOSFET 148 only has the battery voltage potential applied across the drain-source terminals which is limited by the clamping action of diode transient suppressor 142.

Resistor 212 limits the maximum source current of control IC 128 at pin 1 to a level within control IC's 128 ability to properly regulate the pin 1 output level. In particular, it should be noted that in certain circumstances where battery input 132 voltage exceeds a particular level, such as approximately 12.2 V, control IC 128 may operate improperly or unpredictably. Under clamping conditions, it is undesirable to "hard" clamp pin 1 to ground because control IC 128 loses the ability to control pin 1 current supply and attempts to oversupply the current out of pin 1. This results in a voltage/duty cycle surge when pin 1 is unclamped. Thus, resistor 212 provides a "soft" clamp to pin 1 of control IC 128 and properly shuts down the converter thereby enabling unclamping to resume operation without any surges. Other current limiting components, such as a current diode, may also be used to provide the soft clamp. The voltage may rise to the maximum clamp voltage of about 45 volts without harming the transistor of power MOSFET 148. Capacitor bank 218 also help in clamping the input positive transient. When the capacitor bank 218 is charged to the battery potential and positive transient occurs, the transient must deliver energy to charge capacitor bank 218 to the higher level. The limited energy available in the transient source will effectively be clamped by the capacitor bank 218 before diode 142 begins to conduct a large clamp current. The ESR (equivalent series resistance) of capacitor bank 218 is the primary limiting factor of how effectively the transient can be clamped and the size of the capacitance limits the voltage rise at a given energy input level. As shown, the ESR for the combined input capacitors is 10 milliohm and 4800 microfarad capacitance. The maximum energy that the capacitor bank 218 can absorb at the maximum clamp voltage of diode 146 is: (45 volt−(battery voltage before the transient)$^2$× capacitance/2=Joules absorbed in capacitor bank. At 45 volts using a 14 volt battery at 4800 microfarad capacitance, the maximum energy is 2.3 Joules and the energy absorbed by diode 146 is in addition to this. It is noted that this energy is typically seen only at a "load dump" condition when the battery is disconnected, otherwise the battery would clamp some or most of this energy. The clamp energy required will usually be somewhat less than these maximum values due to the impedances of the battery wiring and PCB wiring resistance. The convertor is also shut down when the output transistor of MOSFET 148 is gated on to discharge capacitors 154 and 156 into ignition coil 32. As will be discussed in greater detail below, this is provided by microcontroller 116 signal "CONV INH" (converter inhibit) which also provides the input to the base of transistor 206, as an Ored input-source from microcontroller 116. The timing of the gate signal "IGN/TRIG" is coincident with the "CONV INH" signal so that the convertor is shut down immediately as the ignition coil 32 switch is biased on. The "CONV INH" signal is turned off low about 30 microseconds before the gates drive turns off IGBT pair 219 thereby allowing the pin 1 voltage level to rise to turn on level just as the gate of IGBT pair 219 is turned off. This prevents wasted time in getting the convertor back up charging capacitors 154 and 156 after just being discharged into the ignition coil 32.

The convertor output section includes rectifying, capacitor storage, and snubber circuitry 150. Diode 152 supplies DC current to capacitors 154 and 156 which are parallel connected for a combined capacitance of 1.36 microfarad, a value selected for physical size, energy storage, and voltage rating. Resistors 220 and 222 provide a discharge path across capacitors 154 and 156 when the convertor is powered off thereby removing the voltage potential so the electronic controller 10 may be handled safely. Snubber circuit 150 clamps the negative secondary voltage of transformer 146 to levels below the breakdown voltage of diode 152 and prevents breakdown of transformer 146 secondary insulation. The negative voltage output on the secondary winding of transformer 146 could reach over 1000 volts if snubber circuit 150 were not functioning. As the negative voltage climbs above 400 volts, diode 224 reaches the reverse breakdown potential and current flows from the secondary through diodes 226 and 224, across capacitor 228 and the resistors. The resistors discharge capacitor 228 each period that transformer 146 primary current is flowing; thus, the potential across capacitor 228 never exceeds about 500 volts. The positive current flow from transformer 146 secondary flows through diode 152, capacitors 154 and 156 and diode 224, 226, and 230, and resister 228 to ground, and through the ignition coil 32 primary when connected to ignition output (C+ and C−) wires 158 and 160.

A charge cycle of the convertor begins when the pin 1 voltage rises to about 1.2 volts. At this time, the "CONV INH" signal is low and transistor 206 is off; this allows the pin 1 voltage to rise across capacitor 208, which is biased by current sources internal to control IC 128 and by the temperature compensation circuit 200 from control IC 128 output pin 8 4 volt reference. The gate drive signal "IGN/TRIG" goes low about 30 microseconds after the "CONV INH" signal goes low. This allows the voltage at pin 1 to begin to ramp up before the ignition coil switch gate drives are removed (IGBT pair 219). The pin 1 voltage just reaches the internal threshold to set the pin 6 output latch on as the gate drives IGBT pair 219 low. Otherwise, the secondary current would flow to ground through IGBT pair 219 collector-emitter, preventing the capacitors 154 and 156 from recharging. The first output period at pin 6 is very small (only 1–3 microseconds) because the voltage at pin 1 is very low at start-up. This gives the convertor a soft start so the current in transformer 146 primary is gradually ramped up over a period of about 50 microseconds to reach the full current level of operation. This also presents a quieter load to the battery. As the voltage on pin 1 reaches its final value of about 2.2–2.5 volts, the convertor is operating at maximum duty cycle. At a battery input 132 of 14 volts, the duty cycle approaches about 75%, and the operating frequency is at the lowest speed, typically 40 kHz. If the battery input lowers, the duty cycle rises because the current ramps more slowly and requires more time to reach the level required to reset the internal comparator of control IC 128 at current sense input pin 3. The convertor may operate at about 92–94% duty cycle before is the battery drops to a level where the battery compensation circuit begins to clamp pin 1 voltage to lower the maximum current through transformer 146. When the convertor has charged capacitors 154 and 156 to about 525 volts, the series of Zener diode string and voltage feed back circuit 204, begin to conduct and current flows to bias the base of transistor 206 on. Transistor 206 clamps pin 1 of control IC 128 and pin 6 goes low to shut the convertor off. The Schottky diode 234 connected between pin 6 and ground protect the output of control IC 128 from negative transients generated when the IGBT pair 219 is rapidly turned on. As long as transistor 206 is on, the convertor will remain off.

At the same time that transistor 206 is biased on, transistor 236 is also biased on which occurs at a capacitor voltage just below the transistor 206 bias voltage. This is due to the higher resistance of resistor 238 as compared to resistor 240, both form a divider wherein resistors 238 and 242 bias transistor 206 and resistors 240 and 244 bias transistor 236. Transistor 236 clamps microcontroller 116 input "MSEN OUT" (multispark enable). When the "MSEN OUT" signal goes low, microcontroller 116 is signaled that the convertor has reached full recharge. When the engine is operating below approximately 3400 RPM, microcontroller 116 has time to "multispark," that is, spark more than once during each ignition cycle. Microcontroller 116 will execute a 20 crankshaft degrees of spark duration. If the "MSEN OUT" signal has gone low and the 20-degree period has not been exceeded, then microcontroller 116 will again provide another gate drive output to IGBT pair 219, thereby discharging the energy stored in capacitors 154 and 156. At the same time, the "CONV INH" signal goes high keeping the convertor off for the coil 32 output period. The multispark process repeats until the end of the 20-degree period. If the "START RETARD" option has been activated, and the engine is below 500 RPM, microcontroller 116 will execute at 10 crankshaft degrees of spark duration.

When the 20-degree (or 10-degree) period is complete, the convertor is operated to recharge capacitors 154 and 156 and, after a limit of 3 milliseconds, "CONV INH" signal from microcontroller 116 goes high to shut the convertor off until the next input to microcontroller 116 signals to trigger the ignition coil 32 again. The "MSEN OUT" signal is used to signal microcontroller 116 that the capacitor bank 154 and 156 has reached full charge. This signal enables microcontroller 116 to indirectly monitor the battery voltage level. When the battery input 132 is above about 10.5 volts, capacitors 154 and 156 recharge in under 975 microseconds. The minimum multispark period is controlled by the microcontroller 116 at 975 microseconds with a maximum period of 1.8 milliseconds. If the "MSEN OUT" signal has not gone low at the 975 microsecond time, then microcontroller 116 begins testing the "MSEN OUT" signal, waiting for it to go low so the output can be triggered again. Microcontroller 116 will wait in this mode up to the maximum 1.8 milliseconds and then trigger IGBT pair 219 if the 20-degree (or 10-degree) window has not ended. While in this mode, microcontroller 116 also indicates that the ignition circuit is not reaching full recharge in the standard time (due to low battery input 132) and flashes an LED indicator code "22" to aid in trouble shooting of the ignition circuit, as discussed further below. Thus, the user can see that the battery input 132 is below optimum levels due to loss of battery charge or loose or corroded battery connections.

The output section of the ignition includes an IGBT ignition coil switch of 2 IGBT's in parallel and gate drive circuitry. Each IGBT 232 and 246 is a fast-600 volt, 40 ampere rated IGBT. The use of an IGBT coil switch overcomes many of the limitations of prior SCR switches. The IGBT pair 219 can be turned on and off very fast. The convertor may even be restarted just before the IGBT pair 219 is turned off without causing extra delays due to large inductive ignition coils or failed spark gaps. When the spark fails to jump the spark gap, the primary energy circulates from capacitors 154 and 156, IGBT pair 219, inductor 248, diode 230, resistor 250, and the coil 32 primary until the energy is dissipated or IGBT pair 219 is turned off. If there is still some energy in the primary of coil 32 when IGBT is turned off, the energy can flow back to capacitors 154 and 156, partially recharging these capacitors. Capacitors 154 and 156 act as a snubber for IGBT pair 219 preventing over-voltage across the IGBT pair 219. Resistor 250, parallel to diode 230, insures correct convertor operation when the ignition coil 32 is not connected to the ignition coil input C− and C+ terminals (158 and 160) of the ignition circuit. Resistor 250 provides a safe ground potential for the negative terminals of capacitors 154 and 156 when the ignition coil 32 is not connected or the ignition coil 32 primary is open circuited. With the controlled operation of the convertor, the capacitors 154 and 156 are always properly recharged to the correct level of 525–535 volts.

Further, IGBTs 232 and 246 are in parallel to overcome over heating. When only one IGBT is used, the IGBT may overheat which causes the dye on the IGBT to breakdown thereby causing the current to taper off after 50 microseconds. The two IGBT in parallel, prevents overheating and therefore, allows for more efficient discharge of the capacitors and higher currents.

The IGBT pair 219 require a gate potential of 10 VGE minimum with 15 volts desirable for full peak current capability. This is easily achieved when the battery input 132 is above 10 volts, but requires an additional voltage doubler circuitry 250 to provide the minimum gate drive when below 10 volt battery input 132. Voltage doubler circuit provides the minimum gate drive for the IGBT pair 219 down to an input of 5 volts battery level. At above 10 volt battery input 132, Zener diode 252 clamps the input to voltage converter 254, a 7660 IC CMOS, for power conversion and generation. The resulting voltage is about 20 volts output at the anode of diode 256, label "VGATE on FIG. 6C."

This voltage is connected to a level shifting circuit 258. The microcontroller 116 signal "IGN/TRIG" is a 0–5 volt signal and must be capable of switching the gates of IGBT pair 219 with 0–15 volt levels. The base of transistor 260 is driven from microcontroller 116 from resistor 262. The collector of transistor 260 pulls the base of transistor 264 low which forward biases transistor 264 and enables current flow from the "VGATE" voltage supply through transistor 264 emitter/collector to the anode of transistor 266 and through resistor 268 to the gate of IGBT pair 219, which then biases IGBT pair 219 on. This allows current to flow from the capacitor bank 154 and 156 through the ignition coil 32 primary connected to coil input 158 and 160 (C− and C+) wires. The voltage at the gates of IGBT pair 219 is clamped by the Zener diode 270 to 15 volts maximum and transistor 272 remains off during this time because it is reversed biased. At turn off of IGBT pair 219, microcontroller 116 signal "IGN/TRIG" goes low and transistors 260 and 264 are turned off. The base of transistor 272 is now at ground level (via resistor 274) with the emitter at or near 15 volts. This forward biases transistor 272 emitter/base junction and allows current flow from the gates of IGBT pair 219 to ground through the emitter/collector of transistor 272, thereby lowering the gates of IGBT pair 219 to below 0.7 volts and, effectively turning IGBT pair 219 off. Diode 276 is anti-parallel to the collector/emitter of IGBT pair 219. This clamps any negative voltage across IGBT pair 219 to under 1 volt providing protection for IGBT pair 219 and blocks any positive current flow when the capacitor bank 154 and 156 is recharged. The diode 276 commutates any residual ignition coil energy by directing the inductive energy to recharge the capacitor bank, 154 and 156 from negative coil output 160 through diode 276 anode to capacitors 154 and 156 positive terminals.

The power supply filtering circuit 278 for the microcontroller includes three capacitors and a choke 280. These components prefilter the noise generated in the power section on the +12 voltage input to the microcontroller regulator input. The battery input is further filtered by capacitors 282, 284, and 286, RF filter 288, and reverse protected by diode 294 and clamped by Zener diode 292, before supplied to the input of the precision 5 volt regulator 294. Resistor 300 provides a current limiting impedance for the 24 volt Zener diode 302. The RF filter 288 is a high frequency inductive/capacitive filter to attenuate frequencies above 10 MHZ on the input supply line. The 5 volt regulator 294 is a low dropout type with a tight +/−0.5% regulation of the 5 volt output. This insures that microcontroller 116 operates near the optimum supply input requirements even at the lowest input battery levels. For 5 volt output, the battery may drop to about 5.7–5.8 volts. Microcontroller 116 incorporates brown-out-detection and will reset when the 5 volt supply drops to less than 4 volts. This allows microcontroller 116 to function down to about a 5 volt battery input level. Capacitors 304, 306, 308, 310 and 312 provide 5 volt supply filtering for the microcontroller 116. The placement of these capacitors near the microcontroller's 116 power supply pins are important for noise immunity.

Protection components for microcontroller 116 also include Schottky diodes 314, 316, 318, 320, 322, 324 and Zener diode 326. The Schottky diodes 318, 320, 314 and 316 clamp any negative or positive transients greater than +/−0.3 volt above the 5 volt supply or ground to protect the I/O pins of microcontroller 116. Diode 322 clamps any negative transients on pin 23 of microcontroller 116 and diode 324 blocks any positive levels or transients on pin 23. The Zener diode 326 clamps the 5 volt supply to a maximum of 5.6 volts to protect microcontroller 116.

Microcontroller 116 functions to accept inputs for triggering the output, enabling operation up to the preset and user inputted revolution limiter values, enabling timing retard, and individual cylinder timing retard, controlling of the multispark operation, and shifting outputs. The inputs for this form of electronic controller 10 include PTS1, MAG PICKUP INPUT, BURN REV LIM, LAUNCH REV LIM, NO. 1 STEP RETARD, NO. 2 STEP RETARD, NO. 3 STEP RETARD, CAM PICKUP, and MSEN-IN. The outputs include TACH OUT, CONV INH, IGN/TRIG, LED, RPM SW, and SHIFT LIGHT OUT.

The electronic controller 10 is user programmable and includes programmable features such as revlimit controls, ignition timing retards, individual cylinder timing retards, an RPM activated switch, and gear shift controls as described further below.

The hand-held programmer 6 or computer 8 is used to input and store the revolutions per minute controls and is described in further detail below. The burn out revlimit is activated when the input of BURN REV LIM 328 is pulled high to +12 volts (or any battery potential above 4.5 volts). Likewise, the launch revlimit is activated when the input of LAUNCH REV LIM 330 is pulled high to +12 volts (or any battery potential above 4.5 volts). For this form of electronic controller, each may be set to values from 2,000 to 12,500 RPM in 100 RPM increments. These inputs are debounced in microcontroller 116 to ensure clean revlimiter selection and reject any noise that may be seen by microcontroller 116 at the input pin. When +12 volts (or any battery potential above 4.5 volts) biasing both BURN REV LIM 328 and LAUNCH REV LIM 330, the maximum revlimit (REVMAX) controls the maximum RPM the engine may turn at any time; REVMAX may be set from 2,000 to 12,500 RPM in 100 RPM increments. The LAUNCH REV LIM 330 also functions to activate the launch retard timing function and launch timing curve, discussed further below.

The electronic controller 10 also acts as a multi-stage retard. The STEP RETARD No. 1 through 3 input selects the retard value stored in non-volatile memory 118 to retard the ignition spark output when the STEP RETARD No. 1 (332), No. 2 (334) or No. 3 (336) is pulled high (above 4.5 volts). Like the REV LIM inputs, these inputs are also debounced by microcontroller 116 to ensure proper selection of the STEP RETARD function and rejection of noise. The STEP RETARD functions for this form of the electronic controller, are programmable from 800 to 12,000 RPM with each retard being adjustable from 0 to 15 degrees in 0.5 degree increments. When activated, each STEP RETARD is added to the previous retard to reach a maximum of 25 degrees. For example, with STEP RETARD No. 1 set at 10 degrees at 1,000 RPM, STEP RETARD No. 2 at 5 degrees at 2,000 RPM and STEP RETARD No. 3 at 2 degrees at 5,500 RPM is equivalent to 15 degrees retard when RPM's reach 2,000 and 17 degrees retard at 5,500 RPM. The electronic controller 10 also allows the user to delay the activation of the STEP RETARD feature. The time delay may be set from 0 to 2.50 seconds in 0.01 second increments and is useful in engine applications using nitrous to ensure that the nitrous has stopped flowing through the engine before deactivating the STEP RETARD.

The REV LIM and STEP RETARD controls input circuits 328, 330, 332, 334, and 336 are identical in component layout and operation. The BURN OUT and LAUNCH LIM input circuits 328 and 330 includes resistors 338–348 and 356, capacitors 354 and 358, diode 352, and half of the LM393 bipolar voltage comparator IC 350. The inverting input at pin 2 is biased at 2.2 volts by resistors 342 and 346 divider pair from the 5 volt supply. The resistor 338 provides a pull up of the output pin 1 to the 5 volt supply and resistor 340 provides positive feedback to the input pin 3. The input to pin 3 includes a resistor divider pair 348 and 356, that divides the input to half of the input terminal voltage. Diode 352 clamps the maximum voltage at the input resistor 344 on pin 3 to 5 volts, providing overdrive protection for comparator IC 350. When the input at the non-inverting input, pin 3, exceeds 2.2 volts, the output pin 1 goes high to 5 volt, while microcontroller 116 is scanning the REV LIM input pin. The hysteresis action from the feedback resistor 340 helps to sharpen the switching edges at the switching thresholds of the input signal and also helps to reduce bouncing of the output due to noise on the input pin. Capacitor 358 helps to filter some of the high frequency noise at microcontroller 116 input pin and while delaying the rise time at pin 1 by about 4 microseconds.

The STEP RETARDS No. 1–3 input circuits 360, 362, and 364 (FIG. 6G) are identical in component layout and operation. The STEP RETARD No. 1 input circuit 360 includes components resistors 368–378 and 386, diode 380, capacitors 382 and 384 and half of a LM393 bipolar voltage comparator IC 390. The inverting input at pin 2 is biased at 2.2 volts by resistors 372 and 376 divider pair from the 5 volt supply. Resistor 368 provides a pull up of the output pin 1 to the 5 volt supply and resistor 370 provides positive feedback to the input pin 3. The input to pin 3 includes a resistor divider pair 378 and 386, that divides the input to half of the input terminal voltage. Diode 380 clamps the maximum voltage at the input resistor 374 on pin 3 to 5 volts, thereby providing overdrive protection for the comparator IC 390. When the input at the non-inverting input, pin 3, exceeds 2.2 volts, the output pin 1 goes high to 5 volts, while the microcontroller 116 is scanning the STEP RETARD 1 input pin. The hysteresis action from the feedback resistor 370 helps to sharpen the switching edges at the switching thresholds of the input signal and also helps to reduce bouncing of the output due to noise on the input pin. The capacitor 382 helps to filter some of the high frequency noise at microcontroller 116 input pin while only delaying the rise time at pin 1 by about 4 microseconds.

Microcontroller 116 also executes a user adjustable START RETARD that is automatically enabled and adjustable from 0 to 25 degrees of crankshaft rotation. When the engine is operating below 500 RPM, the ignition timing is retarded to the user inputted degrees until the engine reaches 800 RPM when timing is returned to full (non-retarded) timing. The RPM must drop back below 500 RPM to reactivate the START RETARD feature. When the START RETARD is active, the multispark is decreased from 20 degrees to 10 degrees wide to help prevent crossfire in the distributor cap.

The ignition run timing retard curve 64 allows the user to program a full timing curve from 800 RPM to 12,500 RPM in 100 RPM and 0.1 degree increments. (When the engine RPM falls below 500 RPMs, the START RETARD feature is activated and will control the start up ignition timing.) The ignition run timing curve 64 may be programmed to a maximum of 25 degrees of ignition retard. The user may program the ignition run timing curve 64 using the hand-held programmers, by inputting the RPM value and selecting the enter key 50. The hand-held programmer 6 will then prompt the user to input the timing retard value. Once inputted, this value is stored in non-volatile memory 118. The user may input as many points that are necessary for the particular application and the electronic controller 10 extrapolates a curve based on those points. Likewise, the ignition run timing curve 64 may also be programmed using a computer 8 and a mouse as described previously. The user simply places the mouse pointer 68 to the approximate position of the desired RPM and timing value on the curve 64 and adds a point. Again, the user may input as many points as desired between 0 and 12,500 RPM in 100 RPM increments. During operation of the engine 4 the total ignition retard values can be monitored on either the hand-held programmer 6 or on the computer screen 58 on ignition timing retard degree dial 76.

The ignition timing retard launch curve 66, as seen on the computer screen 58 functions similarly to the ignition run timing retard curve 64. When the ignition timing retard launch curve function is activated, the ignition run curve 64 function is deactivated thereby allowing the launch curve to control ignition timing until the first shift in gear is detected. The ignition timing retard launch curve 66 may be programmed from 800 to 12,500 RPM in increments of 0.1 degree to a maximum of 25 degrees. All ignition timing retards values are additive. Thus, if a step retard is activated during either the ignition run or launch curves, that value is added to the corresponding RPM retard value of the curve.

As discussed further below, retard at launch, step retard, and step3 retard ranges are provided from approximately 0 to 15 degrees in fractional degree increments. Retard is held during the ramp if the speed is below the step3 RPM or the step3 wire is disabled, and continues when both the step3 wire is enabled and the engine speed is above the step3 RPM value. In addition, the user interfaces provide a programmable ramp time for normal launch timing.

Lastly, another method of controlling ignition timing at the launch is the launch retard ramp function. This feature allows the ignition timing to ramp from a programmed launch retard value to the ignition timing retard launch curve. The user may set the ramp time duration from 0.00 to 2.50 seconds in 0.010 second increments. When the LAUNCH REV LIM is high, any programmed retards are added to the ignition timing. However, when the launch retard ramp function is deactivated by the LAUNCH REV LIM signal going low, the launch retard ramp function gradually removes or ramps up the timing retards over the programmed time duration.

Figure 6A:
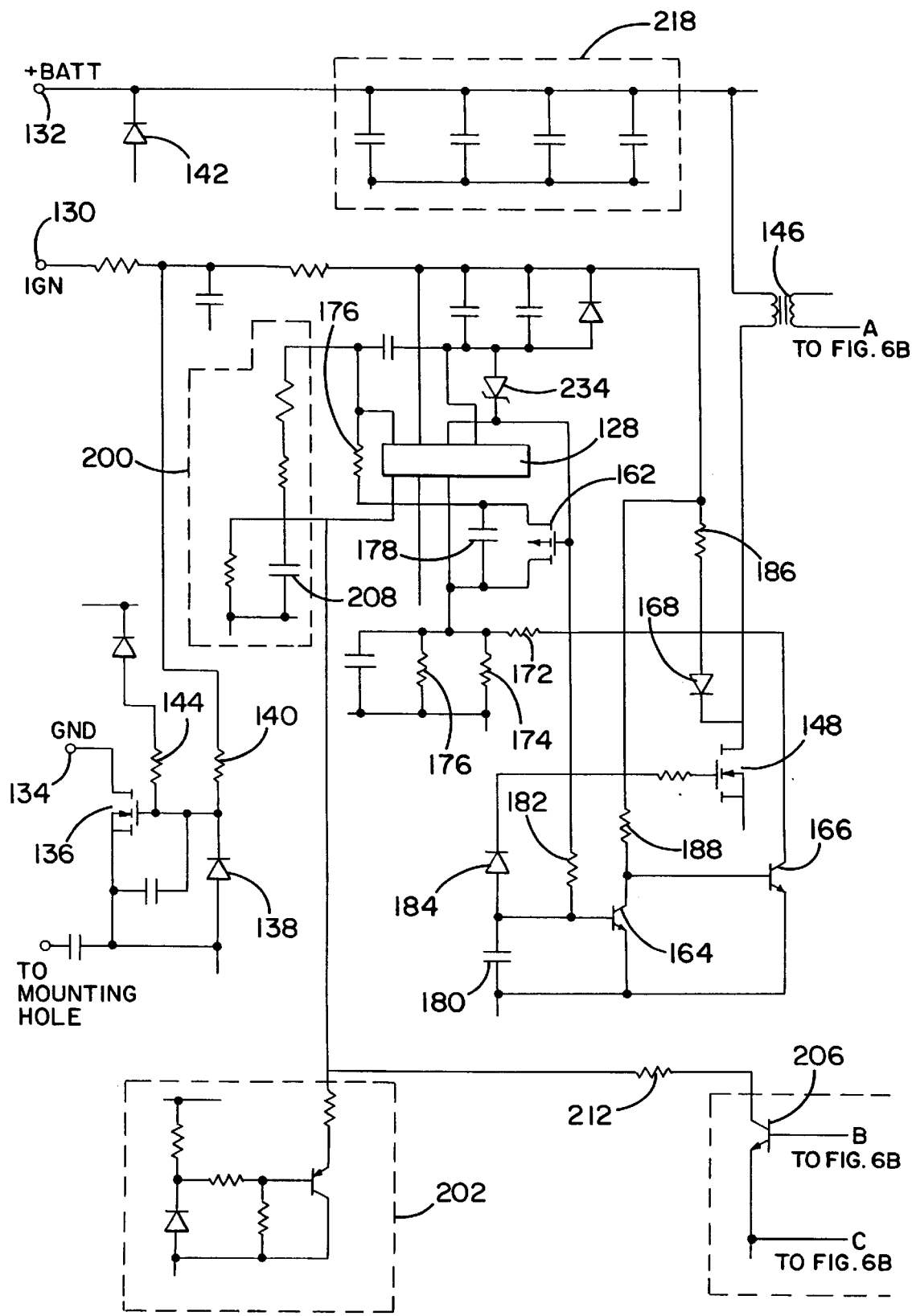
Figure 6B:
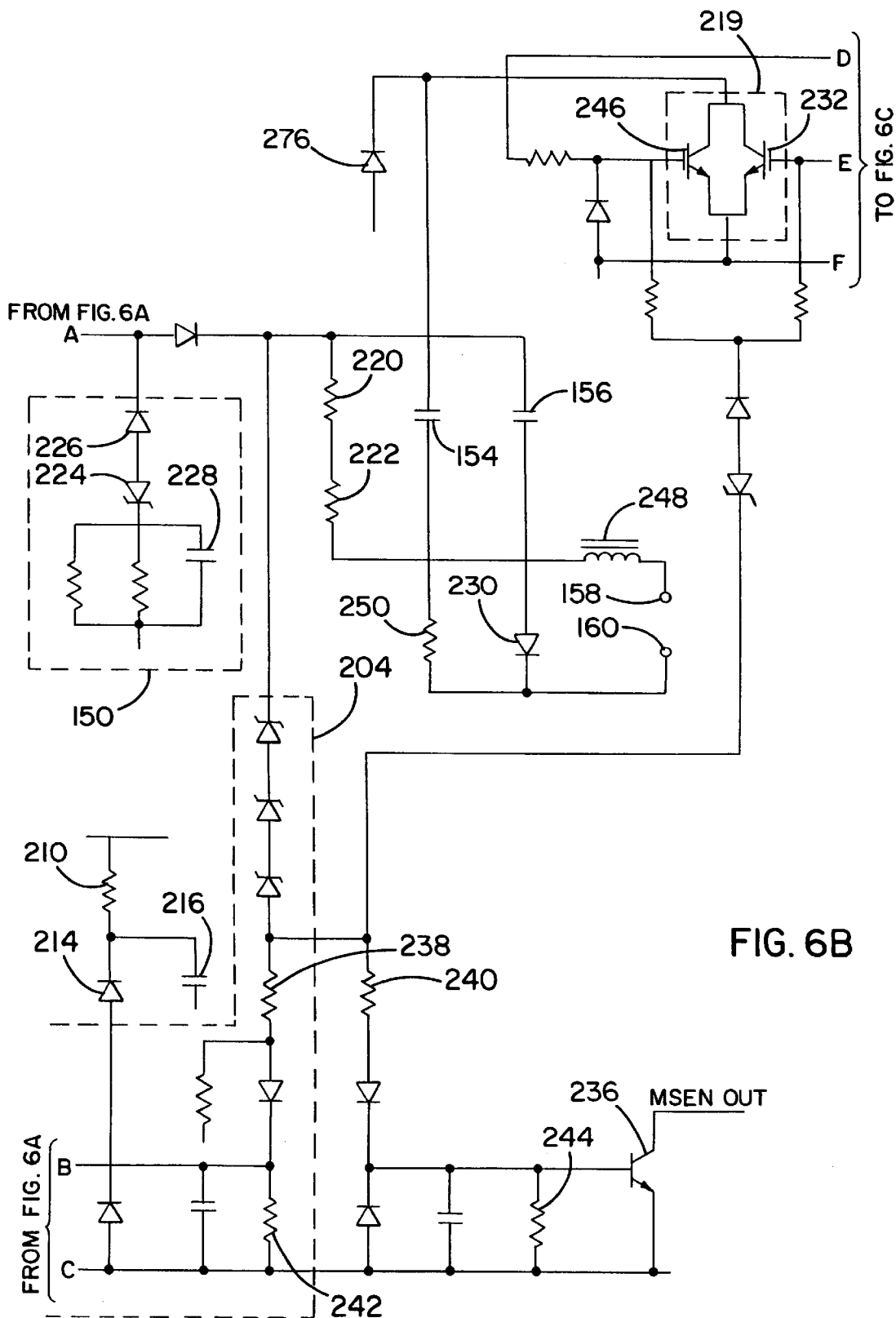
Figure 6C:
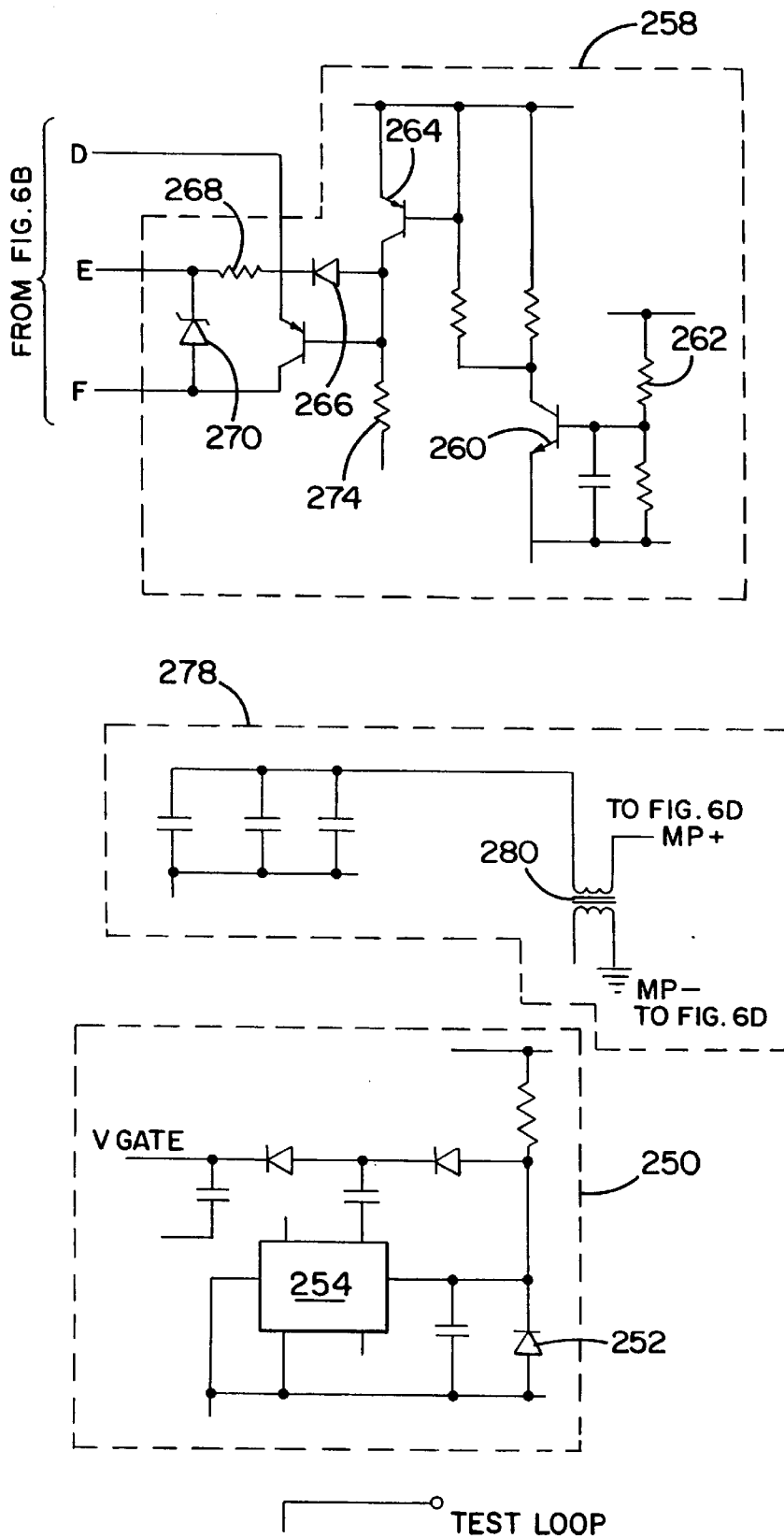
Figure 6E:
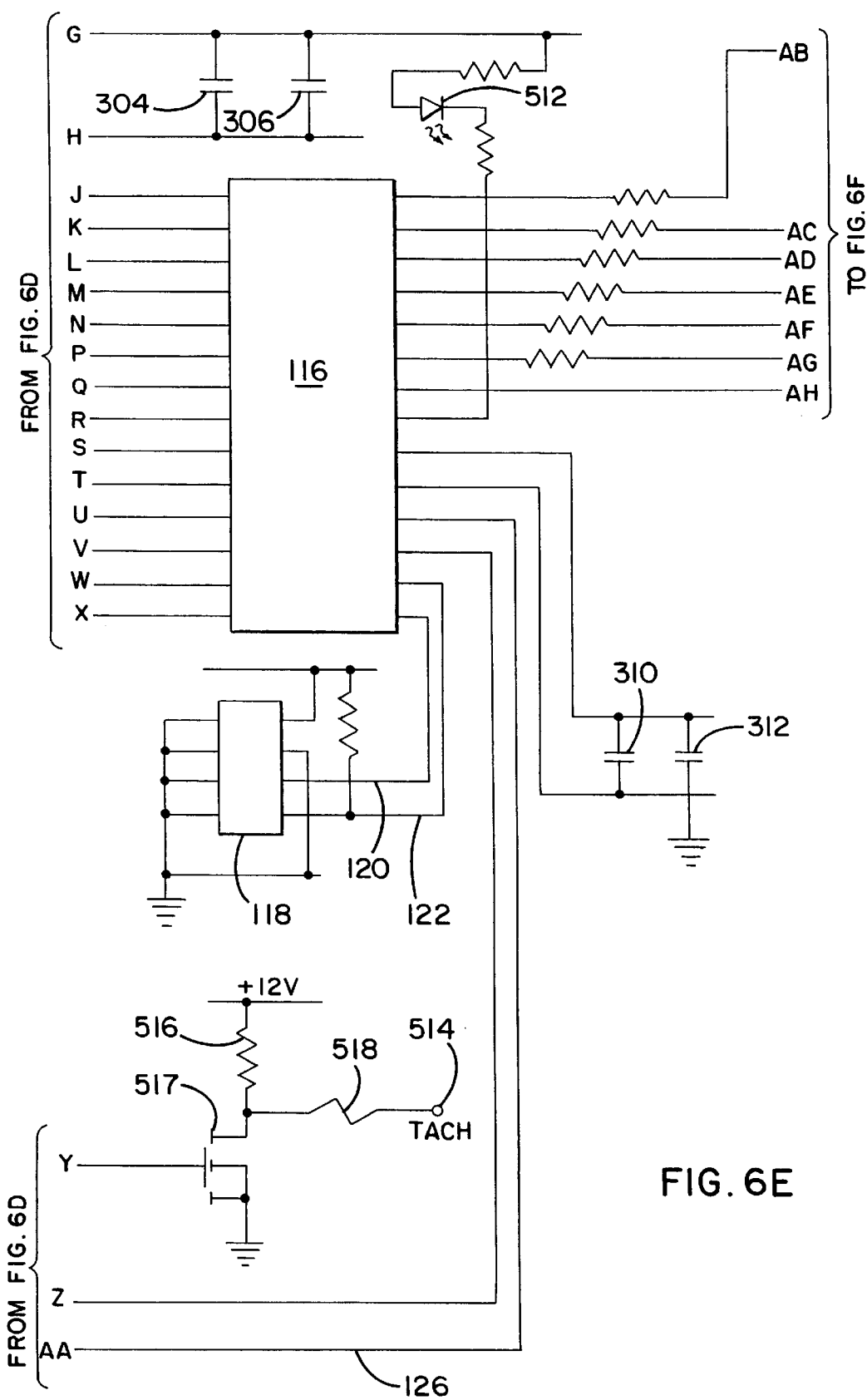
Figure 6F:
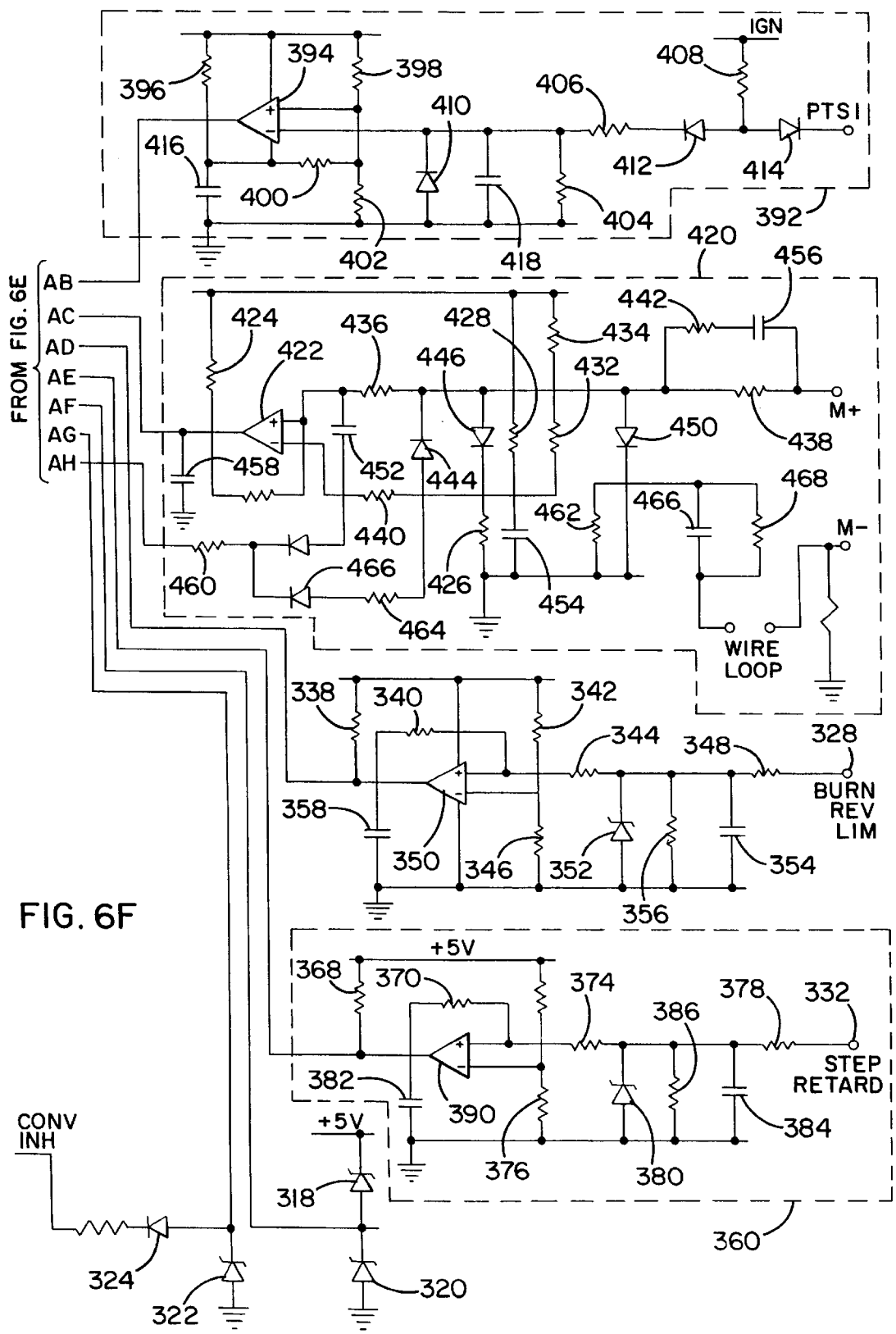
Figure 6G:
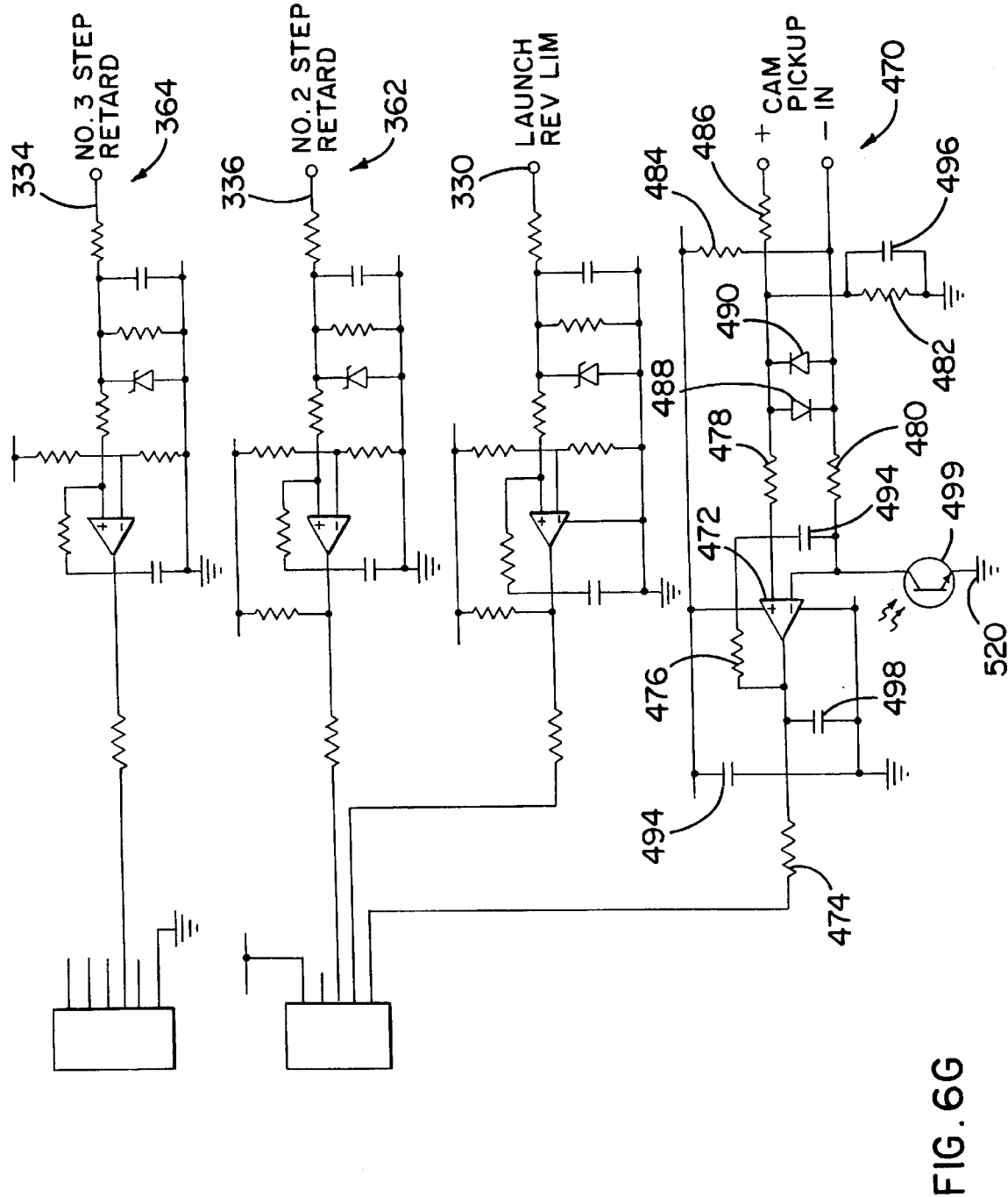

Turning to the PTS1 input circuit 392 shown in FIG. 6F, this circuit also uses a voltage comparator 394, such as a MC33072 op amp, to sense the input trigger from the engine points signal, which could be from mechanical points, or an ECU (electronic control unit) coil driver. The PTS1 input circuit 392 includes components resistors 396–408, diodes 410–414, and capacitors 416 and 418. Resistor 408 provides a pull-up current source of about 140 milliamperes from a 14 volt battery. This results in the input level equal to the battery potential from the PTS1 driver (points/ECU signal) at the anodes of diodes 412 and 414. This signal is then directed to the input pin 2 of voltage comparator 394 by limiting resistor 406 and clamped to 5.1 volts maximum by Zener diode 410. The capacitor 418 provides input debounce on the leading edge of the PTS1 signal and a large amount of debounce on the trailing edge. When the PTS1 signal goes high, capacitor 418 quickly charges to above the 3 volts threshold through resistor 406 to switch the output at pin 1 to low. This occurs in about 2 microseconds so the delay from input to ignition output is held to a minimum. When the PTS1 signal goes low, capacitor 418 begins discharging through large resistor 404 and requires at least 120 microseconds before the input at pin 2 falls below the 3 volt threshold at pin 3. This provides an initial debounce period. Microcontroller 116 further inhibits all inputs after a valid trigger edge input for greater than 20 to 45 degrees, depending upon engine RPM, to reject any noise during the spark output time period that may get through the hardware debounce. However, the inhibit period may be extended at start up, and the period may be adjusted for the RPM speed to mask out misfiring, and increase for high speed. Thus, the window is controlled based on the speed to provide logic for low speed operation. This combination of hardware and software provides an adequate debounce period for most mechanical ignition breaker points to eliminate false triggering of the ignition.

Microcontroller 116 has two inputs from which the ignition may trigger: PTS1 and MAG PICKUP/CRANK TRIGGER input. The MAG PICKUP is the magnetic sensor located in the distributor while the CRANK TRIGGER is the magnetic crank trigger sensor 18. Only one of these two inputs is allowed to act as the trigger input, and is used to interrupt microcontroller 116. The system may use an adaptive debounce technique for enabling the debounce time on the trailing edge to be reduced from a predetermined maximum time to lesser times as engine speed increases. For example, each time the interrupt routine is executed, a timer may be used to measure the amount of time taken by the trailing edge debounce function. Accordingly, as the engine speed increases, the debounce time can be lessened during subsequent executions of the interrupt routine. Thus, excess debounce delays may be eliminated so that the leading edge may be serviced more quickly.

At power up, microcontroller 116 determines which of these inputs (MAG INPUT/OR PTS1) has the trigger signal and selects only that input for the ignition trigger input. Microcontroller 116 makes the other input an output so that the non-input signal is ignored and cannot interfere with the input signal used. Therefore, microcontroller 116 operates with only one trigger interrupt. The other inputs, such as STEP RETARD's and REV LIMITER, are scanned in between ignition output cycles.

The MAG PICKUP INPUT circuit 420 is also based on a bipolar op amp, such as the MC33072, voltage comparator 422. The use of an op amp like the MC33072 has several advantages over CMOS type and bipolar type comparators like the LM393. Voltage comparators have extremely high gain which make them inherently subject to bounce from noise. Furthermore, CMOS voltage comparators can experience lock up due to high Dv/Dt noise on the supply pins or input pins whereas the MC33072 bipolar op amp is immune to high Dv/Dt noise on the ground and supply input pins.

MAG PICKUP INPUT circuit 420 includes resistors 424–442, diodes 444–450, capacitors 452–458 and the one half of voltage comparator 422. The input is normally connected to a magnetic pickup, such as found on an MSD, Ford or GM ignition distributor. The pickup signal is a near sinusoidal type that has very low amplitude at engine cranking speeds and very high amplitudes at maximum engine speeds. The desired switching point is near the zero crossing of the mag input signal and must be compensated to null the inductive retarding effects of the magnetic pickup. This circuit is designed to perform all of these functions while being very sensitive to input at cranking speeds with +/−0.6 volt minimum input and switch point compensated for high speed and high amplitude, triggering up to 30 volts before zero crossing to null the pickup retard. By proper compensation, the noise immunity is also increased as the mag signal gains amplitude. In particular, as further described below, a feedback circuit is included for automatically enabling noise rejection at the mag input at increasing speeds. The input must also be protected from overdrive due to the large pickup voltage potential at high speeds. The mag input circuit can be easily modified for almost any type of magnetic pickup available by changing a single resistor and the compensation value can be set to give zero degree retard or advance at maximum speed.

Components of the feedback circuit include capacitor 454, resistors 460 and 462, and diodes 448 and 450. Capacitor 454 provides a predetermined time constant via resistor 428 and is discharged via resistor 462 which is in series with diode 450 when pin 22 of microcontroller 116 goes low. Pin 22 goes low after detecting the mag input leading edge signal present at pin 27 of microcontroller 116. Accordingly, the feedback function clamps the negative input of the voltage comparator, pin 6 of voltage comparator 422, to a low voltage value typically 0.7–0.9 volt above ground and discharges capacitor 454 to the lower level as well. The input pin is quickly lowered to the lower voltage level and the capacitor 454 is clamped to this lower level after about 22 milliseconds. This allows the common mode voltage to reach the greatest difference in potential across the voltage comparator inputs, limited to approximately 0.7 volt by diodes 444 and 446. While pin 22 of microcontroller 116 is low, this difference is even greater because the voltage comparator 422 negative input is clamped closer to ground via diode 448 and resistor 460. The microcontroller 116 pin 22 stays low typically for 20 to 30 crankshaft degrees. When this pin goes high the feedback is removed from the voltage comparator 422 and the capacitor 454 begins charging back to its higher voltage level of typically 1.5 volts. At low engine speeds this capacitor reaches near its full potential and the common voltage across the comparator 422 inputs is very close, typically about 80 to 100 millivolts. This keeps the start up sensitivity of the mag input circuit 420 correct for very low peak to peak mag input levels, but as the speed increases, capacitor 454 never reaches the full charge potential and thus develops a larger difference voltage across the inputs of the voltage comparator 422 which increases the noise immunity of the mag input circuit 420 further as the speed increases. This automatically provides a self-compensating means of rejecting noise at the mag input which increases the ability to reject higher noise levels as the engine speed increases.

Pin 6 of comparator 422 is clamped by back-to-back diodes 444 and 446 for +/−0.7 volts maximum differential and the input pins 5 and 6 are offset from ground at about 1.56 volts at pin 6, the inverting input. The non-inverting input is biased at about 1.64 volts so that there exists an off-state voltage difference of about 80 millivolts across the voltage comparator 422 inputs. The voltage comparator 422 will have an output of high, near 5 volts, in this state. The series resistor string of 432 and 434 are paralleled by resistor 428 to bias the inverting input pin 6 at resistor 426 to about 1.56 volts. Also, the pickup winding parallels resistors 426 and 432. By biasing the inputs above ground by about 1.5 volts, the voltage comparator 422 input is never pulled below ground and still allows the voltage comparator 422 to be powered from only a 5 volt supply.

The mag input circuit 420 includes capacitor 456, diode 450 and resistor 442, supply slope compensation to the input. Capacitor 456 will shunt resistor 438 via diode 450 on the positive slope of the mag signal input. This provides a higher gain on the positive going portion of the mag input signal which counters the retard of the mag signal; however, the same gain is not desirable for the negative going portion of the input signal. Diode 450 blocks the negative and decreases the gain by having resistor 442 in series with capacitor 456. This allows the negative slope compensation to be about ¼ of the positive slope compensation and prevents over-driving of the comparator 422 inputs which may be caused by extreme rates of negative mag input signal or noise on the mag input signal. A wire loop is provided between the negative mag input and capacitor 466 and resistor 468 to select the optimum mag compensation. In particular, the wire loop may be cut to comply with requirements of various manufacturers.

In accordance with this form of the electronic controller, microcontroller 116 output IGN/TRIG is the ignition output drive signal that is level shifted to drive IGBT pair 219, the ignition coil 32 IGBT switch. This output was approximately 105 microseconds in duration to drive IGBT pair 219. This value was chosen because the inductance of large inductive ignition coil 32 limits the current rise time and at least 80–90 microseconds are needed to completely discharge the fully charged capacitor bank 154 and 156 into the ignition coil 32 primary.

The multispark period is controlled by the microcontroller 116 and is normally about 975 microseconds at battery input 132 above 12 volts. The multispark period is increased if the capacitor bank 154 and 156 has not reached full charge in 975 microseconds and can be delayed up to a maximum of 1.8 milliseconds if needed. This provides full amplitude (525–535 volts) of every spark output until the battery drops below 10 volts when the 1.8 milliseconds limit is reached.

The CONV INH is used to shut the convertor off while IGBT pair 219 is turned on. These signals overlap such that the convertor can be ready for output within microseconds of the IGN/TRIG signal going low. This improves the time between capacitor discharge and recharge so that very little time is wasted.

The individual cylinder retard timing feature (CYL DEG) requires an input signal from the CAM PICKUP circuit 470. This circuit also uses a voltage comparator 472 such as a MC33072 op amp. The input is either connected to an inductive fiber optic spark sensor 22 or a conventional magnetic inductance coil 28. The CAM PICKUP input circuit 470 includes resistors 474–486, diodes 488 and 490, capacitors 492–498 and voltage comparator 472. Resistor 484 provides the pull-up current source and is directed to voltage comparator 472 and clamped by back-to-back diodes 488 and 490. The input from the fiber optic sensor 22 is directed to pin 2 through a phototransistor 499 such as an IF-D92 available from Industrial Fiber Optics. When phototransistor 499 detects light from the fiber optic cable from the spark sensor 22, the phototransistor 499 drives capacitor 494 to quickly discharge capacitor 494 and switch the output high. The optical fiber input to the spark sensor 22 must be covered when not in use or when the cam sensor 28 is used to prevent the detection of light and thereby producing an input signal to pin 2 of comparator 472.

Figure 7:
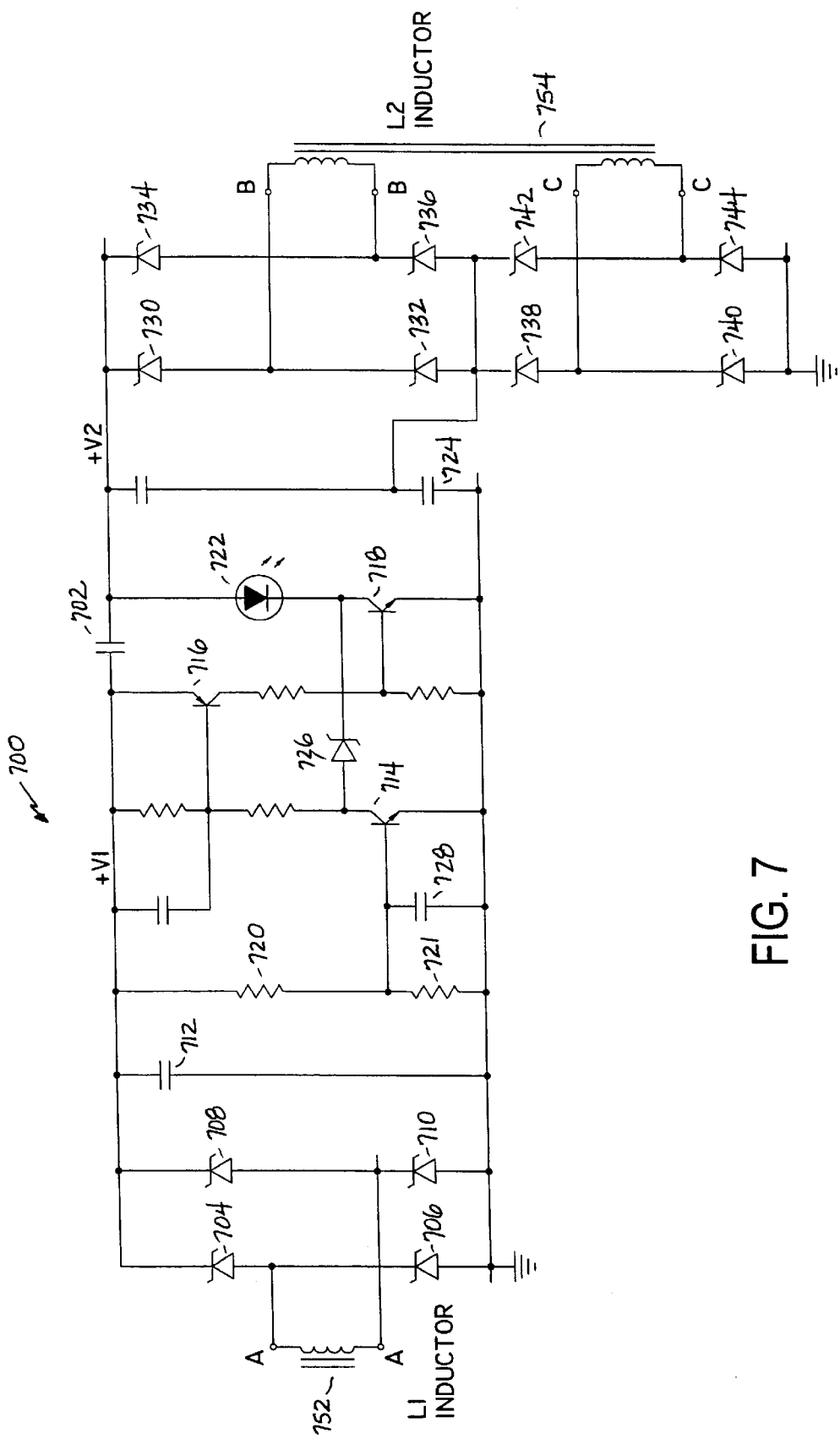
FIG. 7 is a schematic diagram of the circuitry for the electronic spark sensor optimized for higher light emitting diode (LED) current drive providing additional current for the optical timing sensor of the present invention.

FIG. 7 illustrates the circuitry of one form of an inductive fiber optic spark sensor. The circuit 520 is built around an infrared emitter 522 such as a IF-E91A available from Industrial Fiber Optics. As the ignition coil 32 sends an electrical impulse to the spark plug wire 24, the inductors 524 and 526 sense the increased current and produce a low voltage current signal. Capacitor 528 and 528*a*, *b*, and *c* taps off energy and stores the current to increase the drive current to infrared emitter 522. A fiber optic cable (not shown) sends the resulting light emission from infrared emitter 522 to the phototransistor 499 of the CAM PICKUP circuit 470.

Turning to the outputs of the electronic controller 10, one output is the RPM activated switch. As seen on FIG. 6D, the RPM SW 500 consists of a power MOSFET switch 502 and resistor 506. When the engine RPM reach the programmed RPM SW "on" value stored in non-volatile memory 118, power MOSFET 502 receives a positive signal through resistor 506. Conversely, when the RPMs reach the RPM SW "off" value, microcontroller 116 removes the signal, bringing the voltage to ground thereby removing the power to MOSFET 502. The RPM SW 500 output has 100 RPM of hysteresis to prevent the switch or solenoids connected to the output from chattering at turn-on and turn-off. This RPM SW 500 may be used to control any desired RPM on-off switch such as a nitrous supply or a solenoid used to shift a two speed transmission.

SHIFT LIGHT OUT 508 is controlled by microcontroller 116 through MOSFET 510. When the engine RPMs reach the programmed values stored in non-volatile memory 118, microcontroller 116 sends a signal to MOSFET 510 thereby sinking current to the SHIFT LIGHT OUT at 508 terminal (active low). This output 508 may be connected to a shift light which, as controlled by the electronic controller 10, illuminates at stored RPM values and indicates when the driver should manually shift the transmission. Also, the output may be connected directly to an automatic transmission shift controller which will activate as when SHIFT LIGHT OUT 508 signal goes low. During operation the LAUNCH REV LIM wire resets the SHIFT LIGHT sequence to the programmed first gear RPM shift value. When the LAUNCH REV LIM input is removed from +12 volts, the SHIFT LIGHT will use the first RPM value stored to turn the SHIFT LIGHT OUT 508 on (low) after a 750 millisecond delay from the LAUNCH REV LIM wire going low for a six gear transmission. For transmissions with less than six gears, microcontroller 116 automatically adds 100 milliseconds to the delay for a five speed transmission, 200 milliseconds for a four speed for transmissions and so forth. This delay prevents false shifting to the next stored shift RPM value. For each gear after the first shift, the next shift is delayed by 300 milliseconds. Microcontroller 116 detects a shift after a rise and then a fall in engine RPM of at least 500 RPM or the user may program this RPM drop to ensure peak efficiency (see gear shift menu on FIG. 3). After the engine RPM has increased by at least 200 RPM above the lowest actual engine RPM drop, the next programmed gear shift value is selected to bring SHIFT LIGHT OUT 508 to low. Once the SHIFT LIGHT OUT is on (active low), the output stays on until the RPM drops by 100 RPM below the programmed gear shift value.

The SHIFT LIGHT function also provides the activation signal for the GEAR SHIFT RETARD functions. The user may program an ignition timing retard for each gear shift. For example, the user may program a 5 degree ignition timing retard to activate at the first gear shift, a 2 degree at the second gear shift and a 3 degree at the third gear shift. Each ignition timing retard will be added such that at the second gear shift the total ignition timing retard is 5 degrees+2 degrees=7 degrees and at the third shift, 7 degrees+3 degrees=10 degrees. These gear shift ignition timing retards allow the user to select additional timing retard to increase the total timing retard as each gear is shifted without the need for extra transmission micro-switches to the gear shift mechanism. Thus, the problems and failures associated with those micro-switches are eliminated.

The LED 512 output is used for several modes of operation. The first is used to turn the LED 512 on (output low) when the PTS1 signal goes high (trigger edge) to indicate static timing or points signal present. Also, when the mag signal is present, the LED 512 will blink, indicating that the mag signal is present and OK. The LED blinks a code "22" pattern when the capacitor bank 154 and 156 is taking longer than the normal, 975 microseconds, to recharge during multispark operation. Further, LED 512 blinks a code "11" to indicate that no CamSync signal is present. The hand-held programmer 6 and computer 8 also display equivalent warnings as the LED 512 by indicating under the MONITOR 61 indicia at the top of the menu tree 60. When the electronic controller 10 senses a low voltage battery condition, the hand-held programmer 6 and computer 8 will display "Low Batt LOW" and "CamSync NONE" to indicate that there is no CamSync signal present and "OK" to confirm that a correct signal was found.

The microcontroller 116, line 515 drives the gate of MOSFET 517 which provides a signal of 30 to 45 degrees duration with a 12 volt (battery) amplitude at the TACH output 514 terminal pulled up by resistor 516. This output may be used by external devices such as RPM activated switches and for a tachometer drive signal. The TACH output 514 terminal is protected against shorts to the battery by the self-resetting polyfuse 518.

When the engine is running, the electronic controller 10 receives a signal from the cam sensor 28 or spark sensor 22 for 8 to 16 revolutions before verifying a correct signal to ensure that the actual signal is sensed in lieu of noise. The electronic controller 10 stores a history of the signal as a reference to distinguish for noise. Next, the electronic controller 10 determines whether the cam sensor 28 and magnetic crank trigger sensor 18 signals are present and properly phased as indicated on the MONITOR function 61. If the signals are not properly phased, the cam sensor 28 may be adjusted by moving the cam sensor 28 until the display on the hand-held programmer 6 or the computer 8 changes from "CamSync OK" to "CamSync NONE", marking the position and moving the cam sensor 28 in the opposite direction and monitoring the display for the position where the CamSync readout changes from "OK" to "NONE" again and marking the position. The proper position for the cam sensor 28 is the half-way point between the marked lines. Once the cam sensor 28 is phased, individual cylinder timing may be adjusted. The phasing of the cam sensor 28 and magnetic crank trigger sensor 18 is not needed when using the spark sensor 22.

If a cam sensor 28 or spark sensor 22 is not detected, the electronic controller 10 recalls the programmed, individual timing retards of all cylinders, selects the maximum retard value programmed for a cylinder and applies that value to all cylinders. This acts as a safeguard to maintain a timing retard and prevent detonation. This condition is also displayed on the computer 8 on the individual cylinder timing bar graph 72. The bar of the selected maximum retard will remain its initial color, green, and the remainder of the bars will match the maximum value and change to red. This quickly notifies the user of the ignition timing retard being applied to all cylinders. Furthermore, if the signal from either cam sensor 28 or spark sensor 22, is removed during operation of the engine, the electronic controller 10 continues to apply the programmed individual cylinder timing retard values until the engine has stopped running.

Individual cylinder timing may be retarded up to 5 degrees per cylinder in 0.1 degree increments. The cam sensor 28 or spark sensor 22 signals the microcontroller 116 that the first cylinder has fired thereby starting the ignition spark triggering sequence (the next cylinder to fire as dictated by the next post on the distributor cap). Microcontroller 116 will delay the ignition trigger signal to the ignition coil 32 by the degrees of rotation stored in non-volatile memory 118 for that specified cylinder. A delay may be stored for each cylinder. And, as with all of the ignition retards, the individual cylinder retard is additive.

The MagComp (magnetic pickup compensation) feature allows the user to compensate for the inherent ignition timing retard of the magnetic picking to increase timing accuracy from idle to maximum RPM. This feature is adjustable from 0 to 3 degrees of ignition timing in 0.5 degree increments. The default setting stored in the non-volatile memory 118 is 2 degrees. One method the user may use to determine the inherent retard is to monitor the ignition timing of the engine during operation from 0 to maximum RPM, or to about half the maximum speed with a timing light. By adjusting the MagComp, the user is ensured that all timing values are accurate over the RPM range of the engine.

The previously described electronic controller 10 may be reconfigured for use with distributorless ignitions (DIS), or single channel ignitions, and provides for inputs from a supercharger or turbo and may be used to electronically control fuel injectors. Furthermore, another version of electronic controller 10 is adapted for controlling a motorcycle engine and shifting. Examples of alternative forms of electronic controller 10 are described in further detail below.

A second form of electronic controller 10 provides for the control of electronic fuel injectors ignition timing based upon intake manifold absolute pressure (MAP), and allows for use with distributorless ignition systems, as well as the functions described in this first form of electronic controller 10.

Turning to FIG. 1, the second form of electronic controller 10 can receive an input signal, from distributor 16, a crank trigger 18 for engines utilizing a distributor. For distributorless engines, electronic controller 10 can receive multiple inputs from an electronic control unit (ECU) (not shown) depending upon the number of cylinders in the engine. Electronic controller 10 may also receive an input signal from either spark plug firing sensor 22 or cam position sensor 28. This form of electronic controller 10 provides for an input from a hose connected to the intake manifold of engine 4 (not shown). The hose supplies electronic controller 10 with air at the same pressure of that inspired by engine 4 and correlates to the load the engine is under during operation.

When distributor 16 is utilized, electronic controller 10 provides output signals to ignition coil 32 which provide a high voltage, high current signal to distributor 16 and to spark plug 36. For DIS engines, ignition coil 32, or a combination of coils provides a current signal from the ECU which distributes the signal to spark plug 36. Tachometer 33 may be connected to electronic controller 10 to provide a real-time display of engine RPM. Gear shift light 34 or alternative, automatic transmission shift controller 37 may also be connected to electronic controller 10. Moreover, electronic controller 10 may be used to activate an RPM controlled switch such as a nitrous valve or two speed transmission shift solenoid (not shown).

Figure 8:
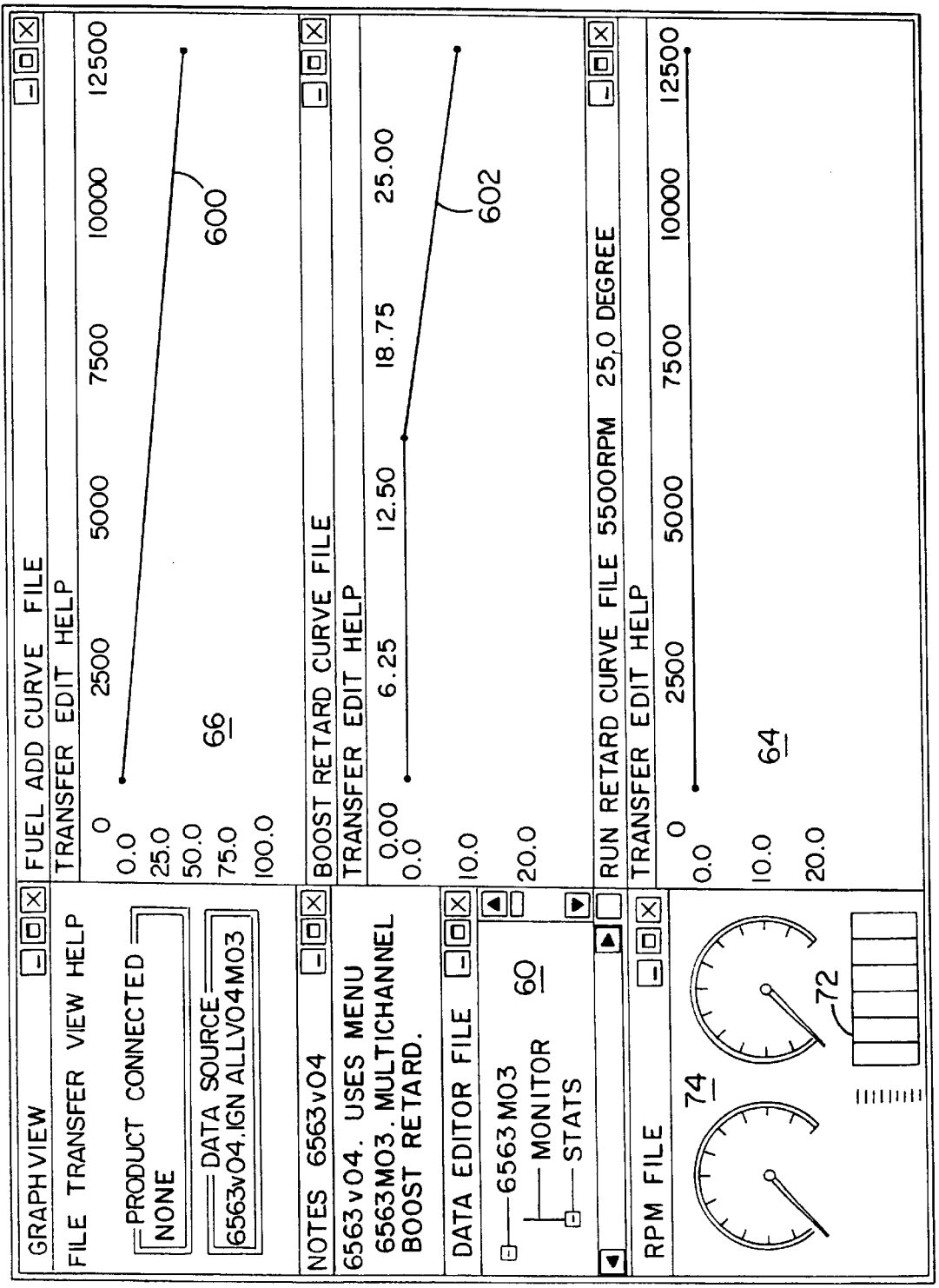
FIG. 8 shows a computer screen for displaying real time data tree and graphical engine operation displays.

Hand-held programmer 6 as shown in FIG. 2 may be used to communicate and view engine control values 52 as described above. Moreover, electronic controller 10 may be connected to computer 8. As shown in FIG. 8, computer screen 58 displays data tree 60, graphical tachometer 74, real-times, ignition timing retard degree dial 74 and real-time bargraph 72 which graphically displays timing retard values for each cylinder. Computer screen 58 also displays run-timing retard curve 64 and may be edited as described previously for the first form of electronic controller 10.

On computer screen 58 of the second form of electronic controller 10 is a fuel add curve 600 represents engine RPM and the y-axis corresponds to percentage of time the fuel injector is open at a fixed frequency of about 250 Hz and is directly proportional to the amount of fuel injected.

Figure 9A:
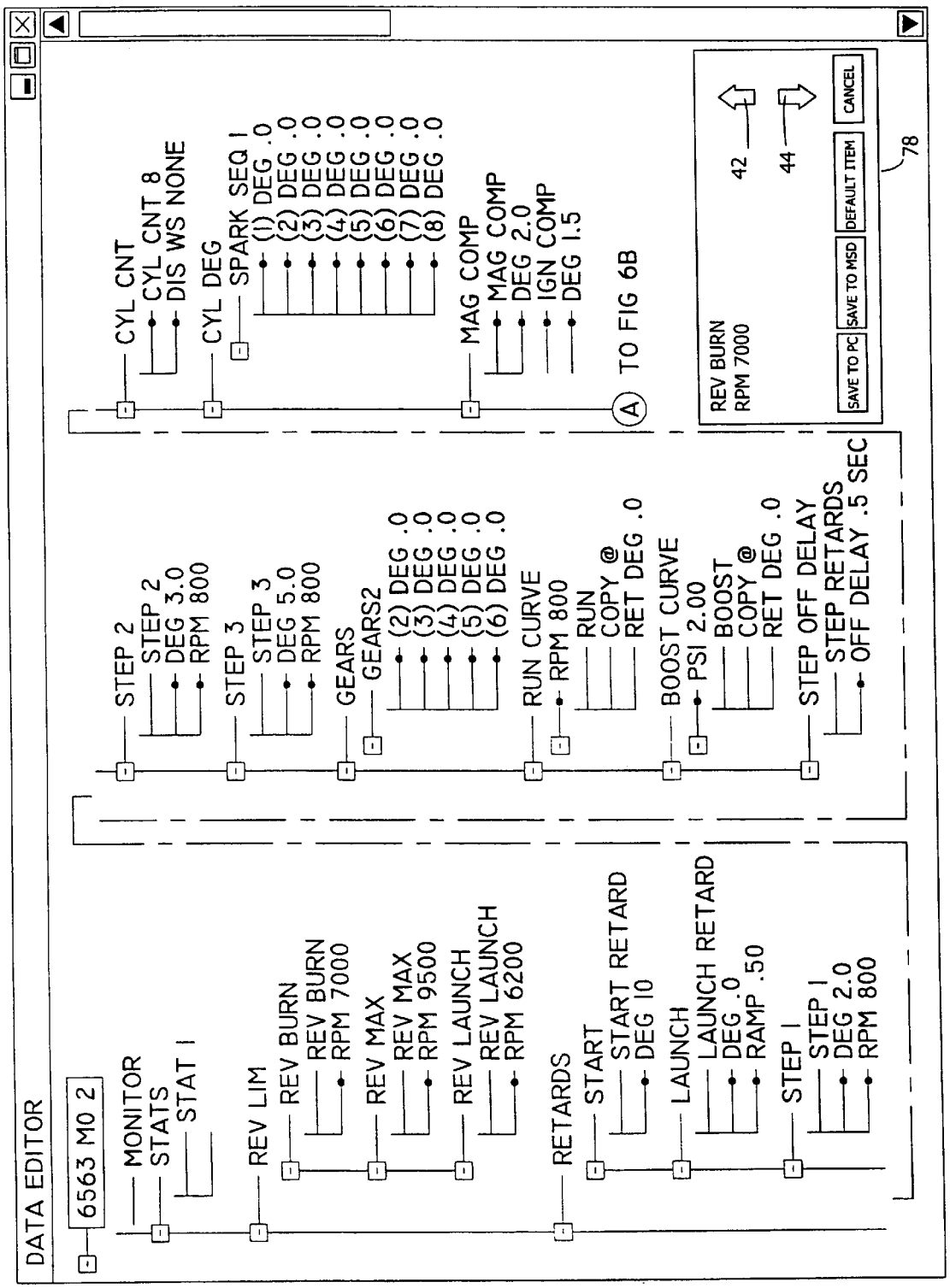
FIGS. 9A and 9B show the extended views of the data editor windows selected from the data tree of FIG. 8.
Figure 9B:
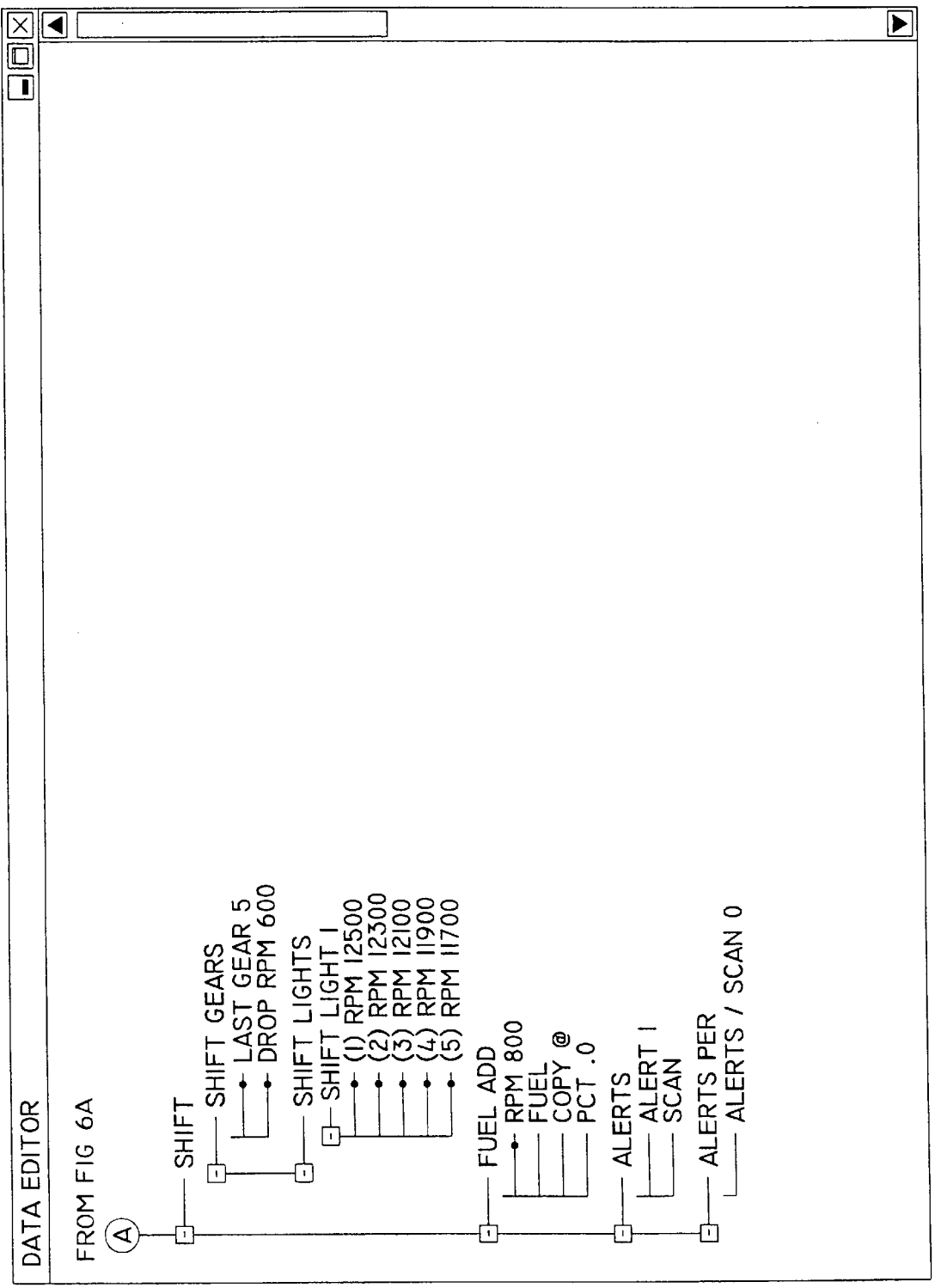

Computer screen 58 also includes a boost retard curve 602 with the x-axis representing the manifold absolute pressure (MAP) in pounds per square inch and the y-axis corresponding to degrees retard of ignition timing. Ignition timing run retard curve 66, as used with the first form of electronic controller 10 is included on computer screen 58. The complete data tree 60 can be viewed by expanding the data editor window and is shown in FIGS. 9A and 9B. Data tree 60 functions as detailed in the foregoing description of the first form of electronic controller 10. The default factory engine control values 54, the value range and the minimum increment of each engine control value 54 for the second form of electronic controller 10 is listed below:

| Engine Control | Default Value | Value Range | Increment |
| --- | --- | --- | --- |
| ShiftLight1 | 12,500 | 2,000–12,500 | 100 RPM |
| ShiftLight2 | 12,300 | 2,000–12,500 | 100 RPM |
| ShiftLight3 | 12,100 | 2,000–12,500 | 100 RPM |
| ShiftLight4 | 11,900 | 2,000–12,500 | 100 RPM |
| ShiftLight5 | 11,700 | 2,000–12,500 | 100 RPM |
| Gears (Last) | 5 | 2–6 | 1 |
| RetComp | | | |
| MagComp | 2.0 | 0–3 | 0.5 deg. |
| IgnComp | 2.0 | 0–3 | 0.5 deg. |

-continued

| Engine Control | Default Value | Value Range | Increment |
|---|---|---|---|
| RevBurn | 7,000 | 2,000–12,500 | 100 RPM |
| RevLaunch | 6,200 | 2,000–12,500 | 100 RPM |
| RevMax | 9,500 | 2,000–12,500 | 100 RPM |
| RetStart | 10 | 0–25 | 1.0 deg. |
| Retard1 | 2.0 | 0–15.0 | 0.1 deg. |
| Retard2 | 3.0 | 0–15.0 | 0.1 deg. |
| Retard3 | 5.0 | 0–15.0 | 0.1 deg. |
| Retard1 | 800 | 800–12,500 | 100 RPM |
| Retard2 | 800 | 800–12,500 | 100 RPM |
| Retard3 | 800 | 800–12,500 | 100 RPM |
| RetLaunch | 0.0 | 0–15.0 | 0.5 deg. |
| RampTiming | 0.50 | 0–2.50 | 0.01 sec. |
| Spark1 | 0 | 0–5.0 | 0.1 deg. |
| Spark2 | 0 | 0–5.0 | 0.1 deg. |
| Spark3 | 0 | 0–5.0 | 0.1 deg. |
| Spark4 | 0 | 0–5.0 | 0.1 deg. |
| Spark5 | 0 | 0–5.0 | 0.1 deg. |
| Spark6 | 0 | 0–5.0 | 0.1 deg. |
| Spark7 | 0 | 0–5.0 | 0.1 deg. |
| Spark8 | 0 | 0–5.0 | 0.1 deg. |
| CylCnt | 8 | 4/6/8 | |
| DisWs | WsOn | None/WsOff/WsOn | |
| DropRpm | 600 | 500–1500 | 100 RPM |
| RunCurve | 800 | 800–12500 | 100 RPM |
| RunCurve | 0 | 0.0–25.0 | 0.1 deg. |
| LaunchCurve | 800 | 800–12500 | 100 RPM |
| LaunchCurve | 0 | 0.0–25.0 | 0.1 deg. |
| BoostCurve | 2 | 2.0–30 | 0.25 psi |
| BoostCurve | 0 | 0–25 | 0.1 deg. |
| StepOffDelay | 0.50 | 0–2.50 | 0.01 sec. |
| Gear 3 (Retard) | 0 | 0–5.0 | 0.1 deg. |
| Gear 4 | 0 | 0–5.0 | 0.1 deg. |
| Gear 5 | 0 | 0–5.0 | 0.1 deg. |
| Gear 6 | 0 | 0–5.0 | 0.1 deg. |
| RpmSw On | 2,000 | 2,000–12,500 | 100 RPM |
| RpmSw Off | 6,000 | 2,000–12,500 | 100 RPM |
| FuelAdd | 800 | 800–12,500 | 100 RPM |
| FuelAdd | 0 | 0–100% | 0.5% |

Figure 10A:
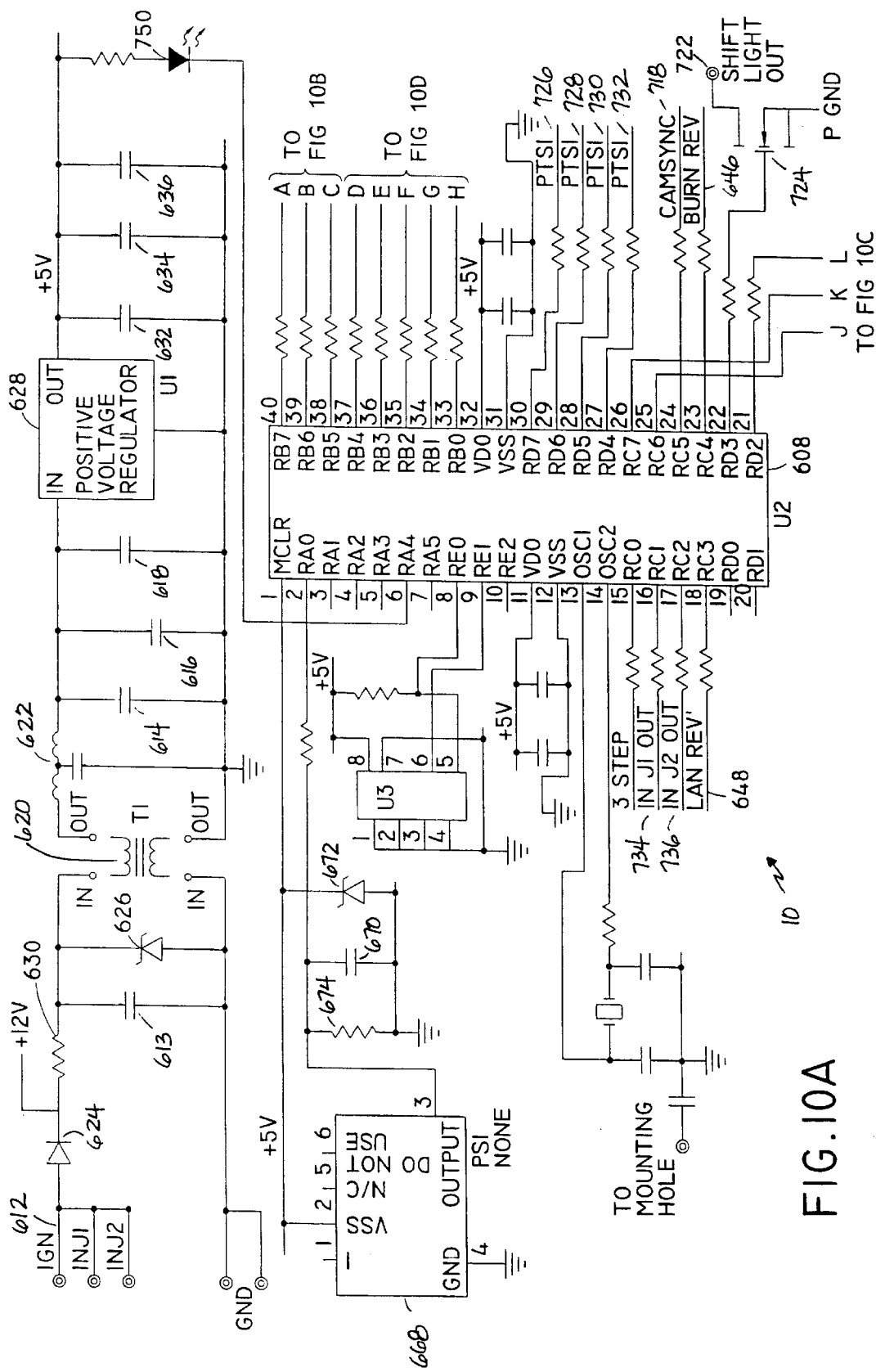
FIGS. 10A–10D are schematic diagrams for an alternate embodiment electronic controller in accordance with the invention.
Figure 10B:
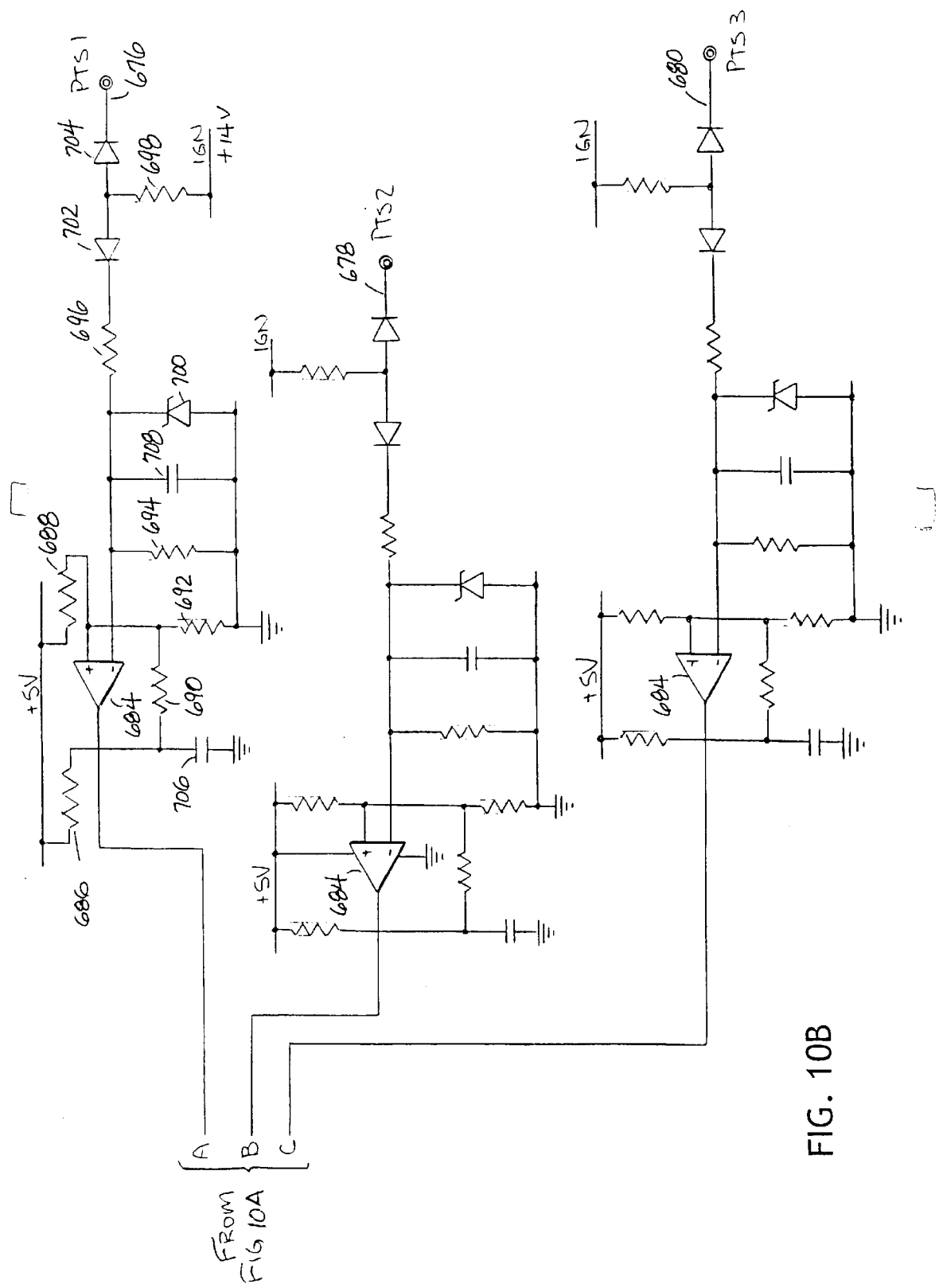
Figure 10C:
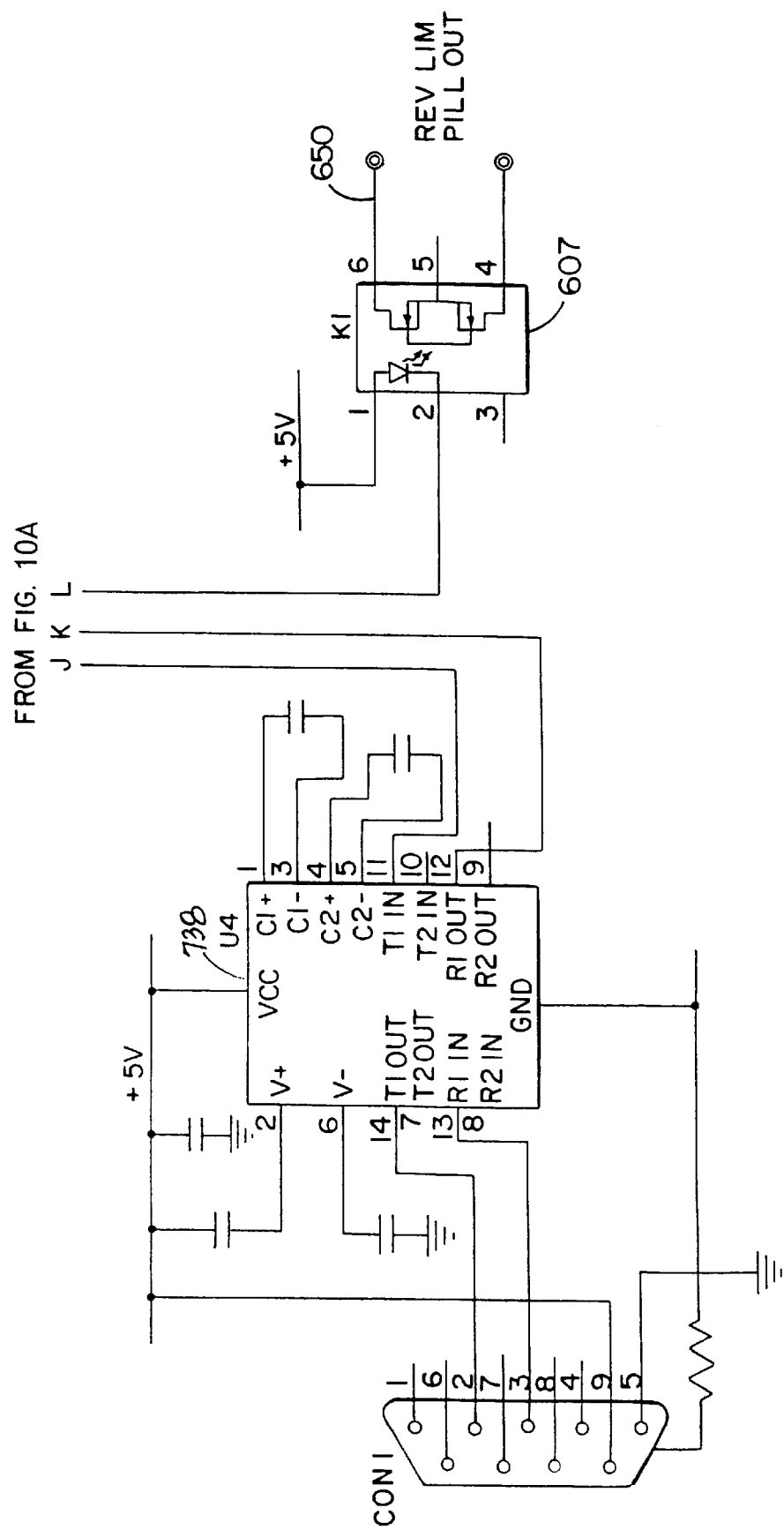

FIGS. 10A and 10B are schematic diagrams for the circuitry for the second form of electronic controller 10 used to control RPMs, ignition timing spark retard, gear shifting, fuel addition, and switches of internal combustion engine 4 during various stages of a drag race. Data is transferred form either hand-held programmer 6, computer 8 or an on-vehicle module via the data connection 12 through a 9-pin serial connector 604. An RS232 driver and receiver 606 provides the proper voltages to a microcontroller 608 used to control the functions of electronic controller 10. This second form of electronic controller 10 utilized MicroChip PIC 16C77, 8-bit CMOS microcontroller with analog-to-digital converter. Microcontroller 608 contains 368 bytes of RAM and utilizes electrically erasable programmable read-only memory (EEPROM) to store and execute the program used to control the engine 4. Engine control values 54 are stored in a non-volatile memory 610. This second form of electronic controller 10 used a MicroChip 64 K 2.5 V CMOS Smart Serial™ EEPROM. Microcontroller 608 controls the data transmissions to non-volatile memory 610 by generating a serial clock signal. Data is transmitted and engine control parameter groups stored in non-volatile memory 610 as described in the foregoing description of the first form of electronic controller 10.

Returning to FIGS. 10A–D, electronic controller 10 receives a +12 volt switched input at IGN 612. Noise on the +12 voltage input is prefiltered by capacitors 613, 614, 616, and 618 along with choke 620 before input to microcontroller 608 regulator input. The +12 is further filtered by RF filter 622, and reverse protected by diode 624 and clamped by Zener diode 626, before supplied to the input of the precision 5 volt regulator 628. Resistor 630 provides a current limiting impedance for the 24 volt Zener diode 626. The RF filter 622 is a high frequency inductive/capacitive filter to attenuate frequencies above 10 MHZ on the input supply line. The 5 volt regulator 628 is a low dropout type with a tight +/−0.5% regulation of the 5 volt output. This insures that microcontroller 608 operates near the optimum supply input requirements even at the lowest input battery levels. For 5 volt output, the battery may drop to about 5.7–5.8 volts. Microcontroller 608 incorporates brown-out-detection and will reset when the 5 volt supply drops to less than 4 volts. This allows microcontroller 608 to function down to about a 5 volt battery input level. Capacitors 632, 634, 636 provide 5 volt supply filtering for the microcontroller 608. The placement of these capacitors near the microcontroller's 608 power supply pins are important for noise immunity.

Microcontroller 608 functions to accept inputs for triggering the output, enabling operation up to the preset and user inputted revolution limiter values, enabling timing retard, and individual cylinder timing retard, shifting outputs and fuel adder outputs. The inputs include PTS1–PTS4, MAG PICKUP INPUT, BURN REV, LAUNCH REV LIM, NO. 1–3 STEP RETARD, CAM PICKUP and VBOOST from manifold vacuum pressure hose. The outputs include PTS 1–4 OUT, REV LIM PILL OUT, LED, RPM SW, SHIFT LIGHT OUT, INJ1 and INJ2.

The second form of electronic controller 10 is user programmable and includes programmable features such as revlimit controls, ignition timing retards, individual cylinder timing retards, an RPM activated switch, gear shift controls and fuel adder as described further below.

Hand-held programmer 6 or computer 8 is used to input and store the revolutions per minute controls and is described in further detail below. The burn out revlimit is activated when the input of BURN REV 646 is pulled high to +12 volts (or any battery potential above 4.5 volts). Likewise, the launch revlimit is activated when the input of LAUNCH REV LIM 648 is pulled high to +12 volts (or any battery potential above 4.5 volts). Each may be set to values from 2,000 to 12,500 RPM in 100 RPM increments. These inputs are debounced in microcontroller 608 to ensure clean revlimiter selection and reject any noise that may be seen by microcontroller 608 at the input pin. When +12 volts (or any battery potential above 4.5 volts) biasing both BURN REV LIM 646 and LAUNCH REV LIM 648, the maximum revlimit (REVMAX) controls the maximum RPM the engine may turn at any time; REVMAX may be set from 2,000 to 12,500 RPM in 100 RPM increments. Alternatively, electronic controller 10 can be interfaced to the RPM plug of an analog ignition at open connection REV LIM PILL OUT 650. When a revlimiting module or "pill" (not shown) is used with the analog ignition, electronic controller 10, microcontroller 608 simulates a zero maximum revlimit programmed value. The ignition will limit the maximum RPM the engine will reach by the value of the RPM module used. The LAUNCH REV LIM 648 also functions to activate the launch retard timing function and launch timing curve, discussed further below.

As described above in connection with FIGS. 6F and 6G, the electronic controller 10 acts as multi-stage retard. The STEP RETARD No. 1 through 3 input selects the retard value stored in non-volatile memory 610 to retard the ignition spark output when the STEP RETARD No. 1 (332), No. 2 (364) or No. 3 (362) is pulled high (above 4.5 volts). The STEP RET. No. 1–3, BURN REV and LAUNCH REV LIM controls input circuits are identical in component layout and operation as described in the foregoing description of the first form of electronic controller 10 (see FIG. 6). Like the REV LIM inputs, these inputs are also debounced by microcontroller 608 to ensure proper selection of the STEP RETARD function and rejection of noise. The STEP RETARD functions are programmable from 800 to 12,000 RPM with each retard being adjustable from 0 to 15 degrees in 0.1 degree increments. When activated, each STEP RETARD is added to the previous retard to reach a maximum of 25 degrees as described in the forgoing description of the first form of electronic controller 10. A time delay, "StepOffDelay," may be set from 0 to 2.50 seconds in 0.01 second increments and is useful in engine applications using nitrous to ensure that the nitrous has stopped flowing through the engine before deactivating the STEP RETARD.

Microcontroller 608 also executes a user adjustable START RETARD that is automatically enabled and adjustable from 0 to 25 degrees of crank-shaft rotation. When the engine is operating below 500 RPM, the ignition timing is retarded to the user inputted degrees until the engine reaches 800 RPM when timing is returned to full (non-retarded) timing. The RPM must drop back below 500 RPM to reactivate the START RETARD feature.

The ignition run timing retard curve 64 allows the user to program a full timing curve from 800 RPM to 12,500 RPM in 100 RPM and 0.1 degree increments. (When the engine RPM falls below 500 RPMs, the START RETARD feature is activated and will control the start up ignition timing.) The ignition run timing curve 64 may be programmed to a maximum of 25 degrees of ignition retard. The user may program the ignition run timing curve 64 using the hand-held programmers, by inputting the RPM value and selecting the enter key 50. The hand-held programmer 6 will then prompt the user to input the timing retard value. Once inputted, this value is stored in non-volatile memory 610. The user may input as many points that are necessary for the particular application and electronic controller 10 extrapolates a curve based on those points. Likewise, the ignition run timing curve 64 may also be programmed using a computer 8 and a mouse as described previously. The user simply places the mouse pointer 68 to the approximate position of the desired RPM and timing value on the curve 64 and adds a point. Again, the user may input as many points as desired between 0 and 12,500 RPM in 100 RPM increments. During operation of the engine 4 the total ignition retard values can be monitored on either hand-held programmer 6 or on computer screen 58 on ignition timing retard degree dial 76.

Ignition timing can also be controlled using by programming a retard for a specific manifold absolute pressure (MAP) using boost retard curve 602. The MAP reading is indicative of the load of the engine and will change with turbo charging or the injection of nitros into the cylinders. Degrees of ignition timing retard from 0 to 25 degrees in 0.1 degree increments may be programmed for a specific MAP pressure from 2 to 30 PSI in 0.25 PSI increments. The information is displayed on boost retard curve 602 and values changed in a similar fashion as ignition timing run retard curve 64. Likewise, all retard values are summed to control the ignition timing retard.

The MAP pressure is detected by a pressure sensor 668 in electronic controller 10. A vacuum hose, approximately 0.125 inch diameter, from the intake manifold provides a pressure input to pressure sensor 668. One pressure sensor used was an ASX30AN, 0 to 30 PSI, absolute pressure sensor by SenSym, Inc. Pressure sensor 668 has a hermetically sealed vacuum reference chamber to provide a relative vacuum reference. Pressure sensor 668 converts the pressure value into a voltage signal which is filtered before being supplied to microcontroller 608. The input signal is filtered by capacitor 670 and clamped by Zener diode 672. Resistor 674 provides a current limiting impedance for the 13 volt Zener diode 672.

Lastly, another method of controlling ignition timing is the launch retard ramp function. This feature allows the ignition timing to ramp from a programmed launch retard value to ignition timing retard run curve 64. The user may set the ramp time duration from 0.00 to 2.50 seconds in 0.010 second increments. When the LAUNCH REV LIM is high, any programmed retards are added to the ignition timing. However, when the launch retard ramp function is deactivated by the LAUNCH REV LIM signal going low, the launch retard ramp function gradually removes or ramps up the timing retards over the programmed time duration.

Turning to PTS1–4 input circuits (676, 678, 680 and 682), these circuits use a voltage comparator 684, such as a MC33072 op amp, to sense the input trigger from the either a points signal, such as mechanical points, or an ECU (electronic control unit) coil driver. Each circuit use identical components; as such, only PTS1 is described. PTS1 input circuit 676 includes components resistors 686–698, diodes 700–704, and capacitors 706 and 708. Resistor 698 provides a pull-up current source of about 140 milliamperes from a 14 volt battery. This results in the input level equal to the battery potential from the PTS1 driver (points/ECU signal) at the anodes of diodes 702 and 704. This signal is then directed to the input pin 6 of voltage comparator 684 (pin 2 for PTS2 and PTS4) by limiting resistor 696 and clamped to 5.1 volts maximum by Zener diode 700. The capacitor 708 provides input debounce with capacitive filtering on the trailing edge. When the PTS1 signal goes high, capacitor 708 quickly charges to above the 3 volts threshold through resistor 696 to switch the output at pin 7 to low (alternatively, on PTS2 and PTS4, pin 1 low). This occurs in about 2 microseconds so the delay from input to ignition output is held to a minimum. When the PTS1 signal goes low, capacitor 708 begins discharging through large resistor 694 and requires at least 120 microseconds before the input at pin 6 falls below the 3 volt threshold at pin 5 (likewise, on pins 2 and 3 for PTS2 and PTS4). This provides an initial debounce period. Microcontroller 608 further inhibits all inputs after a valid trigger edge input for greater than 45 to 60 degrees, with logic for low speed operation as discussed above, depending upon engine RPM to reject any noise during the spark output time period that may get through the hardware debounce. This combination of hardware and software provides an adequate debounce period for most mechanical ignition breaker points to eliminate false triggering of the ignition.

Microcontroller 608 has two (2) inputs from which it may trigger: PTS, and MAG PICKUP. The MAG PICKUP may either be the magnetic sensor located in the distributor or magnetic crank trigger sensor 18. For increased accuracy, the input from crank trigger sensor 18 is preferred over the input from a distributor's magnetic pickup. However, for DIS engines, microcontroller 608 uses the PTS input. Microcontroller 608 may use an adaptive debounce technique for enabling the debounce time on the trailing edge to be reduced from a predetermined maximum time to lesser times as engine speed increases. For example, each time the interrupt routine is executed, a timer may be used to measure the amount of time taken by the trailing edge debounce function. Accordingly, as the engine speed increases, the debounce time can be lessened during subsequent executions of the interrupt routine. Thus, excess debounce delays may be eliminated so that the leading edge may be serviced more quickly. For both distributor and DIS engines, cam position sensor 28 must be used to properly reference the first cylinder for the ignition firing sequence.

At power up, microcontroller 608 determines which of these inputs (MAG INPUT/OR PTS) has an input signal and selects only that input for the trigger input. Microcontroller 608 makes the other input an output so that the non-input signal is ignored and cannot interfere with the input signal used. Therefore, microcontroller 608 operates with only one trigger interrupt. Microcontroller 608 recalls from non-volatile memory 610 the number of cylinders, CylCnt: 4, 6, or 8, and if the ignition is a waste spark ignition or not (DisWs). For conventional distributor engines with a single input trigger and output coil, "NONE" is used. Coil per plug (coil unplugged) ignition engines which utilize multiple coils such that one coil is provided for each cylinder, a waste spark is not used and therefore "WsOff" should be selected. Lastly, for those engines using a waste spark, i.e., a four cylinder engine using 2 coils, a six cylinder with 3 coils or an eight cylinder using 4 coils, "WsOn" is the proper input selection. The other inputs, such as STEP RETARD's and REV LIMITER, are scanned in between ignition output cycles.

Figure 10D:
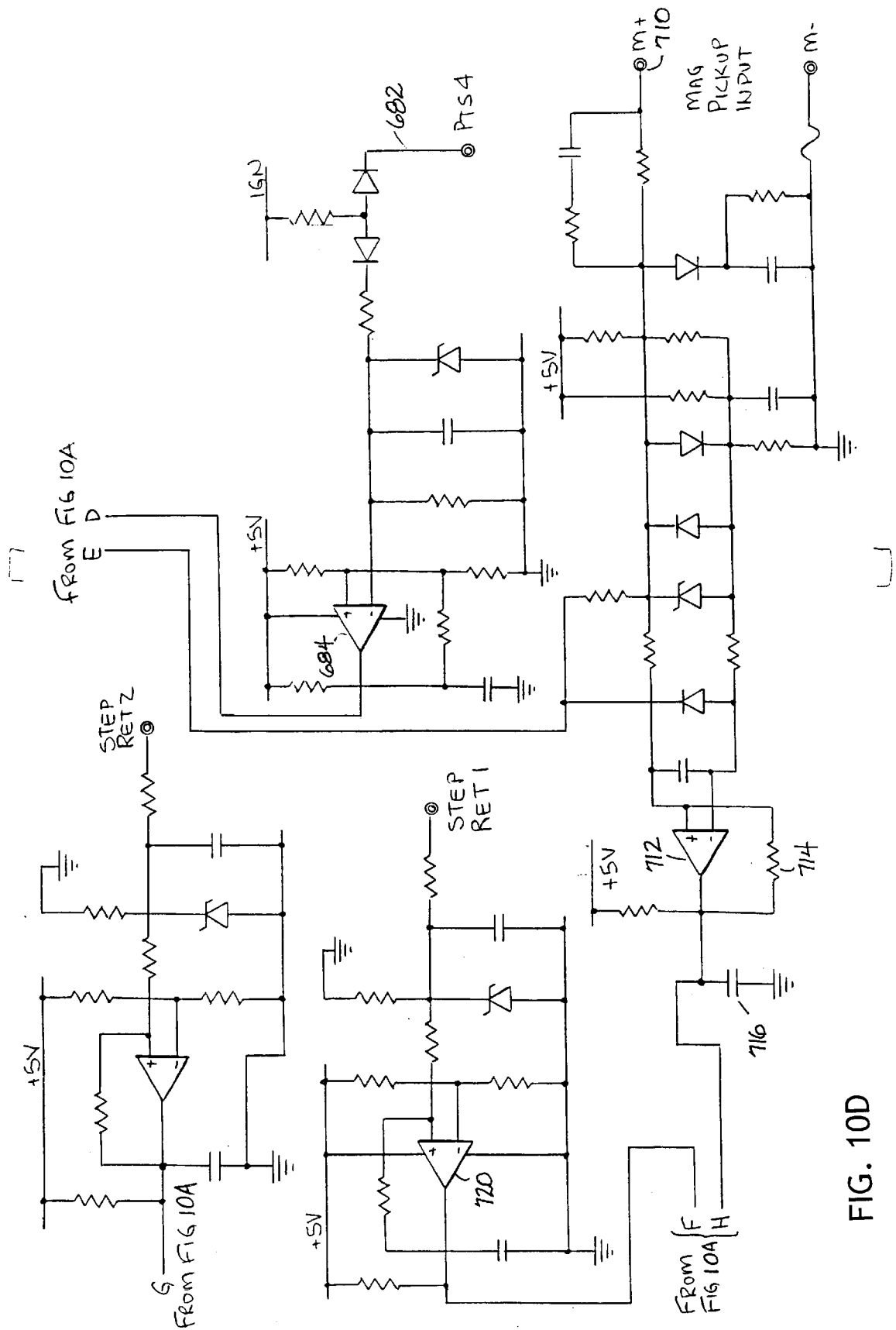

The MAG PICKUP INPUT circuit 710 is based on a bipolar op amp, such as the MC33072, voltage comparator 712 as shown in FIG. 10D. Magnetic pickup circuit 710 functions as described previously in the description of the first form of electronic controller 10. However, magnetic pickup circuit 710 may not have a wire loop between the negative mag input and components, capacitor 466 and resistor 468 of magnetic pickup circuit 420 of the first form of electronic controller 10. As such, resistors 462 and 468, and capacitors 463 and 464 are replaced in magnetic input circuit 710 by resistor 714 and capacitor 716.

For microcontroller 608 to implement the individual cylinder retard timing feature (CYL DEG) an input signal from the CAM PICKUP circuit must be received. This circuit also uses a voltage comparator 720 such as a MC33072 op amp and is the same circuit as cam pickup circuit 470 used in the first form of electronic controller 10 described in the foregoing. One version of the second form of electronic controller 10 did not employ the optional fiber optic sensor 22 and therefore, the input of cam pickup circuit 718 is provided by a magnetic inductance coil, cam position sensor 28. When an input is detected by cam pickup circuit 718, the individual cylinder timing retard function may be implemented by microcontroller 608.

Turning to the outputs of the second form of electronic controller 10, one output is a SHIFT LIGHT OUT 722. When the engine reaches programmed RPM values stored in non-volatile memory 610 as sensed by either PTS/ECU or magnetic crank pickup circuit 710, microcontroller 608 sends a signal to MOSFET 724. This signal and MOSFET 724 brings shift light out 722 to low (active low). Output 722 may be connected to a shift light, which, as controlled by microcontroller 608, illuminates at stored RPM values and indicates when the driver should manually shift the transmission. Alternatively, output 722 may be directly connected to an automatic transmission shift controller such as a solenoid to actuate a shift lever. When output 722 goes low, the shift controller will activate thereby shifting the transmission. During operation, LAUNCH REV LIM 648 rests the SHIFT LIGHT sequence to the programmed first gear stored RPM shift value. When LAUNCH REV LIM input 648 is removed from +12 volts microcontroller 608 recalls the first stored RPM value in non-volatile memory 610 to enable the first SHIFT LIGHT OUT 722 to low, when the RPM equals the first RPM shift light valve, after a 750 microsecond delay from LAUNCH REV LIM 648 going low for a six gear transmission. For transmissions with less than six gears, microcontroller 608 automatically add 100 milliseconds to the delay for a five gear transmission, 200 milliseconds for a four speed transmission, 300 milliseconds for a three speed and 400 milliseconds for a two speed. This delay prevents false shifting to the next stored shift RPM value. For each gear after the first shift, the next shift is delayed by 300 milliseconds. Microcontroller 608 detects a shift after a rise and then a fall in engine RPM of at least 500 RPM or the user may program this RPM fall to ensure peak efficiency (see gear shift menu on FIG. 9). After the engine RPM has increased by at least 200 RPM above the lowest actual engine RPM drop, the next programmed gear shift value is selected to bring SHIFT LIGHT OUT 722 to low. Once the SHIFT LIGHT OUT is on (active low), the output stays on until the RPM drops by 100 RPM below the programmed gear shift value.

The SHIFT LIGHT function also provides the activation signal for the GEAR SHIFT RETARD functions. The user may program an ignition timing retard for each gear shift. The function of the GEAR SHIFT RETARD ignition timing retards are described in the foregoing description of the first form of electronic controller 10. However, due to the fact that the second form of electronic controller 10 does not function as an ignition, the electronic controller, provides an output signal at PTS1 OUT 726, PTS2 OUT 728, PTS3 OUT 730, and PTS4 OUT 732. For single coil, distributor engines, only PTS1 OUT 726 is used as an input into the ignition system of the engine. For example, a MSD 6 or 7 series ignition manufactured by Autotronic Controls Company may be used with the second form of electronic controller 10. Alternately, a stock ignition, consisting of a coil and distributor, may also be used. The magnetic crank pickup 18 must be used with distributor engines to allow electronic controller 10 to sense engine RPM. Further, this form of electronic controller 10 may also be used with non-distributor engines systems (DIS) which use an ECU and individual coil per cylinder (non-waste spark) or those in which one coil supplies the current to the spark plugs of two cylinders (waste spark). The points outputs are used an input to the ECU which will control the timing (retard) of the ignition signal to the coils. The number of points outputs used, 726–732, depends upon whether a waste spark or non-waste spark ignition system is used. Unlike distributor engines, electronic controller 10 does not require the input of magnetic crank pickup sensor 18 to determine engine RPM. The points input signal, or more accurately described as the ECU input, provides the necessary input for electronic controller 10 to calculate engine RPM.

The second form of electronic controller 10 also has an additional ignition timing retard which retards the ignition timing as a function of intake manifold absolute pressure (MAP). The user can program an ignition timing retard for a specified MAP value to compute an ignition timing retard versus MAP pressures curve (boost retard curve 602). An ignition timing retard value may programmed from 0 to 25 in 0.1 degree increments over a 2 to 30 PSI MAP range.

The above mentioned ignition timing retards are all additive. Specifically, start retard, launch retard, step retards 1–3, gear retards (2–6), ignition timing run retard curve 64 and boost retards curve 602 are all added for a composite ignition timing at a particular time or event. The total maximum ignition timing retard allowed at any particular moment is 25 degrees. If, when added the total timing at a particular event is greater than 25 degrees, electronic controller 10, overrides the greater total and uses the 30 value of 25 degrees.

The individual cylinder ignition timing retard values are also added to the overall ignition timing retards. Before applying the individual cylinder retards, electronic controller 10 determines if cam sensor 28 is present. While the engine is running, electronic controller 10 samples the signal from the cam sensor 28 for 8 to 16 revolutions before verifying the signal to ensure that the actual signal is sensed in lieu of noise. Electronic controller 10 stores a history of the signal as a reference to distinguish for noise. Next, electronic controller 10 determines whether the cam sensor 28 and magnetic crank trigger sensor 18 signals are present and properly phased as indicated on the MONITOR function 61. If the signals are not properly phased, cam sensor 28 may be adjusted by moving cam sensor 28 until the display on the hand-held programmer 6 or the computer 8 changes from "CamSync OK" to "CamSync NONE", marking the position and moving the cam sensor 28 in the opposite direction and monitoring the display for the position where the CamSync readout changes from "OK" to "NONE" again and marking the position. The proper position for cam sensor 28 is the half-way point between the marked lines. Once cam sensor 28 is phased, individual cylinder timing may be adjusted.

If cam sensor 28 is not detected, the electronic controller 10 recalls the programmed, individual timing retards of all cylinders, selects the maximum retard value programmed for a cylinder and applies that value to all cylinders. This acts as a safeguard to maintain a timing retard and prevent engine damage from ignition timing being too far advanced. This condition is also displayed on computer 8 on the individual cylinder timing bar graph 72. The bar of the selected maximum retard will remain its initial color, green, and the remainder of the bars will match the maximum value and change to red. This quickly notifies the user of the value of the ignition timing retard being applied to all cylinders. Furthermore, if the signal from either cam sensor 28, is removed during operation of the engine, the electronic controller 10 continues to apply the programmed individual cylinder timing retard values until the engine has stopped running.

Individual cylinder timing may be retarded up to 5 degrees per cylinder in 0.1 degree increments. Cam sensor 28 signals microcontroller 608 that the first cylinder has fired thereby starting the ignition spark triggering sequence (the next cylinder to fire as dictated by the next post on the distributor cap or ECU sequenced connection). Microcontroller 608 will delay the ignition trigger signal to the ignition by the degrees of rotation stored in non-volatile memory 610 for that specified cylinder. A different delay may be stored for each cylinder. And, as with all of the ignition retards, the individual cylinder retard is added to the programmed values of other ignition timing retards.

Another feature of electronic controller 10, the MagComp (magnetic pickup compensation) feature, allows the user to compensate for the inherent ignition timing retard of the magnetic picking to increase timing accuracy from idle to maximum RPM. This feature is adjustable from 0 to 3 degrees of ignition timing in 0.5 degree increments. The default setting stored in the non-volatile memory 610 is 2 degree. One method the user may use to determine the inherent retard is by monitor the ignition timing of the engine during operation from 0 to maximum RPM or half the maximum engine RPM with a timing light. By adjusting the MagComp, the user is ensured that all timing values are accurate over the RPM range of the engine.

Similarly, the second form of electronic controller 10 also provides a correction for inherent delays in the output of the ignition unit used with electronic controller 10. The user may adjust the ignition compensation retard from 0 to 2 degrees over a range of 800 RPM to 14,000 RPM. For example, typical digital ignition units require a retard of 1.5 degrees and a retard value greater than 4.5 degrees of the summed values at 12,000 RPM for true ignition accuracy. Likewise, for analog ignitions, a retard of 0.5 degrees and retard sum of over 3.5 degrees at 12,500 is typically needed for true timing.

Another output of the second form of electronic controller 10 is INJ1 OUT 734 and INJ2 OUT 736. These outputs are typically used to control a fuel injectors which supply fuel to the cylinders of the engine. These outputs are typically used to control a fuel injectors which supply fuel to the cylinders of the engine. Microcontroller 608 sends a signal to injection driver 738 as controlled by the fuel-add curve 600 stored in non-volatile memory 610. The fuel injection driver 738 is a high current peak/hold fuel injection driver which operates at 227 Hz and has an overlap of 50 percent duty cycle between INJ1 OUT and INJ2 OUT for even fuel distribution. Fuel injection driver 738 may be used to drive up to two injectors (up to four total). A combination of the following injector types may be used:

| | |
|---|---|
| 2.4 ohm P/H per channel | 2 each per injector out (734, 736); |
| 1.2 ohm P/H per channel | 1 per injector out (2 total); |
| 12 ohm saturated per channel | 1 per injector out (2 total); and |
| 12 ohm saturated per channel | 2 per injector out (4 total). |

The time the injector is on is controlled by stored fuel add curve 600 in non-volatile memory 610.

The LED 750 is used for several modes of operation. LED 750 turns on (output low) when the PTS1 signal goes high (trigger edge) to indicate static timing or points signal present. Also, when the mag signal is present, LED 750 will blink, indicating that the mag signal is present and OK. Further, LED 750 blinks a code "11" to indicate that no CamSync signal is present. The hand-held programmer 6 and computer 8 also display equivalent warnings as LED 750 by indicating under the MONITOR 61 indicia at the top of the menu tree 60. When the electronic controller 10 senses a low voltage battery condition, the hand-held programmer 6 and computer 8 will display "Low Batt LOW" and "CamSync NONE" to indicate that there no CamSync signal present and "OK" to confirm that the signal was found.

Figure 11:
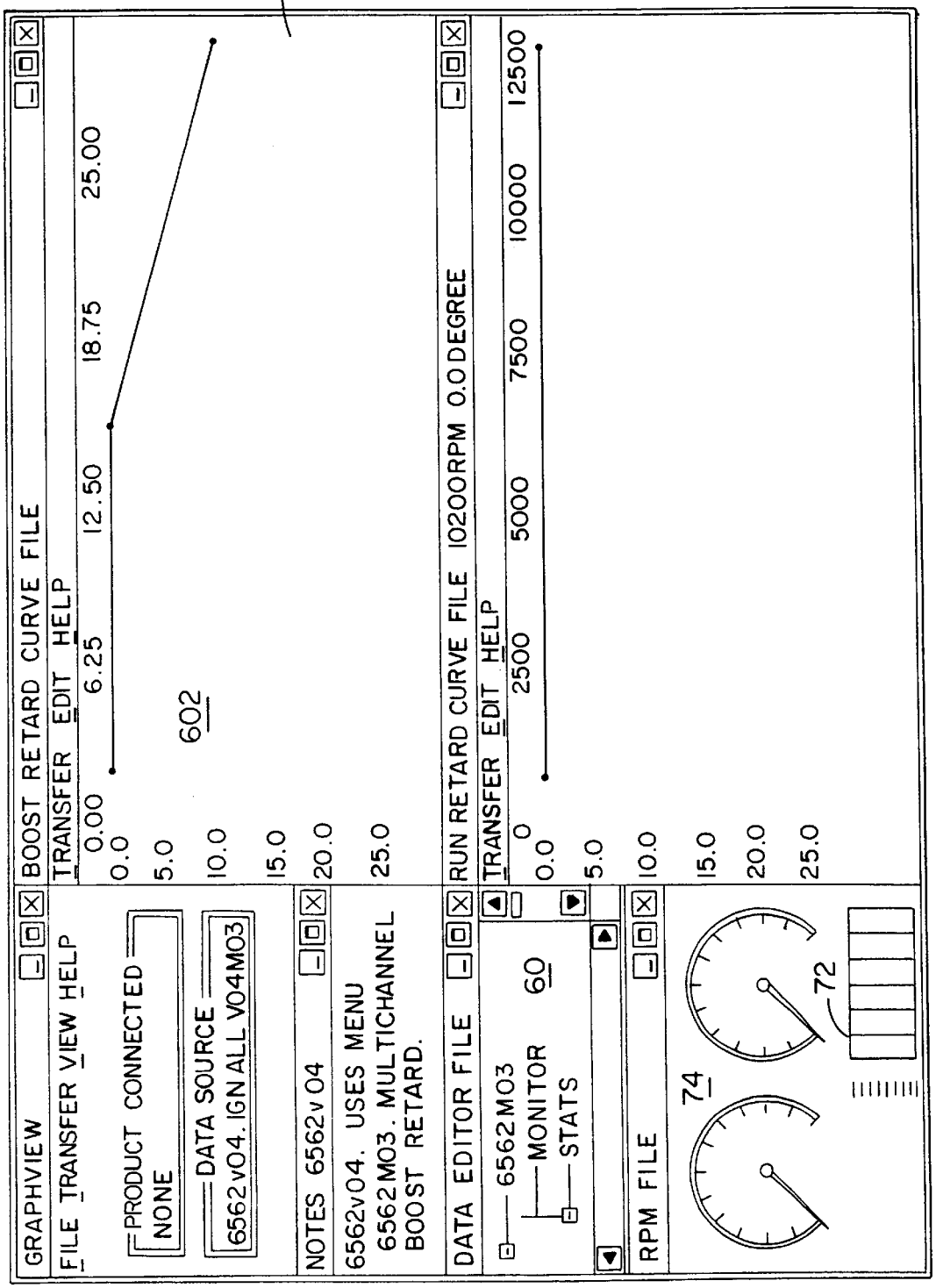
FIG. 11 illustrates the main computer screen of the electronic controller displaying boost retard and engine run timing curves and graphical tachometer in an embodiment which does not require the fuel add curve of is FIG. 8.
Figure 12:
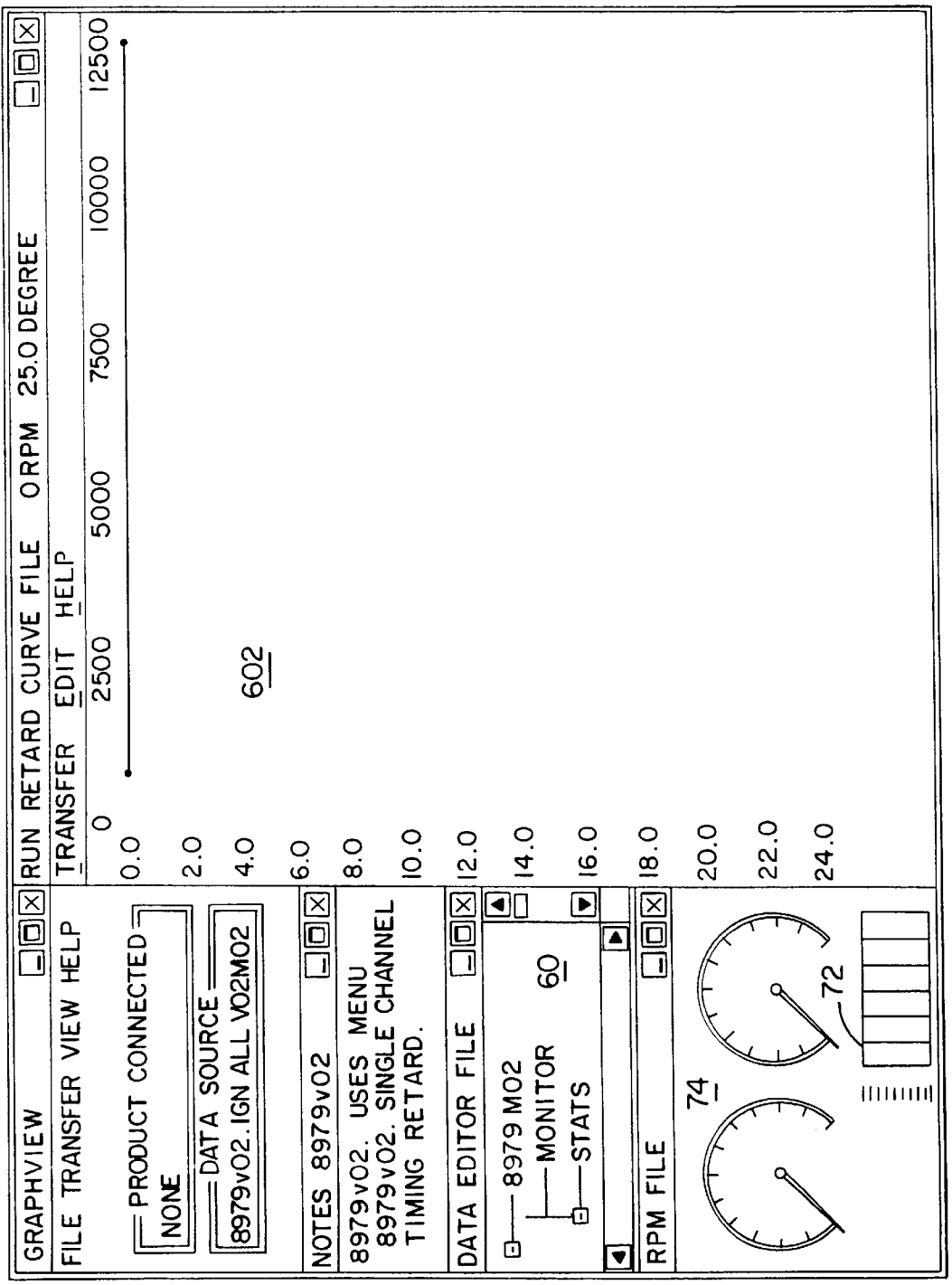
FIG. 12 illustrates the main computer screen of FIG. 11 with an expanded run retard curve selected from the computer display of FIG. 11.
Figure 13A:
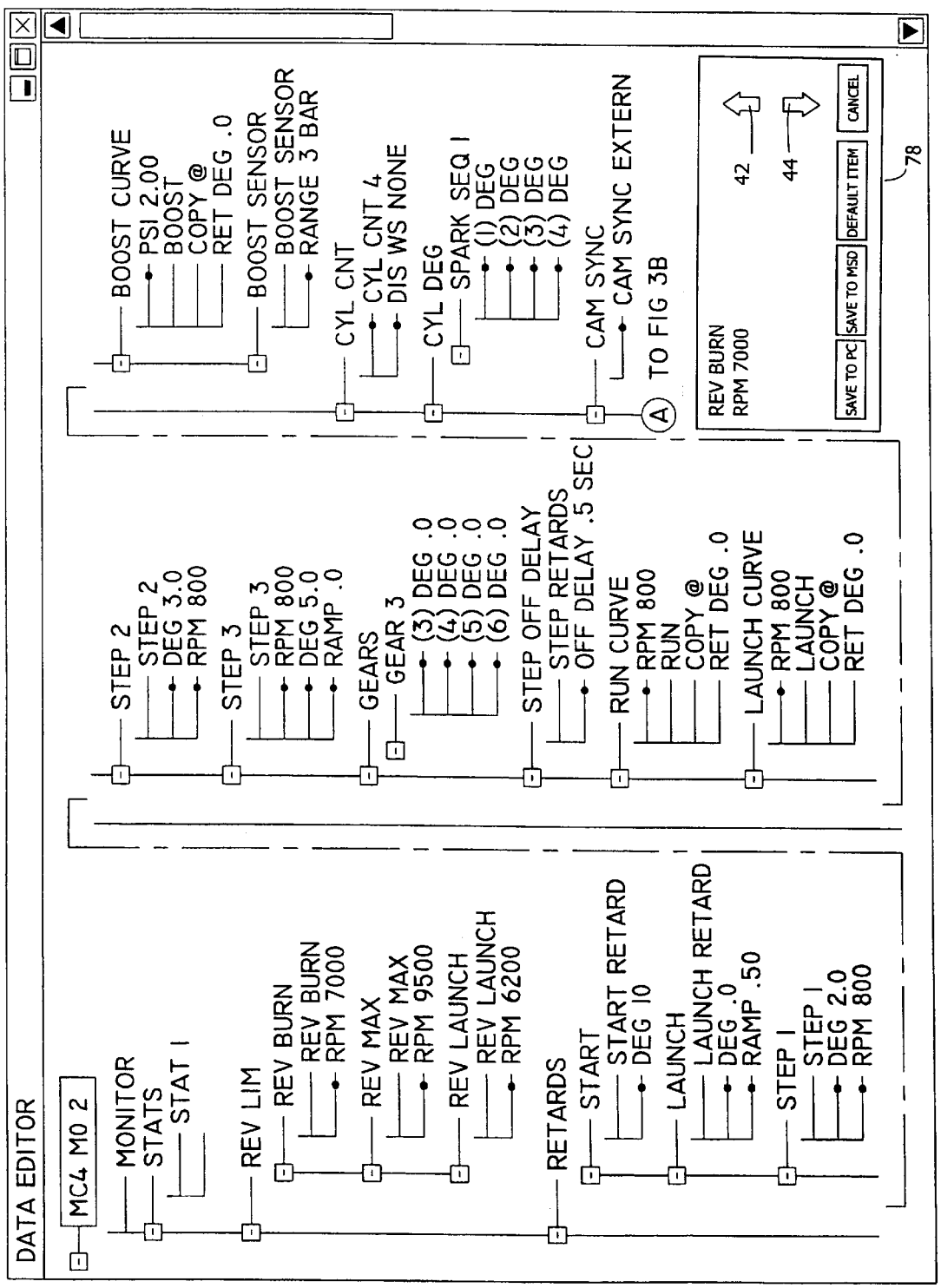
FIGS. 13A and 13B illustrate the expanded data editor window display in accordance with an alternate embodiment of the invention providing for the control of a motorcycle engine.
Figure 13B:
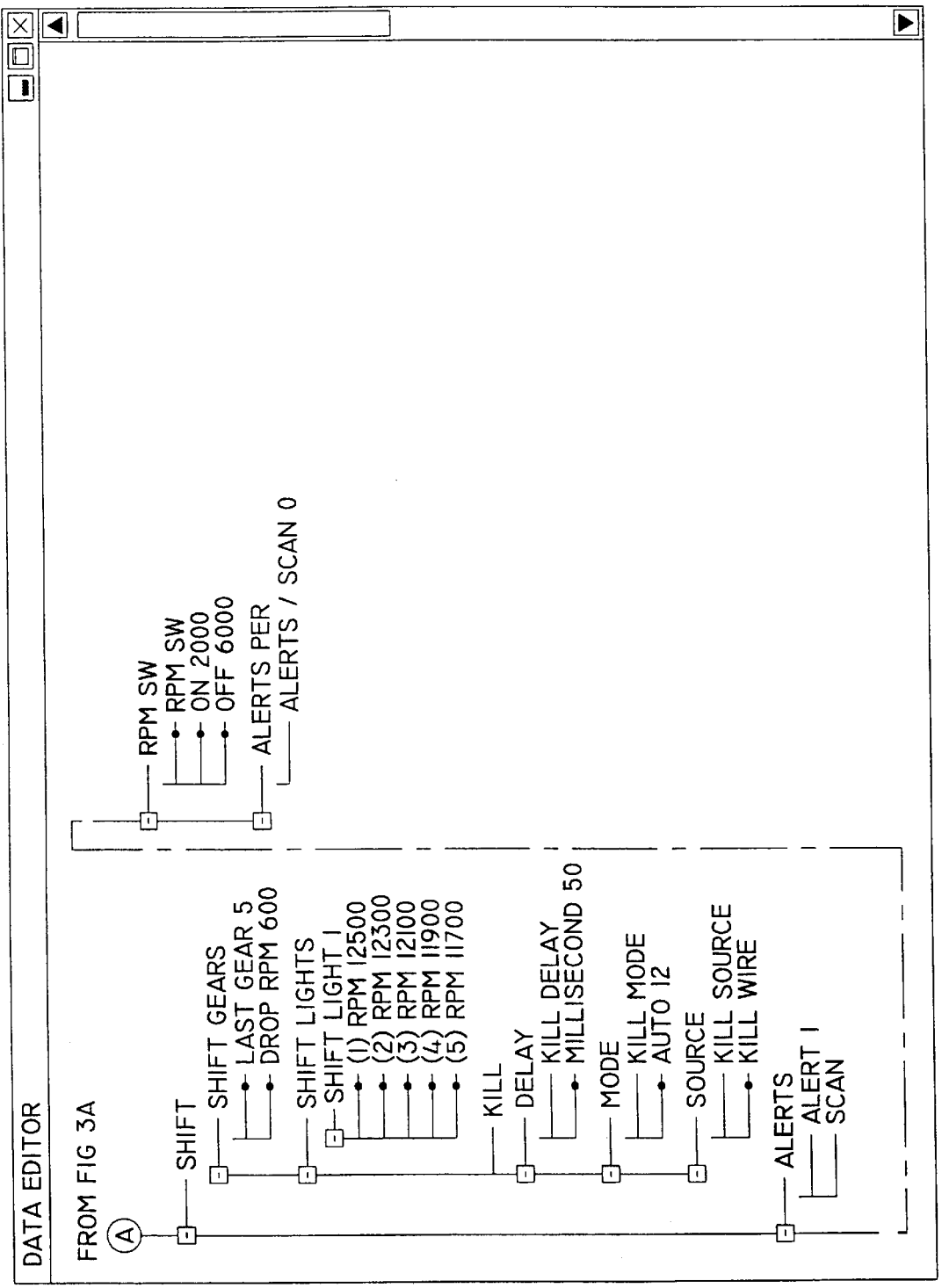
Figure 14:
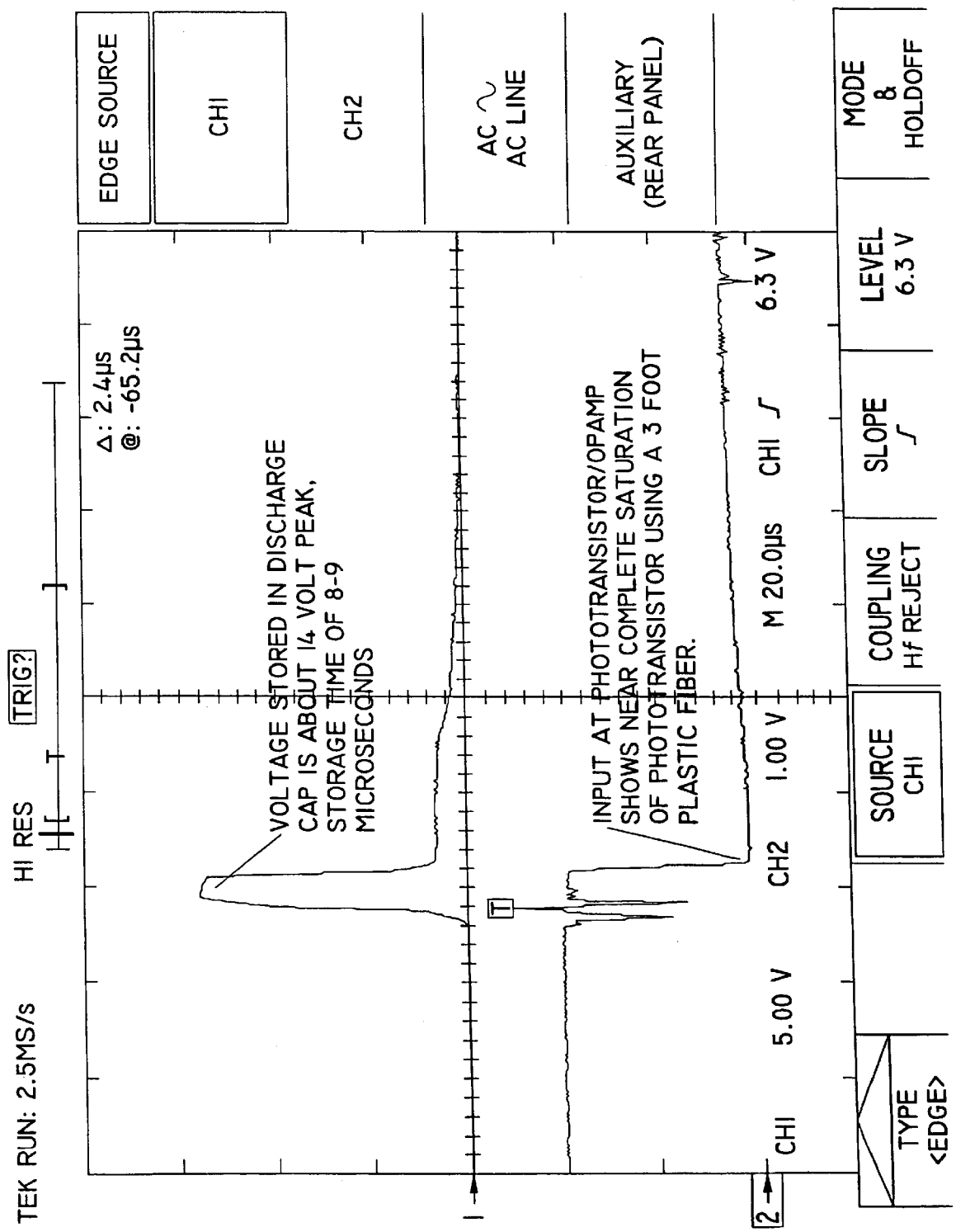
FIG. 14 shows a voltage waveform associated with pickup capacitors, voltage storage, and discharge into the LED timing sensor.
Figure 15:
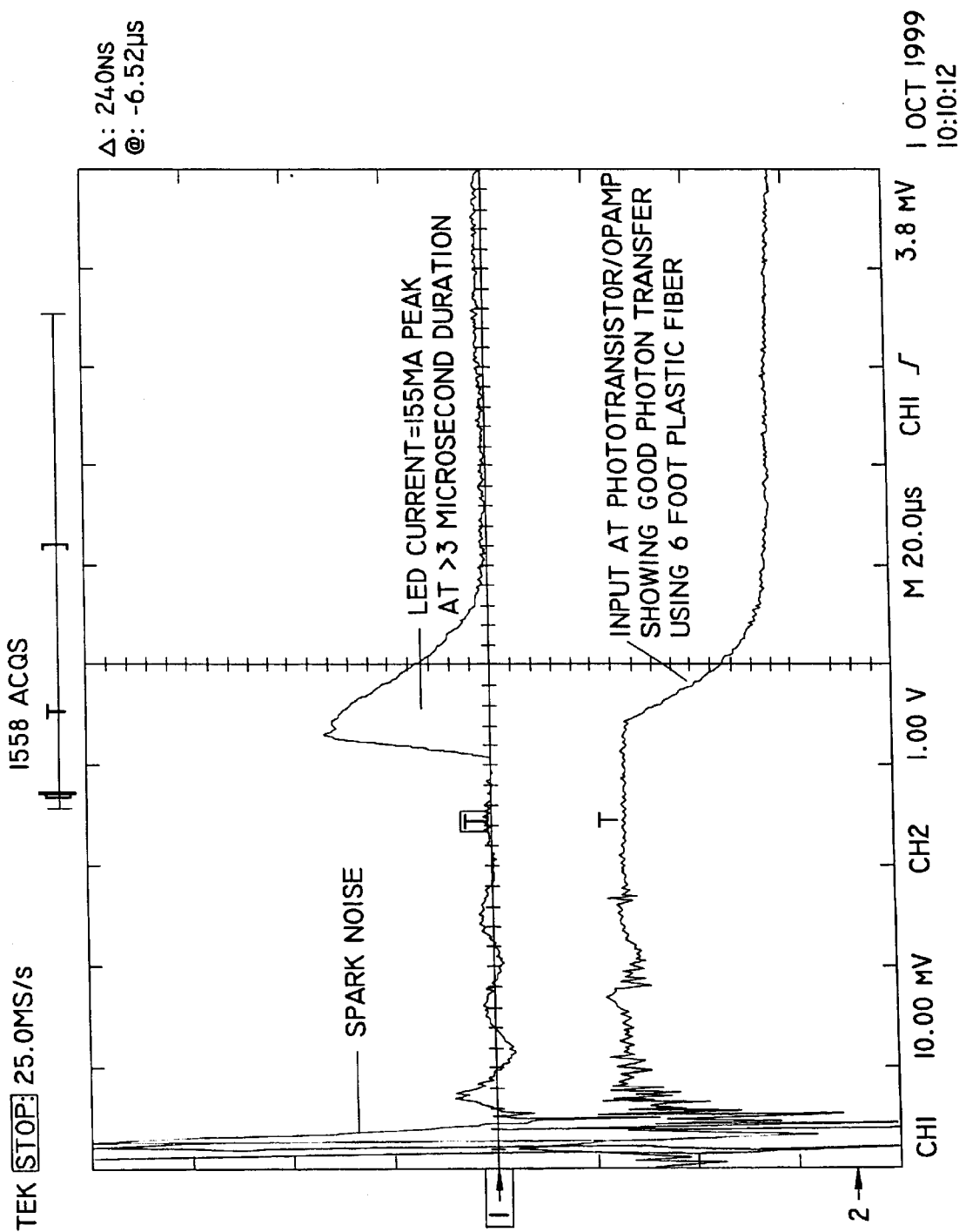
FIG. 15 shows a waveform illustrating the initial current flow across the spark plug gap with a small delay for voltage storage in the pickup capacitors.

A third form of electronic controller 10 provides a portion of the features offered in the second form for applications which do not require all the features of the second form and the ignition of the first form. The third form has all features and circuitry of the second form with the exception of the fuel add curve 600. FIG. 11 illustrates the main computer screen 58 seen when the third form of electronic controller 10 is connected to computer 8. Computer screen 58 displays boost retard curve 602 and ignition run timing curve 64. Also displayed on computer screen 58 is the graphical tachometer 74, ignition timing retard degree wheel 76 and the bar graph representation of individual cylinder timing retards 72. Data tree 60 is featured on computer screen 58 and is expanded in FIG. 12. As seen by comparing FIGS. 9 and 12, the third form of electronic controller 10 contains the same functions and as the second version with the exception of fuel add curve 600. The electrical circuitry of the third form is also identical to that shown in FIG. 10 including the fuel injector circuit (INJ1 734 and INJ2 736). By including the fuel injector circuitry, the software used to control microcontroller 608 of the third form of electronic controller 10 can be easily updated for controlling fuel injectors.

A more limited form of electronic controller 10 may be provided for analog ignitions with less functions that the third form and the functions retained were selected based on features desirable for non-fuel injection applications. The only engine control 52 that may need to be represented as a curve on computer screen 58 is ignition run timing retard curve 64. Also, the graphical tachometer 74, ignition timing retard degree dial 76, the bar graph representation of individual cylinder timing retard values 72, data tree 60 and the expanded view of data tree 60 may be provided with the computer screen 58. RPM controls (RevBurn, RevLaunch and RevMax); ignition timing retards (Launch Retard, Start Retard, Step 1–3 Retards, Gears 2–6 Retards, StepOff Delay, individual cylinder timing retards, and run timing retard curve); gear shift controls (2–6 gears); magnetic pickup compensation; and RPM plug limiter input 650 may be provided for inputting the revlimiter from an analog ignition. The more limited form of electronic controller 10 may not require ignition compensation for use with single channel ignitions. However, to provide for future updates, the circuitry of the forth form of electronic controller 10 is identical to the second form, with the exception, e.g., of pressure sensor 668.

Another form of electronic controller 10 is also provided which incorporates features of the first and second forms of electronic controller 10 and suited for use with drag racing motorcycles. Electronic controller 10 functions as the digital, multispark, capacitive discharge ignition system which may be used with dual coils provides user programmable features. Specifically, the racer may program multiple ignition timing retards from the start of the race through the entire run. The programmable features are similar to those provided by the first form of electronic controller 10, except specific features are adapted for use with one, two, or four cylinder engines with or without waste spark ignitions. Likewise, the defaults and RPM ranges have been modified for these types of engines.

As used with the second and third forms of electronic controller 10, this version provides for engines which use waste-spark, DIS, dual coil, or combination thereof. The fifth form of electronic controller 10 provides additional features for motorcycle applications such as the those identified by indicia Shift-Kill Mode 752 and indicia Shift-Kill Delay 754. Shift-Kill Mode 752 allows the race to control the engine "kill-function" for a specific gear or set of gears. In motorcycle applications, it is common to interrupt the ignition, killing the engine, during a manual or semi-automatic gear shift to ensure that the transmission has sufficient time to complete the shift to prevent the engine from rapidly increasing speed during the gear shift. If the engine is allowed to significantly increase RPMs during the shift, when the transmission engages, or as the driver disengages the clutch, the high speed engine and transmission drive shaft will spin at incompatible speeds. This condition may cause considerable engine or transmission damage. Electronic controller 10 allows the racer to select which gears Shift-Kill Mode 752 will engage. The "Auto12" mode disengages Shift-Kill Mode 752 in during shifting from first to second gear. "Auto123" disables Shift-Kill Mode 752 during shifting from first to second gear and from second to third gear. Lastly when "manual" is selected, Shift-Kill Mode 752 is active in all gears.

The second added feature, Shift-Kill Delay 754, allows the racer to program a time delay from when the Shift-Kill deactivates until the engine kill function turns off. In other words, the racer may program the time in milliseconds of how long the engine is killed, or is interrupted. The shift-kill time may be programmed in millisecond increments from 20 to 99 milliseconds. The default factory engine control values 54, the value range and the minimum increment of each engine control value 54 for the fifth form of electronic controller 10 as used in motorcycle applications is listed below:

| Display | Default | Data Low–High (step by) |
|---|---|---|
| ShiftLt1 ###00 Rpm | 12,500 | 2,000–15,000 (100) |
| ShiftLt2 ###00 Rpm | 12,300 | 2,000–15,000 (100) |
| ShiftLt3 ###00 Rpm | 12,100 | 2,000–15,000 (100) |
| ShiftLt4 ###00 Rpm | 11,900 | 2,000–15,000 (100) |
| ShiftLt5 ###00 Rpm | 11,700 | 2,000–15,000 (100) |
| LastGear # | 5 | 2–6 |
| RevBurn ###00 Rpm | 7,000 | 2,000–15,000 (100) |
| RevLaun ###00 Rpm | 6,200 | 2,000–15,000 (100) |
| RevMax ###00 Rpm | 9,500 | 2,000–15,000 (100) |
| RetStart ##Deg | 10 | 00–25 |
| Retard1 ##. #Deg | 2.0 | 0–15.0 (0.1) |
| Retard2 ##. #Deg | 3.0 | 0–15.0 (0.1) |
| Retard3 ##. #Deg | 5.0 | 0–15.0 (0.1) |
| Retard1 ###00 Rpm | 800 | 800–15,000 (100) |
| Retard2 ###00 Rpm | 800 | 800–15,000 (100) |
| Retard3 ###00 Rpm | 800 | 800–15,000 (100) |
| StepOffDelay #. ## | .50 | 0–2.50 (0.01) |
| RetLaun ##. #Deg | 0.0 | 0–15.0 (0.5) |
| RampTim #. ##Sec | .50 | 0–2.50 (0.01) |
| Spark1 #. #Deg | 0 | 0–5.0 (0.1) |
| Spark2 #. #Deg | 0 | 0–5.0 (0.1) |
| Spark3 #. #Deg | 0 | 0–5.0 (0.1) |
| Spark4 #. #Deg | 0 | 0–5.0 (0.1) |
| CylCnt $ | 4 | ½/4 |
| Ws $$$$$$ | WsOn | WsNone/WsOff/WsOn |
| DropRpm ##00 | 600 | 500–1,500 (100) |
| RunCurve Rpm ###00 | 800 | 800–15,000 (100) |
| RunCurve Deg ##.# | 0 | 0.0–25.0 (0.1) |
| LaunchCurve Rpm ###00 | 800 | 800–15,000 (100) |
| LaunchCurve Deg ##.# | 0 | 0.0–25.0 (0.1) |
| BoostCurve Psi ##.## | 2.0 | 2.0–45.0 (0.25) |
| BoostCurve Deg ##.# | 0 | 0.0–25.0 (0.1) |
| BarType #Bar | 3 | 2–3 |
| AlertsPer # | 0 | 0–1 |
| RpmSw On | 2000 | 2000–15,000 (100) |
| RpmSw Off | 6000 | 2000–15,000 (100) |
| Gear 3 Regard Deg #.# | 0 | 0.0–5.0 (0.1) |
| Gear 4 Regard Deg #.# | 0 | 0.0–5.0 (0.1) |
| Gear 5 Regard Deg #.# | 0 | 0.0–5.0 (0.1) |
| Gear 6 Regard Deg #.# | 0 | 0.0–5.0 (0.1) |
| ShiftKillMode $$$ | Auto12 | Auto12/Auto123/Manual |
| ShiftKillTime ##msec | 50 | 20–99 (1 millisecond) |
| CamSync $$$$$$ | Extern | Extern/Chan1 |
| Step3 Ramp | 0 | 0–9.9 (0.1 sec) |
| KillSource | Kill Wire | Kill Wire/ShiftLight |
| RpmDrop | 600 | 500–1500 (100) |
| IgnComp | 2.0 | 0–3.0 (0.5 deg) |
| ScanTime #Sec | 1 | 1–9 |
| CamSync $$$$ | | NONE/SYNC |
| ##### | | monitor |
| RetSum ##.# | | monitor |
| LowBatt $$$ | | OK/LOW |
| ShiftLt $$$ | | OFF/ON |
| Gear # | | 1–6 |
| RpmSw $$$ | | OFF/ON |
| MaxCylDeg | | 0.0–5.0 |
| Pressure ##.# | | monitor |
| BoostRet | | monitor |
| DisIn | | OK/ LOST |
| Step1In | | OFF/ON |
| Step2In | | OFF/ON |
| Step3In | | OFF/ON |
| RevLaunchIn | | OFF/ON |

-continued

| | |
|---|---|
| RevBurnIn | OFF/ON |
| ShKillIn | OFF/ON |
| Alert Messages | Led Blink Code |
| No Cam Sync | 2 |
| Low Battery | 3 |

The circuitry for the fifth form of electronic Controller 10 provides for the control of the RPMs, ignition sparking, ignition timing spark retards, switch, and shift kill of a motorcycle engine during various stages of a drag race. Data is transferred from either the hand-held programmer 6, or computer 8, a dash-mounted dial module via the data connection RS232 nine pin serial connector 756. An RS 232 driver and receiver 758 provides the proper voltages to a microcontroller 760 used to control the functions of the fifth form of electronic controller 10. This form of electronic controller 10 utilized MicroChip PIC 16 C76 8-bit CMOS microcontroller with analog to digital converter. Microcontroller 760 contains 368 bytes of RAM and utilizes electrically erasable programmable read-only memory (EEPROM) to store and execute the program used to control the motorcycle engine. The engine control values 54 are stored in a non-volatile memory 762. The fifth form of electronic controller 10 used a MicroChip 64K 2.5 volt CMOS Smart serial ™ EEPROM. Microcontroller 760 controls the data transmissions to non-volatile memory 762 by generating a serial clock signal. Data connection 764 provides a serial clock signal to non-volatile memory 762, which transfers data via data connection 766.

Step Retards Off Delay allows from 0.00 to 2.50 seconds delay from disabling any of the Step Regards from either wire or control to allow ignition timing to stay retarded until ntrous stops flowing. Shift-Kill Delay allows from 20 to 99 milliseconds of delay from the Shift-Kill input source being activated until the engine kill function turns off. Shift-Kill Mode allows the user to select the engine kill function for no kill for gear 1 to 2 shift or gears 1 to 2 and 2 to 3 or kill on each shift in Manual mode. Menu selections are Auto12, Auto123, Manual. Shift-Kill Source allows the user to select the external Kill wire input or the Shiftlight function to automatically enable the Shift-Kill feature, with an override of the Shift-Kill wire available. Retard at Launch enables 0 to 15 degree retard in 0.5 degree increments and programmable ramp time of 0.00 to 2.5 seconds to normal launch timing. Cylinder Timing provides adjustable cylinder retard of 0 to 5 degrees in 0.1 degree increments and enables independent timing of each cylinder using Cam Sync input. Boost Retard Curve gives the user a retard curve from 2 PSI to 30 PSI or 2 to 45 PSI in 0.25 PSI increments, from 0 to 25 degrees retard in 0.1 degree increments.

The user may set the ramp time duration from 0.00 to 2.50 seconds in 0.010 second increments. When the LAUNCH REV LIM is high, any programmed retards are added to the ignition timing. However, when the launch retard ramp function is deactivated by the LAUNCH REV LIM signal going low, the launch retard ramp function gradually removes or ramps up the timing retards over the programmed time duration. Turning to the PTS1 input circuit 392 shown in FIG. 6F, this circuit also uses a voltage comparator 394, such as a MC33072 op amp, to sense the input trigger from the engine points signal, which could be from mechanical points, or an ECU (electronic control unit) coil driver.

The engine control parameter groups are stored as values in non-volatile memory 762 electronic Controller time which communicates the values to the computer 8 to or hand-held programmer 6. As described the foregoing for the first form electronic controller 10, non-volatile memory 762 is organized as pages and the preferred form contains 32 pages of 256 bytes each. Likewise, the EEPROM directory is as described in the first form of electronic controller 10.

The step3 ramp retard is used with Nitrous or at some time down the track to progressively add retard and is enabled by the step3 RPM value and the step3 input wire and the step3 ramp value. This retard can progress at from 0 to 9.9 seconds. This retard is held during the ramp if the speed is below the step3 RPM or the step3 wire is disabled, and continues when both the step3 wire is enabled and the engine speed is above the step3 RPM value. #3 Step Retard ranges from 0 to 15 degrees in 0.1 increments enabled from 800–15,000 Rpm, and Ramp-Retard from 0.1 to 9.9 seconds, 0.1 sec increments. Retard at Launch enables 0 to 15 degree retard in 0.5 degree increments and programmable ramp time of 0.00 to 2.50 sec to normal launch timing.

The battery 14 provides the DC current of sufficient power to power the internal circuitry of electronic controller 10 including the ignition power and convertor circuitry and coil drive circuit which function as a programmable electronic ignition. The fifth form of electronic controller 10 is substantially similar to the ignition power convertor and coil drive circuitry disclosed in U.S. Pat. No. 6,196,208 and co-pending application number 09/432,454, and assigned to the assignee of the present invention. The electronic controller 10 also contains the necessary circuitry to provide input signals to shift light 34 or automatic transmission shift controller 37, a tachometer 33 engine RPM switch.

The invention described in the above detailed description is not intended to be limited to the specific form set forth herein, but on the contrary it is intended to cover such alternatives, modifications and equivalents as can reasonably be included within the spirit and scope of the appended claims.

What is claimed is:

1. An electronic engine control system for controlling the functions of an engine, the system comprising:
   an electronic engine controller having a first memory location for storing control parameters for controlling the functions of an engine and a second memory location for storing indicia descriptive of the engine functions;
   a hand-held interface device with a display thereon for communicating with a user indicia descriptive of the engine functions and corresponding control parameters for controlling the functions of the engine; and
   a connection from the interface device to the electronic engine controller for sending the indicia and the control parameters to and from the interface device and the electronic controller and vise versa.

2. The electronic engine control system of claim 1 wherein the interface device is a compact hand-held programmer to allow the user to view and select indicia and to alter control parameters thereof.

3. The electronic control system of claim 2, further comprising step retard ranges from approximately 0 to 15 degrees in fractional degree increments for RPMs from approximately 800–15,000 RPM with ramp-retard from approximately 0.1 to 9.9 seconds in fractional second increments to allow the user to view and select indicia and to alter control parameters thereof.

4. The electronic control system of claim 1, further comprising retard at launch indicia from said hand-held interface in communication with said electronic ignition controller for preventing engine damage from ignition timing being too far advanced.

5. A method for creating a set of custom indica for displaying on an interface device, the method comprising:

accessing a first set of indica from a first memory location in a controller;

editing a menu name and associated submenu in the first set of indica;

adding a data name in the first set of indica for referencing data associated with the edited menu name;

adding an address location for storing user inputted data associated with the data name in a second memory location in the controller; and displaying the user inputted control parameter for on the display of the interface device for the user to a user to view and adjust.

6. A method for allowing a user to interact with an electronic engine controller for controlling an engine, the method comprising:

storing in a first memory location of the electronic engine controller control parameters for controlling functions of the engine;

storing in a second memory location of the electronic engine controller distinct from the first, indicia descriptive of the engine functions which indicia are not used by the electronic engine controller;

providing an interface device that is configured with a display on the interface device to communicate with the first and second memory locations in the electronic engine controller; and displaying indicia selected by the user via the interface device for altering the control parameters based on user preferences for generation of the corresponding engine functions.

7. The method of claim 6 wherein the interface device is a compact hand-held programmer to allow the user to view and select indicia and to alter control parameters via a hand-held programmer thereof.

8. The method of claim 6, wherein said displaying step comprises indicia for step retard ranges from approximately 0 to 15 degrees in fractional degree increments.

9. The method of claim 6, wherein said display step comprises indicia for retard at launch enabling approximately 0 to 15 degree retard and a programmable ramp time for normal launch timing.

* * * * *